United States Patent
Stoltz

(10) Patent No.: US 11,766,933 B2
(45) Date of Patent: Sep. 26, 2023

(54) TRANSMISSION MOUNTED ELECTRICAL CHARGING SYSTEM WITH IMPROVED BATTERY ASSEMBLY

(71) Applicant: Eaton Intelligent Power Limited, Dublin (IE)

(72) Inventor: Thomas Joseph Stoltz, Allen Park, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/657,888

(22) Filed: Apr. 4, 2022

(65) Prior Publication Data
US 2022/0219530 A1  Jul. 14, 2022

Related U.S. Application Data

(60) Division of application No. 16/795,382, filed on Feb. 19, 2020, now Pat. No. 11,472,287, which is a
(Continued)

(30) Foreign Application Priority Data

Nov. 7, 2017 (IN) .............................. 201711039647

(51) Int. Cl.
*B60K 25/06* (2006.01)
*B60K 6/26* (2007.10)
(Continued)

(52) U.S. Cl.
CPC ................ *B60K 25/06* (2013.01); *B60K 6/26* (2013.01); *B60K 17/28* (2013.01); *B60K 2001/005* (2013.01)

(58) Field of Classification Search
CPC .......... H02J 7/1423; H02J 7/1492; H02J 7/16; B60K 17/28; B60K 25/00; B60K 6/26;
(Continued)

(56) References Cited

U.S. PATENT DOCUMENTS

| 4,938,280 A | 7/1990 | Clark |
| 5,242,314 A | 9/1993 | Di et al. |

(Continued)

FOREIGN PATENT DOCUMENTS

| CN | 102652072 A | 8/2012 |
| CN | 105667491 A | 6/2016 |

(Continued)

OTHER PUBLICATIONS

U.S. Appl. No. 17/644,936, filed Dec. 17, 2021, Pending, Sukhatankar, Nihal, et al.
(Continued)

*Primary Examiner* — Carlos Amaya
(74) *Attorney, Agent, or Firm* — Talem IP Law, LLP

(57) ABSTRACT

An example system includes a motive application having a prime mover, a load, a driveline, and a motor/generator that couples to the driveline. The system includes a number of batteries, and a battery assembly that electrically couples the batteries to the motor/generator. The battery assembly includes a power interface positioned at a first end of the battery assembly, the power interface including a low voltage coupling and a high voltage coupling, and a service electrically interposed between the batteries and the power interface. The service disconnect in a first position couples at least one of the batteries to the first low voltage coupling and couples the batteries to the second high voltage coupling. The service disconnect in a second position decouples the batteries from the low voltage coupling and the high voltage coupling.

7 Claims, 61 Drawing Sheets

Related U.S. Application Data continuation-in-part of application No. 16/183,436, filed on Nov. 7, 2018, now Pat. No. 11,349,331.

(60) Provisional application No. 62/807,646, filed on Feb. 19, 2019, provisional application No. 62/582,384, filed on Nov. 7, 2017.

(51) Int. Cl.
*B60K 1/00* (2006.01)
*B60K 17/28* (2006.01)

(58) Field of Classification Search
CPC .............. B60K 25/06; B60K 2025/005; B60K 2001/005
See application file for complete search history.

(56) References Cited

U.S. PATENT DOCUMENTS

| | | |
|---|---|---|
| 5,631,821 A | 5/1997 | Muso |
| 5,979,257 A | 11/1999 | Lawrie |
| 6,176,808 B1 | 1/2001 | Brown et al. |
| 6,600,980 B1 | 7/2003 | Kraska et al. |
| 6,878,092 B1 | 4/2005 | Schustek et al. |
| 6,887,180 B2 | 5/2005 | Pels et al. |
| 7,104,920 B2 | 9/2006 | Beaty et al. |
| 8,037,784 B2 | 10/2011 | Raoul |
| 8,760,855 B2 | 6/2014 | Howes et al. |
| 9,315,187 B2 | 4/2016 | Stenson |
| 9,579,964 B2 | 2/2017 | Piazza et al. |
| 9,794,630 B2 | 10/2017 | Sanchez-Leighton |
| 10,071,662 B2 | 9/2018 | Choi et al. |
| 10,622,755 B1 | 4/2020 | Gonzalez Delgadillo et al. |
| 10,696,151 B2 | 6/2020 | Stoltz |
| 10,850,623 B2 | 12/2020 | Chung et al. |
| 11,084,373 B2 | 8/2021 | Fortune et al. |
| 11,124,058 B2 | 9/2021 | Stoltz et al. |
| 11,130,388 B2 | 9/2021 | Stoltz |
| 11,272,638 B2 | 3/2022 | Stoltz et al. |
| 11,349,331 B2 | 5/2022 | Stoltz et al. |
| 11,472,287 B2 | 10/2022 | Stoltz |
| 2002/0104397 A1 | 8/2002 | Bowen |
| 2004/0230847 A1 | 11/2004 | Patwardhan et al. |
| 2005/0101432 A1 | 5/2005 | Pels et al. |
| 2005/0139035 A1 | 6/2005 | Lee et al. |
| 2006/0092611 A1 | 5/2006 | Beihoff et al. |
| 2007/0265126 A1 | 11/2007 | Janson et al. |
| 2007/0267233 A1 | 11/2007 | Wenthen |
| 2007/0284159 A1 | 12/2007 | Takami et al. |
| 2008/0130223 A1 | 6/2008 | Nakamura et al. |
| 2009/0115372 A1 | 5/2009 | Naganuma et al. |
| 2009/0140694 A1 | 6/2009 | Zeng |
| 2009/0228150 A1 | 9/2009 | Alston |
| 2010/0078234 A1 | 4/2010 | Bissontz |
| 2010/0114442 A1 | 5/2010 | Kadota |
| 2010/0219007 A1 | 9/2010 | Dalum et al. |
| 2010/0224429 A1 | 9/2010 | Akiyama |
| 2011/0052970 A1* | 3/2011 | Kurata ................ H01M 50/176 429/158 |
| 2011/0120160 A1 | 5/2011 | Dietrich |
| 2011/0126652 A1 | 6/2011 | Genise et al. |
| 2011/0187376 A1 | 8/2011 | Barrenscheen et al. |
| 2011/0198139 A1 | 8/2011 | Fuechtner |
| 2011/0259145 A1 | 10/2011 | Hellenbroich et al. |
| 2011/0307153 A1 | 12/2011 | Razaznejad et al. |
| 2012/0003131 A1 | 1/2012 | Ibrahim et al. |
| 2012/0240723 A1 | 9/2012 | Gluckler et al. |
| 2012/0266701 A1 | 10/2012 | Kamada et al. |
| 2013/0053201 A1 | 2/2013 | Holmes et al. |
| 2013/0058801 A1 | 3/2013 | Cheng et al. |
| 2013/0186235 A1 | 7/2013 | Morimoto et al. |
| 2013/0187453 A1 | 7/2013 | Flett et al. |
| 2013/0255440 A1 | 10/2013 | Blond et al. |
| 2014/0027089 A1 | 1/2014 | Hisada |
| 2014/0171260 A1 | 6/2014 | Dalum |
| 2015/0135863 A1* | 5/2015 | Dalum ................ B60K 6/00 180/65.21 |
| 2015/0207344 A1 | 7/2015 | Wang et al. |
| 2016/0052382 A1 | 2/2016 | Clark et al. |
| 2016/0137188 A1 | 5/2016 | Zhu et al. |
| 2016/0201558 A1 | 7/2016 | Pal |
| 2016/0217898 A1 | 7/2016 | Kozuru et al. |
| 2016/0318421 A1 | 11/2016 | Healy |
| 2017/0001622 A1 | 1/2017 | Lindstrom et al. |
| 2017/0023618 A1 | 1/2017 | Douglass et al. |
| 2018/0001740 A1 | 1/2018 | Vehr et al. |
| 2018/0251019 A1 | 9/2018 | Stoltz |
| 2019/0135107 A1 | 5/2019 | Fortune et al. |
| 2019/0140474 A1 | 5/2019 | Stoltz et al. |
| 2019/0155230 A1 | 5/2019 | Culbertson et al. |
| 2019/0193524 A1 | 6/2019 | Stoltz |
| 2019/0256077 A1 | 8/2019 | Stoltz |
| 2020/0114757 A1 | 4/2020 | Gasparovic et al. |
| 2020/0247239 A1 | 8/2020 | Stoltz |
| 2020/0254865 A1 | 8/2020 | Stoltz et al. |
| 2020/0404804 A1 | 12/2020 | Stoltz et al. |
| 2022/0105793 A1 | 4/2022 | Sukhatankar et al. |
| 2022/0118844 A1 | 4/2022 | Golder et al. |
| 2022/0153091 A1 | 5/2022 | Stolz |
| 2022/0255339 A1 | 8/2022 | Stoltz et al. |

FOREIGN PATENT DOCUMENTS

| | | |
|---|---|---|
| DE | 4202083 A1 | 7/1993 |
| DE | 4204384 A1 | 8/1993 |
| EP | 1097831 A2 | 5/2001 |
| EP | 1199468 A2 | 4/2002 |
| EP | 2264334 A1 | 12/2010 |
| EP | 2514620 A1 | 10/2012 |
| EP | 2957444 A1 | 12/2015 |
| EP | 3300239 A1 | 3/2018 |
| EP | 3505427 A1 | 7/2019 |
| EP | 3755131 A1 | 12/2020 |
| FR | 2835301 A1 | 8/2003 |
| JP | S58128926 A | 8/1983 |
| JP | 2003232412 A | 8/2003 |
| JP | 2012105419 A | 5/2012 |
| JP | 2014011926 A | 1/2014 |
| WO | 02078987 A2 | 10/2002 |
| WO | 2013022816 A1 | 2/2013 |
| WO | 2013113103 A1 | 8/2013 |
| WO | 2013183499 A1 | 12/2013 |
| WO | 2017079423 A1 | 5/2017 |
| WO | 2018085406 A1 | 5/2018 |
| WO | 2019092023 A2 | 5/2019 |
| WO | 2019092026 A1 | 5/2019 |
| WO | 2019092023 A3 | 7/2019 |
| WO | 2020187989 A1 | 9/2020 |
| WO | 2020192973 A1 | 10/2020 |
| WO | 2022129538 A1 | 6/2022 |
| WO | 2022242894 A1 | 11/2022 |

OTHER PUBLICATIONS

U.S. Appl. No. 17/478,075, filed Sep. 17, 2021, Pending, Genise, Thomas Alan, et al.

U.S. Appl. No. 17/446,043, filed Aug. 26, 2021, Pending, Stoltz, Thomas Joseph.

PCT/EP2021/086513, Dec. 17, 2021, Pending, Sukhatankar, Nihal, et al.

16862958.2, "European Application Serial No. 16862958.2, Extended European Search Report dated Jul. 12, 2019", Eaton Intelligent Power Limited, 9 pages.

17867121.0, "European Application Serial No. 17867121.0, Extended European Search Report dated Jul. 9, 2020", Eaton Intelligent Power Limited, 7 pages.

20170308.9, "European Application Serial No. 20170308.9, Extended European Search Report dated Sep. 21, 2020", Eaton Intelligent Power Limited, 10 pages.

McKay, B., "Benefits of a 48V P2 Mild Hybrid", Continental Powertrain Technology & Innovation, Sep. 30, 2016, 20 Pages.

(56) References Cited

OTHER PUBLICATIONS

PCT/EP18/80480, "International Application Serial No. PCT/EP18/80480, International Search Report and Written Opinion dated Jun. 19, 2019", Eaton Corporation, 21 pages.
PCT/EP18/80485, "International Application Serial No. PCT/EP18/80485, International Search Report and Written Opinion dated Mar. 1, 2019", Eaton Corporation, 15 pages.
PCT/EP2018/080480, "International Application Serial No. PCT/EP2018/080480, Invitation to Pay Additional Fees and, Where Applicable, Protest Fee dated Mar. 20, 2019", Eaton Corporation, 12 pages.
PCT/EP2020/057458, "International Application Serial No. PCT/EP2020/057458, International Preliminary Report on Patentability dated Sep. 30, 2021", 8 pages.
PCT/EP2020/057458, "International Application Serial No. PCT/EP2020/057458, International Search Report and Written Opinion dated Jun. 16, 2020", Eaton Corporation, 10 pages.
PCT/US2016/060308, "International Application Serial No. PCT/US2016/060308, International Search Report and Written Opinion dated Feb. 15, 2017", Eaton Corporation, 8 pages.
PCT/US2017/059541, "International Application Serial No. PCT/US2017/059541, International Search Report and Written Opinion dated Feb. 8, 2018", Eaton Corporation, 17 pages.
Woernle, Christoph, "Counter Shaft Transmission Used for Automobile,", EPO, JP 2003-232412 A, Machine Translation of Description, dated Aug. 22, 2003, 7 pages.
Woernle, Christoph, "Counter Shaft Transmission Used for Automobile,", EPO, JP 2003-232412 A, English Abstract, dated Aug. 22, 2003, 1 page.
First Office Action issued in Chinese Application No. 201880079512.8, dated Jan. 6, 2022, 8 pages.
Second Office Action issued in Chinese Application No. 201780076810.7, dated Jul. 29, 2022, 12 pages.
International Search Report and Written Opinion issued in International Application No. PCT/EP2021/087423, dated Mar. 30, 2022, 19 pages.
First Office Action issued in UK Application No. 2114392.0, dated Sep. 7, 2022, 3 pages.
First Office Action issued in U.S. Appl. No. 17/446,043, dated Oct. 27, 2022, 11 pages.
International Search Report and Written Opinion issued in International Application No. PCT/EP2021/086513, dated May 30, 2022, 13 pages.

\* cited by examiner

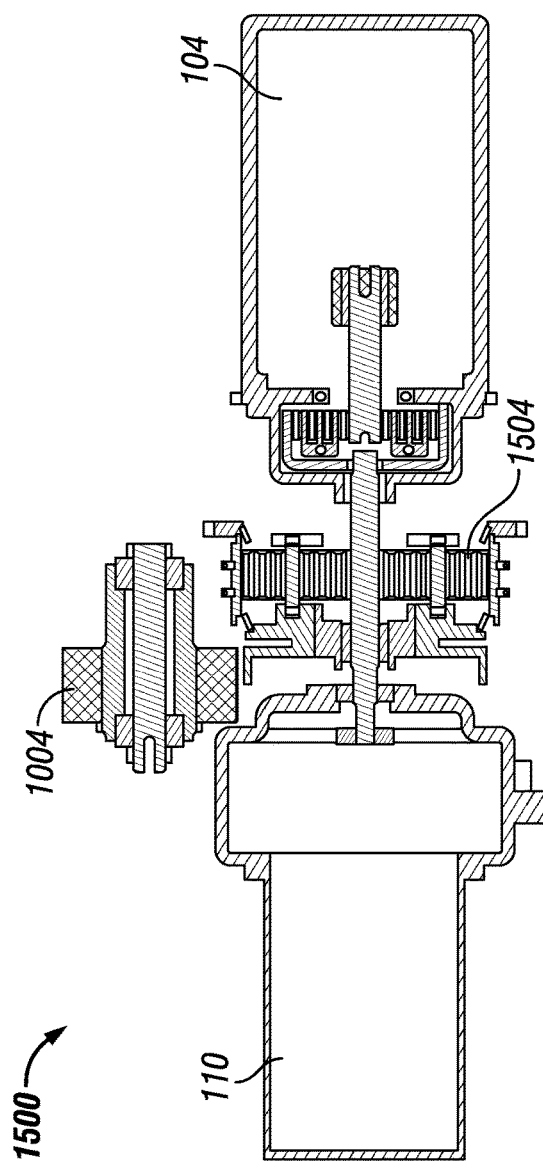
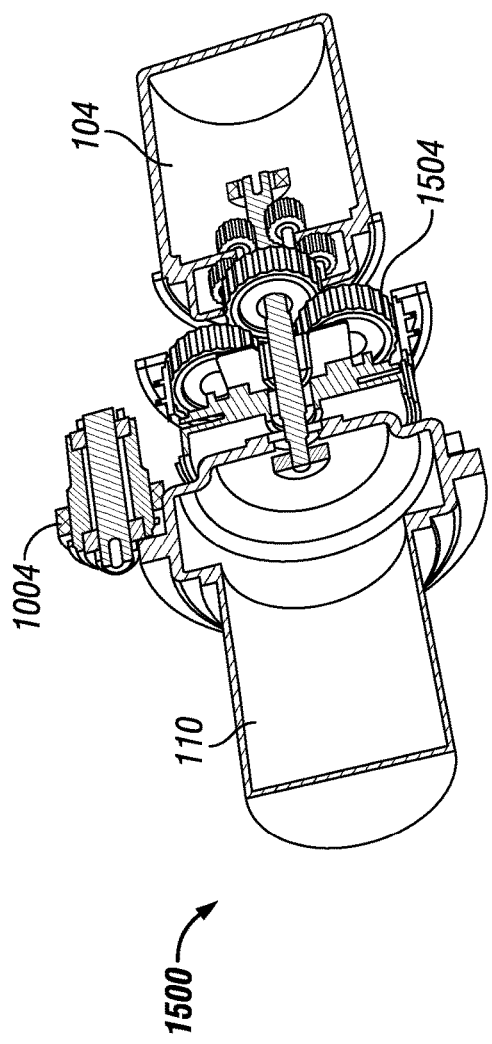

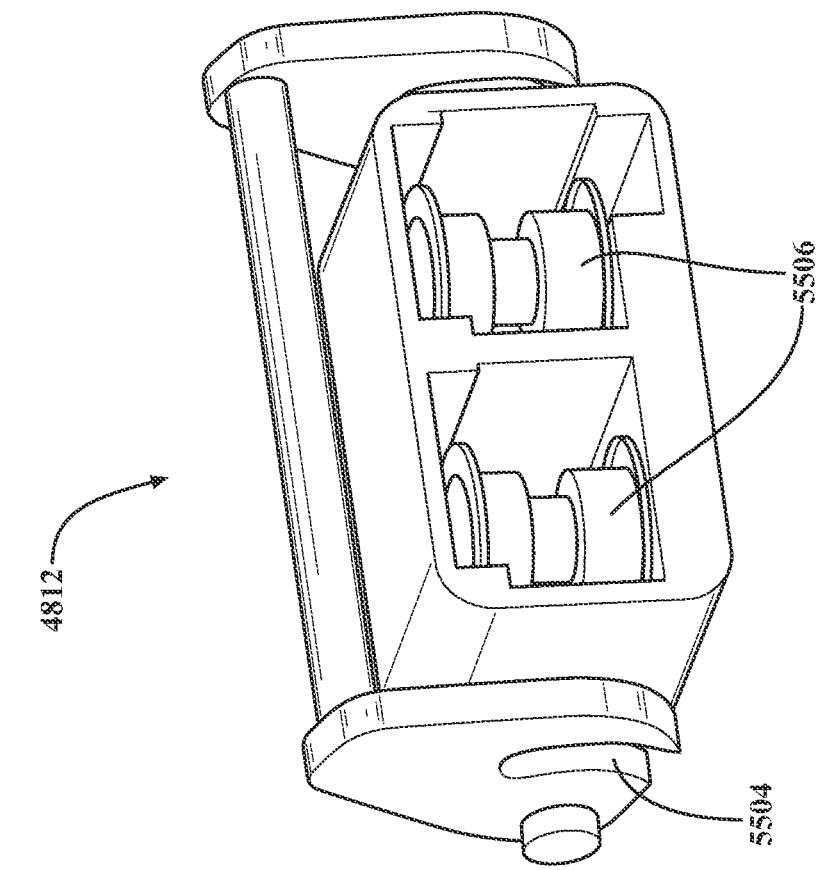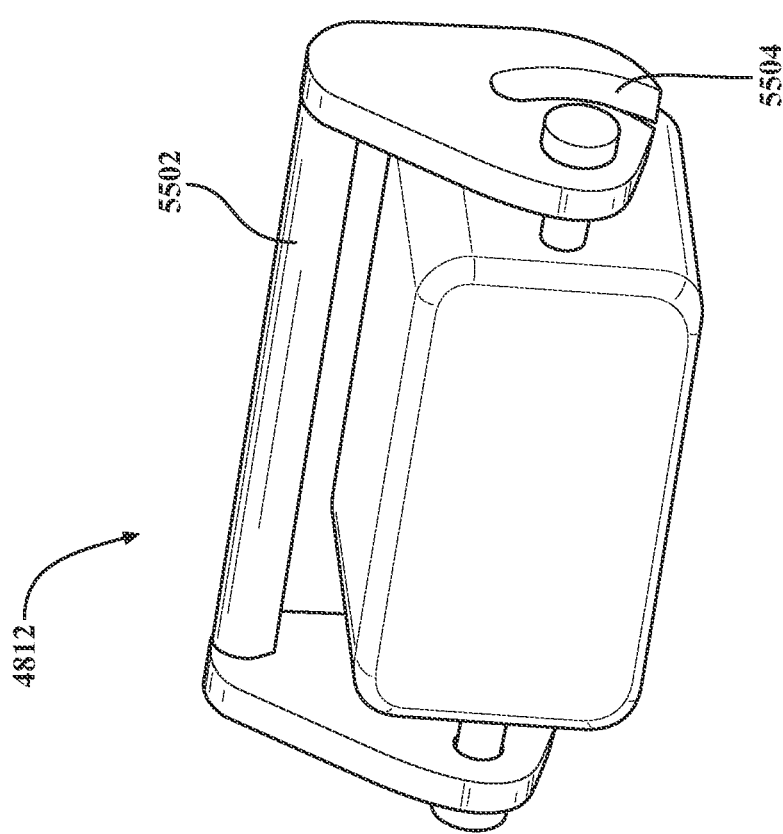
FIG. 55

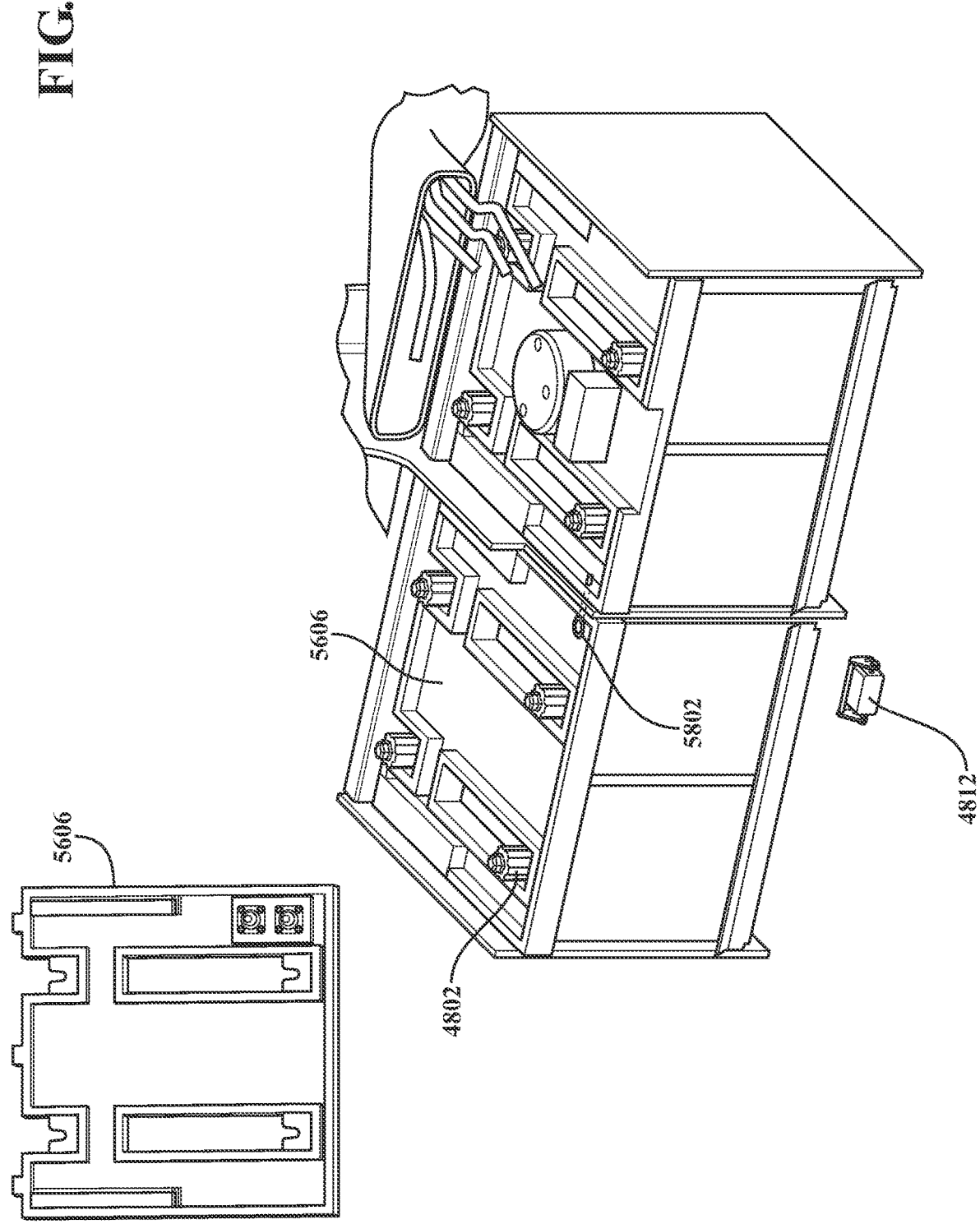

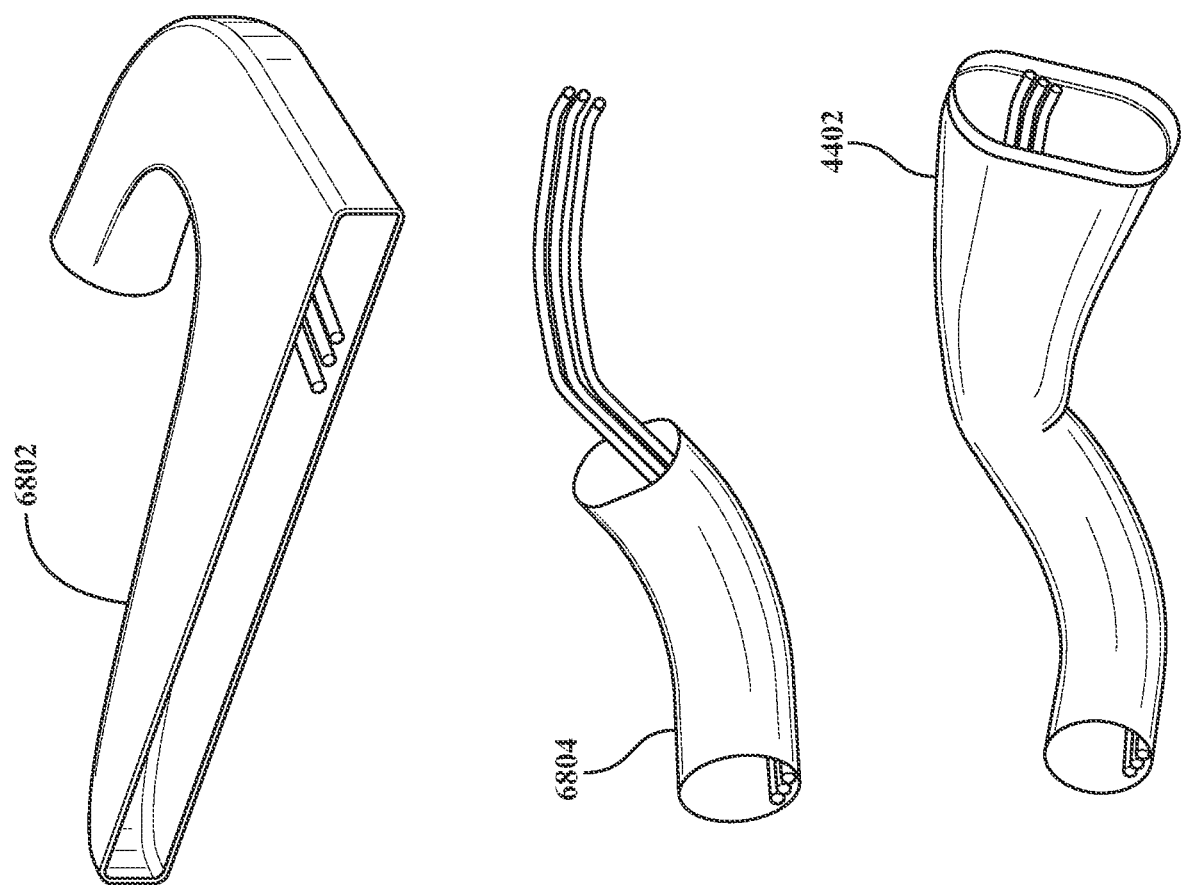
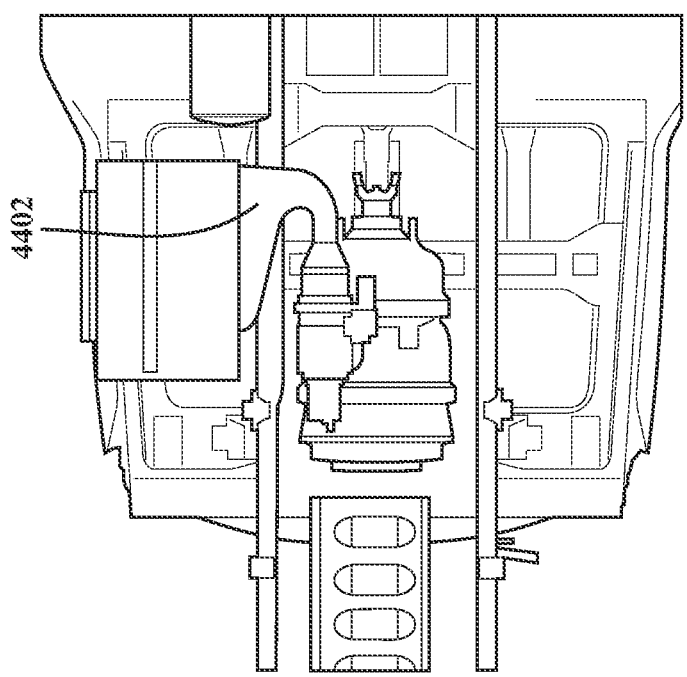
FIG. 68

FIG. 72
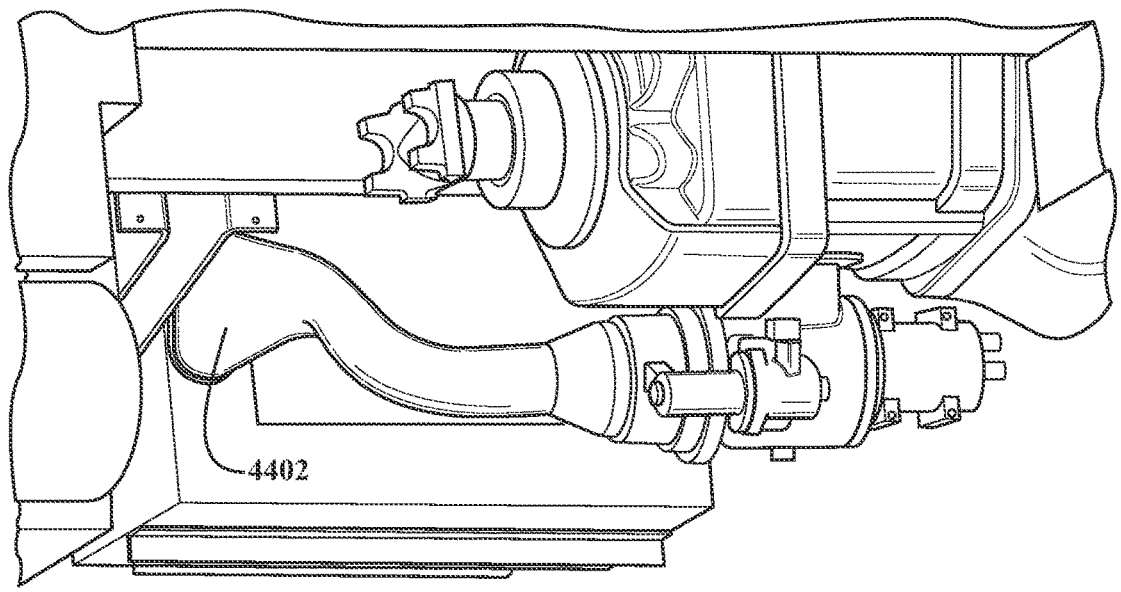
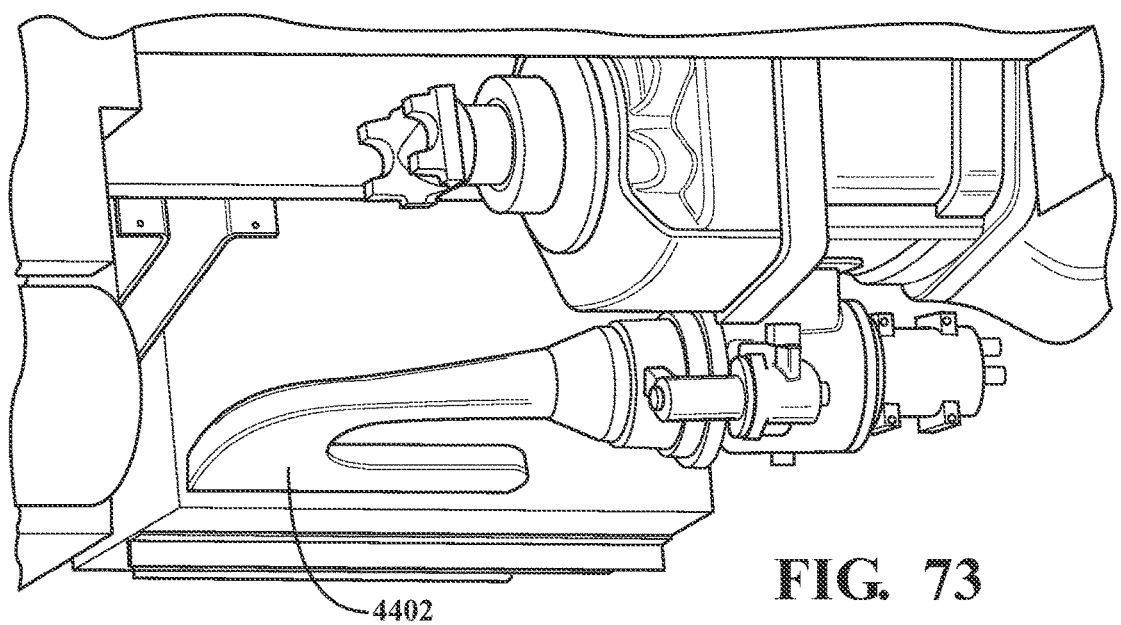
FIG. 73

TRANSMISSION MOUNTED ELECTRICAL CHARGING SYSTEM WITH IMPROVED BATTERY ASSEMBLY

CROSS-REFERENCE TO RELATED APPLICATIONS

This application claims priority to and is a divisional of U.S. patent application Ser. No. 16/795,382, filed Feb. 19, 2020, and entitled "TRANSMISSION MOUNTED ELECTRICAL CHARGING SYSTEM WITH IMPROVED BATTERY ASSEMBLY".

U.S. patent application Ser. No. 16/795,382 claims priority to U.S. Provisional Patent Application 62/807,646, filed 19 Feb. 2019, and entitled "TRANSMISSION MOUNTED ELECTRICAL CHARGING SYSTEM WITH IMPROVED BATTERY ASSEMBLY".

U.S. patent application Ser. No. 16/795,382 is a continuation-in-part of and claims priority to U.S. patent application Ser. No. 16/183,436, filed 7 Nov. 2018, and entitled 'TRANSMISSION MOUNTED ELECTRICAL CHARGING SYSTEM WITH DUAL MODE LOAD AND ENGINE OFF MOTIVE LOAD POWER".

U.S. patent application Ser. No. 16/183,436 claims priority to U.S. Provisional Patent Application Ser. No. 62/582,384, filed 7 Nov. 2017, and entitled "ELECTRICALLY REGENERATIVE ACCESSORY DRIVE". U.S. patent application Ser. No. 16/183,436 also claims priority to Indian Provisional Patent Application Serial Number 201711039647, filed 7 Nov. 2017, and entitled "GEAR BOX FOR SLEEP MODE ELECTRICALLY REGENERATIVE ACCESSORY DRIVE".

All of the above patent documents are incorporated herein by reference in their entirety.

FIELD

The present disclosure relates generally to a driveline PTO system and related method for operating a motor/generator with shared load management between the driveline, accessory loads such as an air conditioning compressor, and the motor/generator. The present disclosure more specifically, but not exclusively, relates to battery assembly arrangements for battery packs electrically coupled to the motor/generator.

BACKGROUND

The use of electrification of loads and accessories for vehicles is increasing for a number of reasons. Electrified accessories and loads allow for greater control, utilization of otherwise wasted energy such as braking and regenerative energy, and provide for incremental improvements toward fully electric vehicles that do not have combustion engines, and (depending upon the source of electrical energy) that can potentially reduce the production of greenhouse gases. Additionally, it is desirable to reduce non-useful operating time for prime movers, such as idling internal combustion engines when motive power is not required.

Presently known systems for electrically powering loads on a vehicle suffer from a number of challenges. Some of these challenges are even more prevalent in heavy-duty commercial sleeper cab trucks. Fully electric systems, such as a series hybrid electrified system, suffer from inefficiencies such as two-way electric power conversion (e.g., from DC to AC, and then back to DC), and/or require that systems be oversized relative to the required load to ensure that the system can regenerate or recharge batteries while at the same time powering the load. Additionally, fully electric systems for many loads require high voltages to ensure reasonably sized connections and electric conduits. However, high voltage systems require additional integration and testing work, expensive connectors, and/or systems isolated from the vehicle chassis ground systems to ensure they are safe. Further, many vehicles presently on the road retain internal combustion engines as a prime mover, and full electrification of loads and accessories cannot readily be integrated with systems having a highly capable non-electric prime mover without redundancy and expense.

Presently known electrical storage systems for medium capability electrical systems additionally suffer from a number of challenges. High capability battery technologies such as lithium ion require careful control of battery pack charge, temperature environment for the battery, and are expensive to implement, install, and replace. Lower capability battery technologies require large numbers of heavy batteries that require replacement one or more times over the vehicle life to provide sufficient useful storage under presently known operation and management techniques.

SUMMARY

An example system and method includes a driveline power take off (PTO) device that selectively provides power to a shared load utilizing driveline power and/or stored electrical power. An example system and method includes a driveline PTO device that applies selected gear ratios between a motor/generator and a shared load, between the motor/generator and the driveline, and/or between the driveline and the shared load. An example system utilizes one or more planetary gear assemblies to provide selected gear ratios. An example system and method includes a PTO device configured for ease of installation with a variety of transmission systems and driveline configurations. An example system and method includes a number of operating modes, including powering a shared load with a driveline, powering the shared load with a motor/generator, powering the motor/generator with the driveline, and/or powering the driveline with the motor/generator including in a creep mode or in a cranking mode. An example system and method further includes power transfers throughout devices in the system, including operating loads when a prime mover is offline, storing regenerative power from a driveline, and/or using power transfer to a driveline to enhance operations of a motive application such as a vehicle. An example system and method includes control of a forward or reverse application of power to a driveline, and/or efficient integration where control of the forward or reverse application of power to the driveline is managed elsewhere in the system.

An example system includes a PTO device engaging a countershaft of a transmission, a selected gear in the transmission, a PTO interface of the transmission, and/or engaging other driveline components. An example system and method includes engaging a countershaft at a rear and/or axial position of the countershaft. An example system and method includes selectively engaging a driveline with selected directions and/or ratios for power flow through the system, and/or utilizing a neutral device to disengage a shared load and/or a motor/generator from the driveline. An example system includes a multi-ratio light hybrid system, and/or powering of electrical loads or accessories selectively between driveline power and electrical power. An example system includes a simplified driveline interface having a low number of actuators for ease of integration and reduced failure rates.

An example system and method includes hardware features, system integration aspects, and/or battery management aspects providing for improved capability, utilization, and battery life for modestly capable battery technologies such as lead-acid batteries. In certain embodiments, hardware features, system integration aspects, and/or battery management aspects described herein reduce a number of batteries required for a given capability of the system, reduce a number of replacement and/or service events, and/or extend capabilities for systems having highly capable battery technologies such as lithium ion batteries. Example systems and methods herein provide for capability to support multiple load types and duty cycle requirements, including loads having multiple electrical interface requirements. Example systems and methods herein provide for capability to remove one or more aspects of presently known systems, including in certain embodiments a starting motor, one or more belt driven accessories, redundant heating and air conditioning (HVAC) systems, auxiliary power units (APUs), and/or separated battery packs for storing power for offline operation and prime mover starting.

Example systems and methods herein provide for capability to reduce reliance on infrastructure such as electrical charging stations and/or shore power, providing for the ability to reduce undesirable operation such as idling engine time, while providing the capability for unconstrained routing, delivery, and transport scheduling, which may further provide for additional system level and/or fleetwide efficiencies beyond the direct vehicle or application on which a particular embodiment of the present disclosure is installed. Example systems and methods herein provide for interfacing between electrical systems on a vehicle, and advantageously utilizing available systems to generate additional capability and efficient use of energy sources. Example systems and methods herein flexibly support a number of potential loads, including compressor/HVAC loads, mixers, hydraulic pumps, any PTO load, hoteling loads, and/or any accessory load. Example systems and methods herein have a variety of power capabilities for supported loads, including loads up to at least a 5 kW nominal load, a 10 kW nominal load, a 15 kW nominal load, and/or a 30 kW nominal load. Example systems and methods herein are additionally capable of supporting peak and/or transient loads that are higher than the nominal loads. Example systems and methods herein include more than one PTO device for certain applications.

BRIEF DESCRIPTION OF THE DRAWINGS

The present disclosure will become more fully understood from the detailed description and the accompanying drawings, wherein:

FIGS. 15A and 15B illustrates an embodiment cross-sectional view of an electrically regenerative accessory drive with schematic gear box representation;

FIG. 55 is a schematic depiction of an example disconnect for a battery assembly.

FIG. 62 is a schematic depiction of a battery securing assembly of the second battery assembly embodiment.

FIG. 68 is a schematic depiction of the second battery assembly embodiment depicting certain environmental management features.

FIG. 72 is a schematic depiction of the second battery assembly embodiment in a first arrangement.

FIG. 73 is a schematic depiction of the second battery assembly embodiment in a second arrangement.

DETAILED DESCRIPTION

Figure 1:
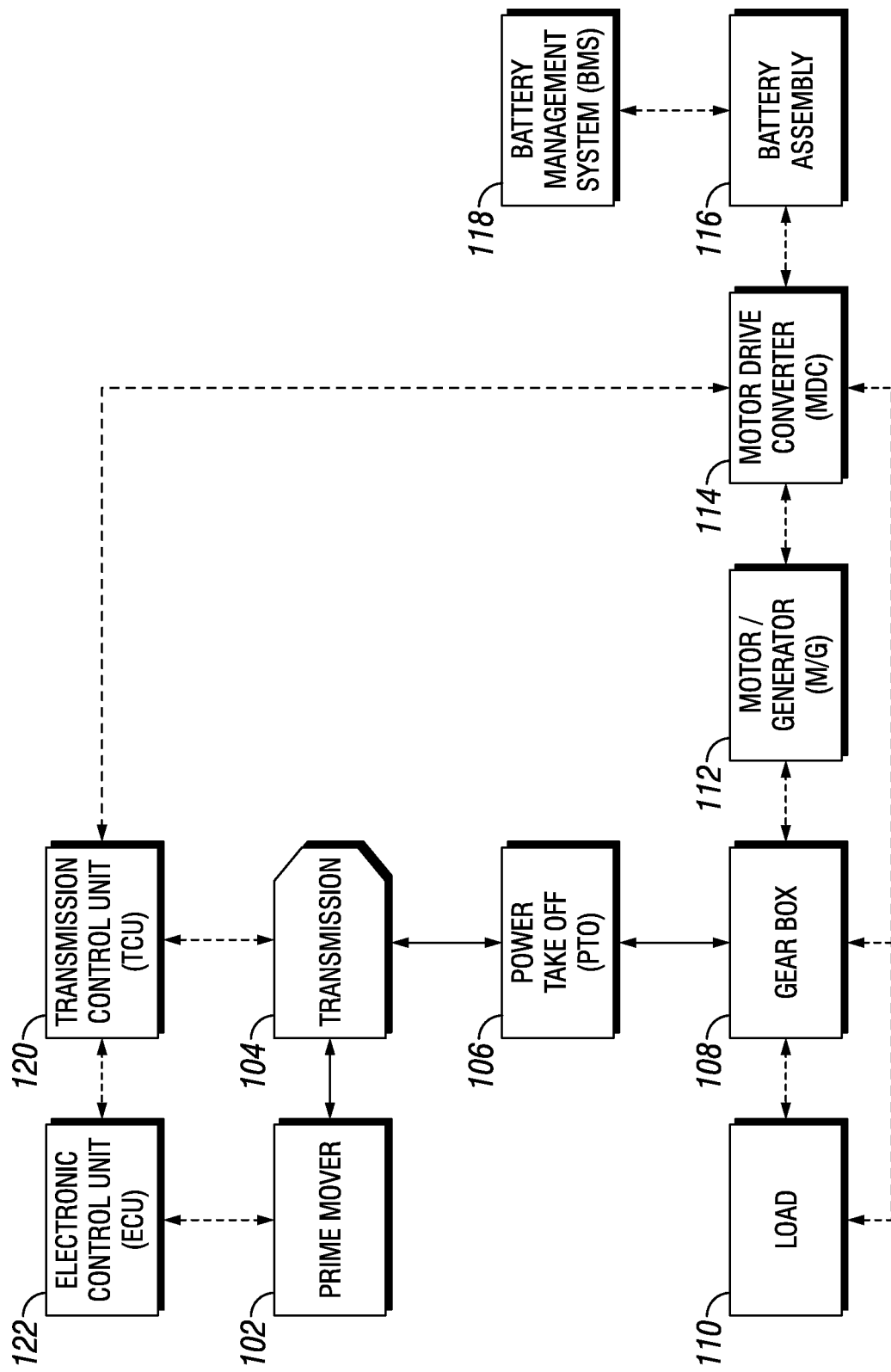
FIG. 1 is a top-level schematic block diagram for an electrically regenerative accessory drive in an embodiment of the present disclosure.

As will become appreciated from the following discussion, the instant disclosure provides embodiments that support powering one or more loads in a shared manner between a driveline and a PTO (PTO) device, and/or replaces one or more aspects of previously known vehicle electrical systems and/or belt driven powering interfaces for devices. While the disclosure throughout contemplates using the apparatus, system, and process disclosed to drive an auxiliary load, for clarity of description, one or more specific loads such as an HVAC, mixer, and/or hydraulic pump may be referenced in certain examples. All references to specific load examples throughout the present disclosure are understood to include any load that can be powered electrically and/or with a rotating shaft. Further, while the disclosure throughout contemplates using the apparatus, system, and process disclosed as coupled with a motive load, for simplicity the description herein may refer to the motive load as a driveline and/or as a wheeled system. All references to specific motive loads throughout this disclosure should also be understood to be references to any motive load and/or portion of a driveline between a prime mover and a final motive engagement (e.g., wheels, tracks, etc.)

In an example, in commercial long-haul class 8 vehicles, commonly referred to as "18-wheeler sleeper cabs", traditionally a front-end accessory drive (FEAD) powers accessory components such as the electrical charging system (e.g., the alternator), the compressor that drives the HVAC air conditioner, fans, power steering, air compressors, fluid pumps, and/or other accessory loads depending upon the specific implementation. Historically, operators of such vehicles would run the engine nearly all the time including while driving for propulsion and idling while stopped to maintain the accessory functions such as "hotel loads" including lights, television, refrigerator, personal devices (e.g., a CPAP, electronic device charging, etc.), and HVAC cooling in summer months. In an effort to improve fuel economy and/or reduce emissions, fleet policy and laws in many locations prohibit idling for extended periods of time. Many solutions to provide the required electricity and cooling have been commercialized, including the addition of a small engine for that function (APU), addition of batteries that run an electrical air conditioner that are charged while driving, utilization of locations that have shore power available, and/or periodic cycling of the engine.

Previously known systems have followed two paths for engine off air conditioning. In a first implementation, the existing belt driven compressor is used while driving and a second electrically driven compressor is used while the engine is off. Such a solution adds cost and complexity. In a second implementation, a purely electrically driven compressor is operated for all of the HVAC demand. The disadvantage of a full-time electric HVAC system are twofold: First, the increase in power demand exceeds the available power in 12V systems driving the industry to higher system voltage (especially 48V). Secondly, the system efficiency suffers when the engine shaft power is converted to electricity then converted back to shaft power to drive the compressor while driving.

References throughout the present disclosure to any particular voltage level should be understood to include both nominal voltages (e.g., a 12V battery) and actual system voltages. For example, a nominal 12V lead-acid battery typically operates at 14V or 14.5V during operations where the battery is in electrical communication with a charging device such as an alternator. Further, a nominal 12V battery may operate below 12V during discharge operations such as during cranking, and may be as low as 10.5V during certain operations. Further still, while certain voltages are described herein for clarity of description and due to ordinary terminology in industry (e.g., 12V, 48V, etc.), it will be understood that the features of the present disclosure are applicable to a wide range of voltages, and the specific voltages described are not limiting. For example, a nominal 48V system may be 56V or 58V during certain operations of a system, or as low as 42V during other operations of the system. Additionally, without limitation, features and operations for a nominal 48V system may be applicable to a nominal 12V system and/or a 24V. In certain examples, as will be understood to one of skill in the art having the benefit of the present disclosure, some voltage ranges may change the operating principles of a system, such as a high voltage system (e.g., more than 60V) that may require additional aspects to certain embodiments such as an isolated ground, and/or a low voltage system where a high power requirement may limit the practicality of such systems. The voltage at which other system effects may drive certain considerations depends upon the specific system and other criteria relating to the system that will be understood to one of skill in the art having the benefit of the present disclosure. Certain considerations for determining what range of voltages may apply to certain example include, without limitation, the available voltages of systems and accessories on a specific vehicle, the regulatory or policy environment of a specific application, the PTO capability of available driveline components to be interfaced with, the time and power requirements for offline power, the availability of regenerative power operations, the commercial trade-offs between capital investment and operating costs for a specific vehicle, fleet, or operator, and/or the operating duty cycle of a specific vehicle.

The present disclosure relates to PTO devices having a motor/generator, where the PTO device is capable to selectively transfer power with the driveline, such as at a transmission interface. In embodiments, a 48V PTO may replace the traditional engine mounted, belt driven alternator, HVAC compressor, and/or the flywheel mounted brush starter with a transmission PTO mounted electrical machine on a common shaft with the HVAC compressor. The disclosed PTO device accessories on the transmission enable several modes of operation, independent of engine speed, using proven parts such as simple planetary gears and shift actuators. Without limitation, example PTO devices disclosed herein allow for operating the load (e.g., an HVAC compressor) with the same electric machine used to charge the battery while driving and/or during engine-off operations such as sleeping, hoteling, or waiting (e.g., at a loading dock, construction site, or work site), and the ability to operate the charging and load mechanically from the driveline (e.g., during coasting or motoring). In certain embodiments, an example PTO system reduces total ownership costs and/or enhances the ability to meet anti-idling requirements while allowing the operator to maintain climate control or other offline operations. An example system also improves system economics for the vehicle manufacturer, fleet, owner, or operator, by reducing green-house gas (GHG) emissions, improving fuel economy, improving operator comfort and/or satisfaction, and enabling original equipment manufacturer (OEM) sales of various feature capabilities supported by the PTO system. Certain example systems disclosed herein have a lower initial cost than previously known systems (e.g., diesel or battery APUs and/or redundant HVAC systems) while providing lower operating costs and greater capability.

In embodiments, a PTO device can be mounted to a driveline, such as a transmission. A power system can be charged, for example, a lead battery. Then, the power system can be utilized to power a device such as an HVAC system via the PTO device. Also, the power system can be utilized during start-up of an affiliated engine or vehicle prime mover.

In one example, a 48V PTO enables "anti-idle" technologies, such as no-idle hoteling with an e-driven AC compressor. Such an arrangement reduces green-house gasses when, for example, a sleeper cab of a long-haul tractor is placed in a hotel mode. However, the PTO is not limited to such a vehicle and the PTO can be applied to other vehicles.

Engine-off operations such as coasting or motoring can be used to regeneratively charge the 48V power system and/or mechanically power a shared load. Electricity can be routed to assist power steering during engine-off operations. Other aspects of engine-off operations, intelligent charging, electrical HVAC, and/or stop/start modes complement the disclosed PTO device. The PTO device improves fuel economy by converting otherwise wasted energy to usable electricity and achieves a reduction in green houses gases.

The design can eliminate other engine-mounted components to reduce vehicle weight and integration costs, and to reduce the engine system footprint. For example, it is possible to utilize a PTO device in lieu of one or more of a traditional alternator, starter, and/or AC compressor. In certain embodiments, redundant systems can also be eliminated. For example, some previously known systems include a first circuit relying on the engine for power to evaporative circuits and the air conditioning. Then, a second system is mounted for engine-off operations, which second system also includes an evaporation circuit and an air conditioning circuit.

In another example, the alternator port and AC compressor port can be removed from the engine, allowing for a reduction in component and integration costs, and reducing parasitic loads on the engine. In certain embodiments, aspects of a starter can be omitted, for example where the PTO device is utilized to start the engine. The auxiliary drive aspect of the PTO device can couple to the evaporator circuits and the air conditioner. In an example, the air conditioner does not couple through the engine, but through the PTO device. When needed, the AC compressor and electric alternator can be moved from engine-mounted to mounting on the PTO device, which may be mounted to an interface on the transmission.

An example auxiliary drive includes the air conditioner (AC) and/or other powered electrical systems. Regenerated coasting energy can be captured via the motor/generator coupled to the driveline, and later utilized to power electrical loads on the vehicle. An example system includes managed lead acid batteries. The electrical system can include an air-cooled system.

An example PTO device includes a motor/generator having a motor rating of 5 kW continuous output and 10 kW peak output. The motor can be used as part of the motor/generator. Various motor types are compatible with the disclosure, including permanent magnet type, wire-wound synchronous type, and induction motor type. External excitation can be applied to the wire-wound synchronous type motor. Other components can include a housing or other adapter for the PTO device, gearing to couple to the transmission or other driveline component to the PTO device, gearing to step up or down between the motor/generator, auxiliary drive, and/or transmission or driveline. An example PTO device includes a gear change actuator such as a gear selector, an inverter, a converter, and/or an electric steering circuit.

The disclosed PTO device variants provide numerous benefits, including in certain embodiments: capturing motive energy that would be otherwise lost, prime mover stop/start mode operation, intelligent charging, reduced system and system integration costs, and fuel savings. Certain embodiments include fewer engine-mounted components, reducing the engine footprint, and improving driver visibility around the engine via reductions in the mounting space. Certain embodiments provide for a reduced load on the serpentine belt. Certain embodiments provide for higher system power within the same footprint, and/or for greater utilization of system power and reduced overdesign of power to support variability in applications and duty cycles.

Referring to FIG. 1, an embodiment functional block diagram is provided for a PTO device configured with a prime mover 102 (e.g., an internal combustion engine) coupled with a transmission 104. An electronic control unit (ECU) 122 may provide control functions to the prime mover 102 and a transmission control unit (TCU) 120 may provide control functions to the transmission 104. In embodiments, the PTO device may include a motor/generator (M/G) 112 and a load 110 (e.g., an HVAC system) drivingly coupled by a gear box 108 that is further drivingly coupled to the transmission 104 through the PTO device 106. The motor/generator 112 is provided drive and control signals from a motor drive converter (MDC) 114 that is powered by a battery assembly 116 (e.g., with 48v and 12v supply voltages). The battery assembly 116 may be managed by a battery management system (BMS) 118. The description including various controllers 122, 120, 114 is a non-limiting example, and control functions of a system may be distributed in any manner. In certain embodiments, control functions described throughout the present disclosure may be present in an engine controller, transmission controller, vehicle controller (not shown), a motor drive controller 114, and/or distributed among various devices. In certain embodiments, control functions described throughout the present disclosure may be performed, at least in part, in a separate controller remote from the vehicle—for example from a controller at least intermittently in communication with the vehicle, in a service tool, in a manufacturing tool, and/or on a personal device (e.g., of an operator, owner, fleet personnel, etc.).

Figure 2:
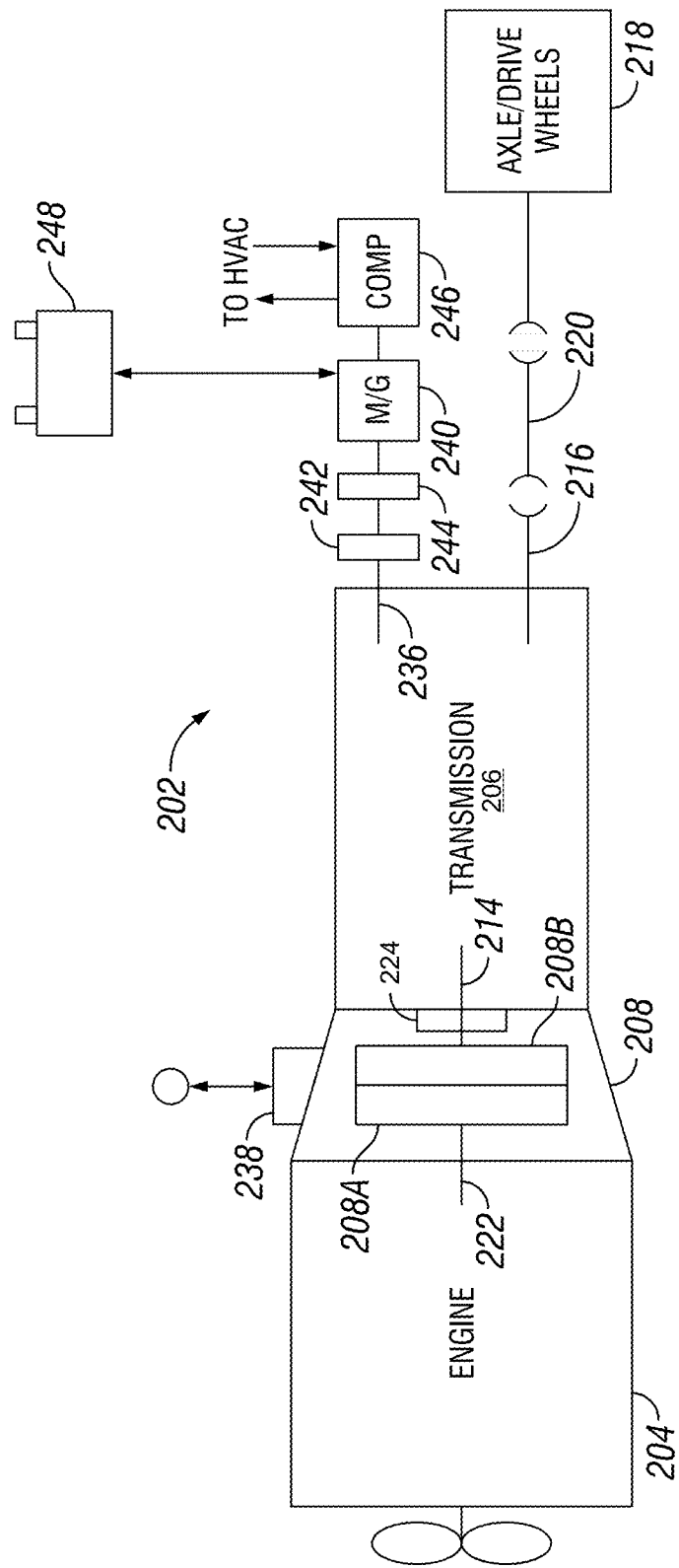
FIG. 2 is a schematic of driveline including an engine and a transmission having a PTO device with a motor/generator coupled to a countershaft according to one example of the present disclosure.

With reference to FIG. 2, an example system 202 constructed in accordance to one example of the present disclosure is schematically depicted. The example system 202 includes a prime mover 204 (e.g., a diesel engine), a transmission 206, and a clutch 208 positioned therebetween that selectively couples the prime mover 204 to the transmission 206. The example transmission 206 may be of the compound type including a main transmission section connected in series with a splitter (e.g., forward gear layers on the input shaft 214) and/or range-type auxiliary section (e.g., rearward gear layers to the output shaft 216). Transmissions of this type, especially as used with heavy duty vehicles, typically have 9, 10, 12, 13, 16 or 18 forward speeds. A transmission output shaft 216 extends outwardly from the transmission 206 and is drivingly connected with vehicle drive axles 218, usually by means of a drive shaft 220.

The clutch 208 includes a driving portion 208A connected to an engine crankshaft/flywheel 222, and a driven portion 208B coupled to the transmission input shaft 214, and adapted to frictionally engage the driving portion 208A. An electronic control unit (ECU) may be provided for receiving input signals and for processing same in accordance with predetermined logic rules to issue command output signals to the transmission system 202. The system 202 may also include a rotational speed sensor for sensing rotational speed of the engine 204 and providing an output signal (ES) indicative thereof, a rotational speed sensor for sensing the rotational speed of the input shaft 214 and providing an output signal (IS) indicative thereof, and a rotational speed sensor for sensing the speed of the output shaft 216 and providing an output signal (OS) indicative thereof. The clutch 208 may be controlled by a clutch actuator 238 responding to output signals from the ECU.

An example transmission 206 includes one or more mainshaft sections (not shown). An example mainshaft is coaxial with the input shaft 214, and couples torque from the input shaft 214 to the output shaft 216 using one or more countershafts 236. The countershaft(s) 236 are offset from the input shaft 214 and the mainshaft, and have gears engaged with the input shaft 214 and the mainshaft that are selectably locked to the countershaft 236 to configure the ratios in the transmission 206.

An example mainshaft is coupled to the output shaft 216, for example utilizing a planetary gear assembly (not shown) which has selected ratios to select the range.

In embodiments of the present disclosure, a motor/generator 240 can be selectively coupled to the driveline, for example through torque coupling to the countershaft 236. Example and non-limiting torque coupling options to the driveline include a spline shaft interfacing a driveline shaft (e.g., the countershaft 236), a chain assembly, an idler gear, and/or a lay shaft. As will become appreciated herein, the motor/generator 240 is configured to run in two opposite modes. In a first mode, the motor/generator 240 operates as a motor by consuming electricity to make mechanical power. In the first mode the vehicle can be moved at very low speeds (such as less than 2 MPH) from electrical power, depending upon the gear ratios between the motor/generator 240 and the driveline. Traditionally, it is difficult to controllably move a commercial long-haul class 8 vehicle at very low speeds, especially in reverse using the clutch 208.

Figure 3:
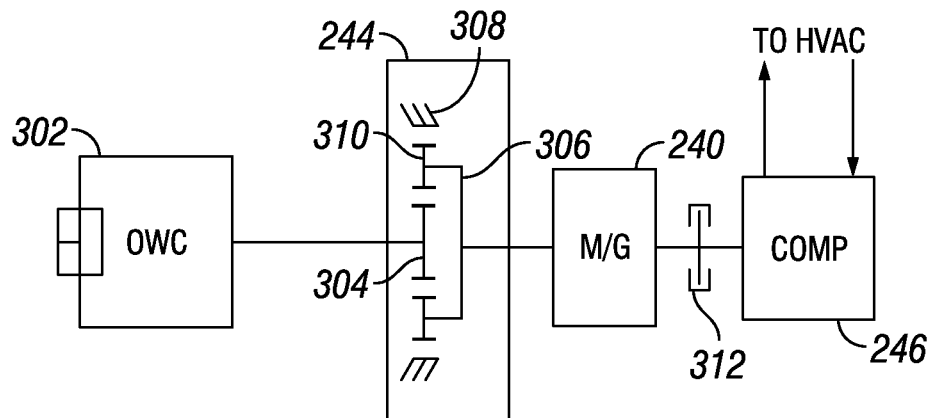
FIG. 3 is a schematic illustration of a PTO device consistent with the schematic of FIG. 2.

In a second mode, the motor/generator 240 operates as a generator by consuming mechanical power to produce electricity. In one configuration a clutch 242 (which may be a controllable clutch and/or a one-way clutch) and a planetary gear assembly 244 can be coupled between the second countershaft 236 and the motor/generator 240. The planetary gear assembly 244 can be a speed-up gear assembly having a sun gear 304. A planetary carrier 306 is connected to or integral with the second countershaft 236, which is connected drivably to the motor/generator 240. A ring gear 308 (reference FIG. 3) engages planet pinions 310 carried by the carrier 306. In an example, the planetary gear assembly 244 can fulfill requirements of a 21:1 cold crank ratio, for example to crank the engine 204 when the motor/generator 240. An example motor/generator 240 includes motor/generator 240 as a 9 kW Remy 48V motor.

By way of example only, the motor/generator 240 can be a 6-20 kW, 24-48 volt motor. The motor/generator 240 can be ultimately driven by the second countershaft 236 and be connected to an HVAC compressor 246 through a clutch 312. The compressor 246 can then communicate with components of the HVAC as is known in the art. The motor/generator 240 can charge a battery 248 in an energy storage mode, and be powered by the battery 248 in an energy use mode.

Various advantages can be realized by mounting the motor/generator 240 to the countershaft 236 of the transmission 206. In one operating mode, as will be described in greater detail below, the engine can be turned off (defueled) while the vehicle is still moving or coasting and the motor/generator 240 is regenerating resulting in up to three percent fuel efficiency increase. In other advantages, the battery 248 (or batteries) can be mounted in an engine compartment near the motor/generator 240 reducing battery cable length over conventional mounting configurations. Moreover, various components may be eliminated with the transmission system 202 including, but not limited to, a starter, an alternator, and/or hydraulic power steering. In this regard, significant weight savings may be realized. In some arrangements, the transmission system 202 can be configured for use on vehicles with electric steering and/or other pumps or compressors.

The controller 224 can operate the transmission system 202 in various operating modes. In a first mode, the controller 224 operates the clutch 208 in an open condition with the transmission 206 in gear. In the first mode or engine off coasting, the controller turns the engine off or defuels the engine 204 while the vehicle is moving based on vehicle operating conditions and routes rotational energy from the output shaft 216, through the second countershaft 236 and into the motor/generator 240. According to various examples, the vehicle operating conditions can include input signals related to any operating conditions including but not limited to a global positioning system (GPS) signal, a grade sensor signal and/or a vehicle speed sensor signal. As can be appreciated, it would be advantageous to run the transmission system 202 in the first mode when the vehicle is travelling downhill. Elevation changes can be attained from a GPS signal and/or a grade sensor for example.

In a second mode, the controller 224 operates the clutch 208 in a closed condition with the transmission 206 in neutral. In the second mode, the controller 224 can facilitate engine start and idle generation. In a third mode, the controller 224 operates the clutch 208 in a closed condition and the transmission 206 in gear. The third mode can be used for normal cruising (e.g., driving or vehicle motion) and generation.

Additional operating modes provided by the transmission system 202 specific to engagement and disengagement with the compressor 246 will be described. As used herein, the modes are described as a "crank mode", a "creep mode", a "driving with no HVAC mode", a "driving with HVAC mode," and a "sleep mode". In certain embodiments, driving modes are referenced herein as a "cruise mode" and/or as a "motive load powered mode." These modes are described in sequence below.

In an example, in the crank mode, a high ratio (e.g., 21:1) between the countershaft 236 and the motor/generator 240 is provided. Other ratios are contemplated. The HVAC compressor 246 would be disengaged such as by the clutch 312. The transmission 206 would be in neutral with the clutch 208 closed. The motor/generator 240 would turn the engine 204 with sufficient torque to crank the engine 204.

In an example, in the creep mode, a high ratio (e.g., 21:1) between the countershaft 236 and the motor/generator 240 is provided. Other ratios are contemplated. The HVAC compressor 246 would be disengaged such as by the clutch 312. The transmission 206 would be in first gear or low reverse gear. The clutch 208 would be held open with the engine 204 stopped (or idling). The motor/generator 240 would have sufficient torque to move the vehicle in forward or reverse such as at 0 MPH to 2 MPH with outstanding speed and torque control, allowing a truck to back into a trailer or a dock without damage. The utilization of the motor/generator 240 in the creep mode provides for a highly controllable backing torque output, and greater ease of control by the operator.

In an example, in the driving with no HVAC mode, a medium ratio (e.g., 7:1) between the countershaft 236 and the motor/generator 240 is provided. Other ratios are contemplated. The HVAC compressor 246 would be disengaged such as by the clutch 312. The transmission 206 would be in the appropriate gear and the clutch 208 would be closed while propelling the vehicle, and open with the engine off when motoring or coasting.

In an example, in the driving with HVAC mode, a medium ratio (e.g., 7:1) between the countershaft 236 and the motor/generator 240 is provided. The HVAC compressor 246 would be engaged with a selected ratio (e.g., 3.5:1) to the motor/generator 240. The transmission 206 would be in the appropriate gear, and the clutch 208 would be closed while propelling the vehicle, and open with the engine 204 off when motoring or coasting. The HVAC system is directly driven by the engine or the driveline, eliminating the efficiency loss of converting power to electricity and back to work. Also, the HVAC system could provide cooling in the engine off mode, converting the inertia of a vehicle on a downgrade to cooling for additional energy recovery, improving fuel savings.

In the sleep mode, the motor/generator 240 would be disconnected from the countershaft 236. The motor/generator 240 would be coupled to the HVAC compressor 246 through a selected ratio (e.g., 3.5:1). The motor/generator 240 uses energy previously stored in the battery 248 during the driving portion of the cycle to operate the HVAC. This provides the cooling function without the addition of a separate motor and power electronics to power the HVAC compressor, and/or without the addition of a separate HVAC compressor capable of being powered by an APU, electrically, or the like. A number of mechanical solutions involving sliding clutches, countershaft type gears, concentric shafts with selectable gear engagements, and planetary gears can be used to obtain the selected ratios in each operating mode. In certain embodiments, a single actuator is used to change between the above the described modes.

Figure 4:
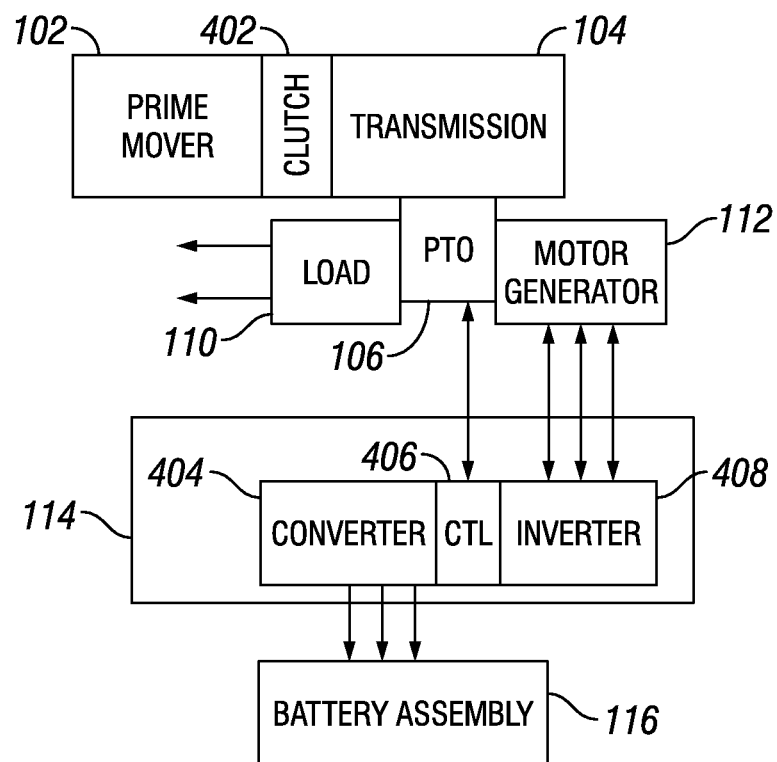
FIG. 4 is a functional block diagram for an electrically regenerative accessory drive in an embodiment of the present disclosure.

Referring to FIG. 4, a schematic block diagram of a PTO device is presented. Here, the prime mover 102 (e.g., engine) is drivingly coupled to the transmission 104 through a clutch 402. The motor/generator 112 selectively couples to the load 110 and to the transmission 104 via a torque coupling (e.g., PTO 106, which may include gear box 108). The MDC 114 is shown as including a DC-to-DC converter 404, a controller 406, and an inverter 408, where the converter 404 provides control signals to the battery assembly 116, the controller 408 provides control signals to the PTO 106, and the inverter 408 provides phased power to the motor/generator 112.

In embodiments, a PTO device coupled with a transmission 104 and prime mover 102 may support different modes of operation, such as cruise mode (e.g., accessories driven by an engine), motive load mode (e.g., accessories driven by wheels in an engine-off down-grade condition of travel), sleep mode (e.g., motor/generator operating as motor drives an HVAC with the engine off), crank mode (e.g., starting engine from the motor/generator operating as a motor, such as with a low PTO gear needed for crank-torque), creep mode (e.g., motor/generator operating as motor drives truck in low-PTO precision backing (e.g., 0-2 mph)), and the like. It will be understood that mode names are provided for clarity of description, and are not limiting to the present disclosure. Additionally or alternatively, in certain embodiments and/or in certain operating conditions, the arrangements and/or configurations of the driveline (e.g., engine, transmission, and/or wheels) may not be known to the PTO device, and/or may not be important to the PTO device. For example, in the example cruise mode and motive load mode, the driveline provides power for the shared load 110, and the PTO device may be arranged to transfer power from the driveline to the load 110 in either of these modes. In certain embodiments, the PTO device may perform distinct operations in a mode even where the power transfer arrangements are the same, and the arrangements and/or configurations of the driveline may be known and considered by the PTO device (and/or a controller of the PTO device). For example, the PTO device may have a controller configured to determine the amount of time the vehicle operates in the cruise mode relative to the motive load mode, and accordingly the controller may make duty cycle determinations, battery charging determinations, or perform other operations in response to the time spent in each mode.

Figure 5:
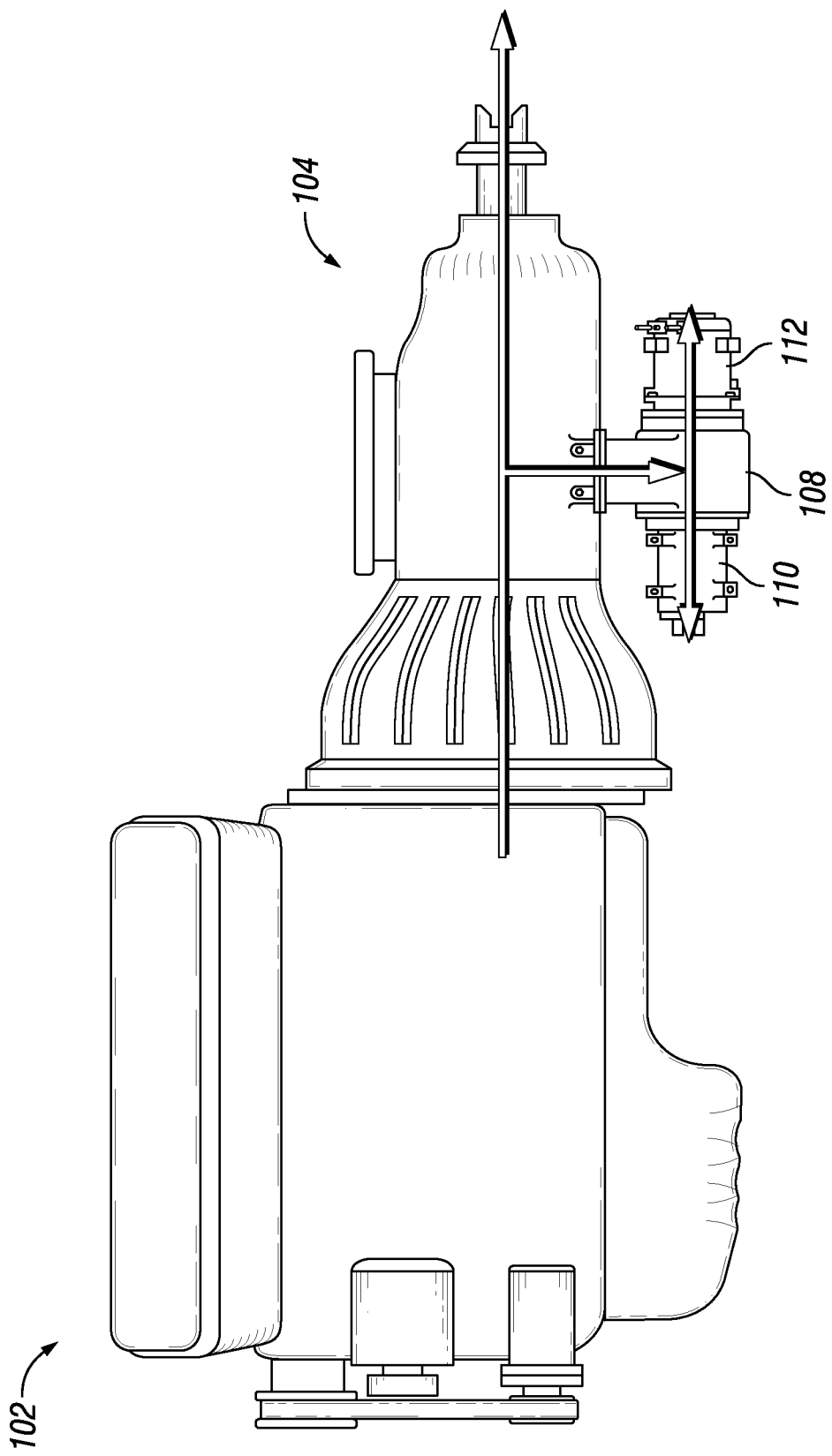
FIG. 5 illustrates a cruise configuration in an embodiment of an electrically regenerative accessory drive.

Referencing FIG. 5, power flows for an example PTO device operating in a cruise mode with a prime mover 102 and transmission 104 are depicted. In the example cruise mode, the PTO device provides for efficient powering of the load 110 through a mechanical coupling to the drive line. In an example, a vehicle equipped with a PTO device may be able to efficiently provide power to the load 110 from the prime mover 102, and further power the motor/generator 112 operating as a generator for producing electrical energy to the electrical system including for example charging a battery assembly 116 to store energy for future use in another operating mode.

Figure 6:
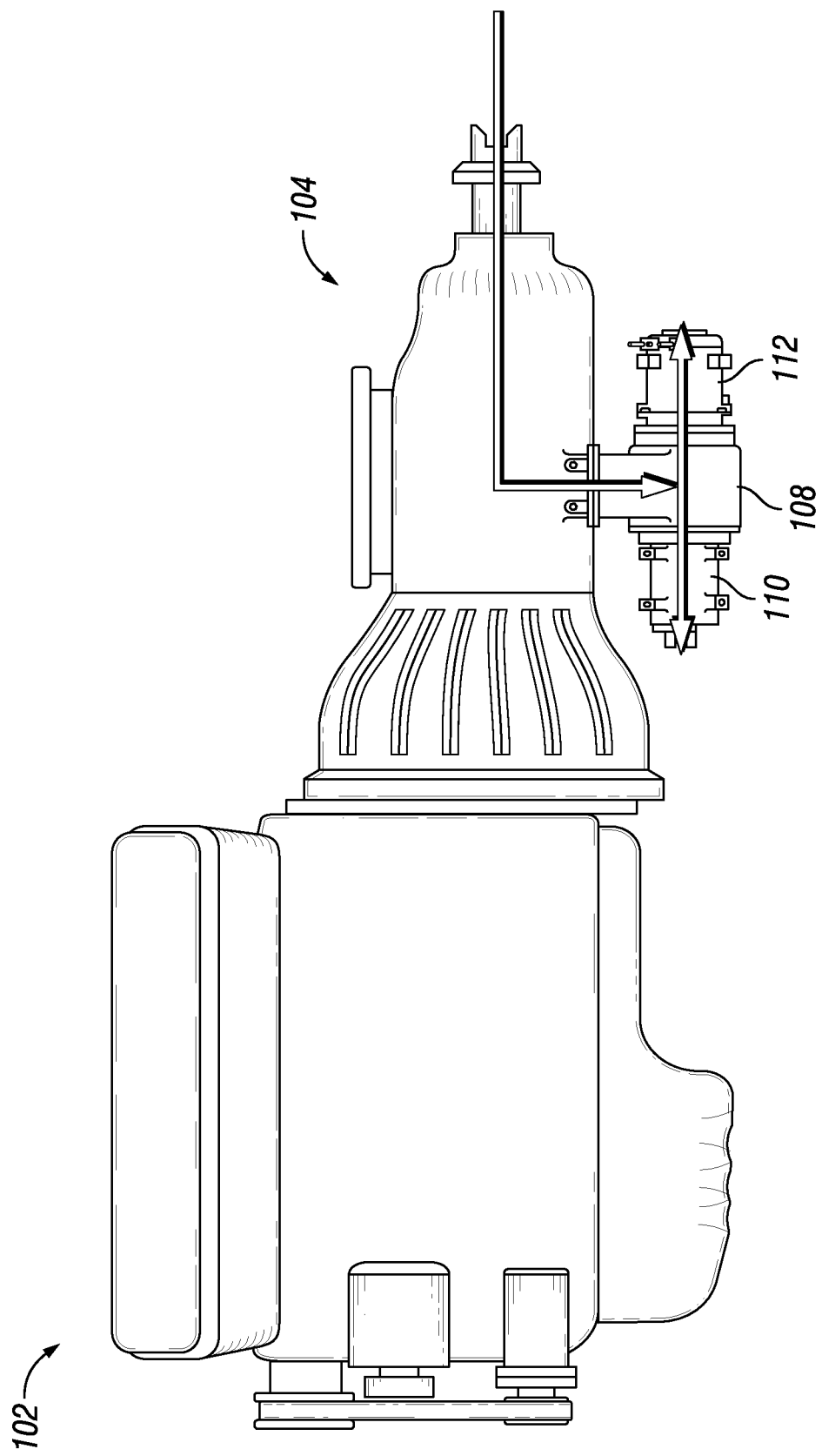
FIG. 6 illustrates a motive load powered configuration in an embodiment of an electrically regenerative accessory drive.

Referencing FIG. 6, power flows for an example PTO device operating in a motive load powered mode (e.g., where the motive load such as kinetic energy through the wheels is being used to power devices) is depicted. In the example motive load powered mode, the PTO device may be able to efficiently provide power to the load 110 from the motive load, and further power the motor/generator 112 operating as a generator for producing electrical energy to the electrical system including for example charging a battery assembly 116 to store energy for future use in another operating mode.

Figure 7:
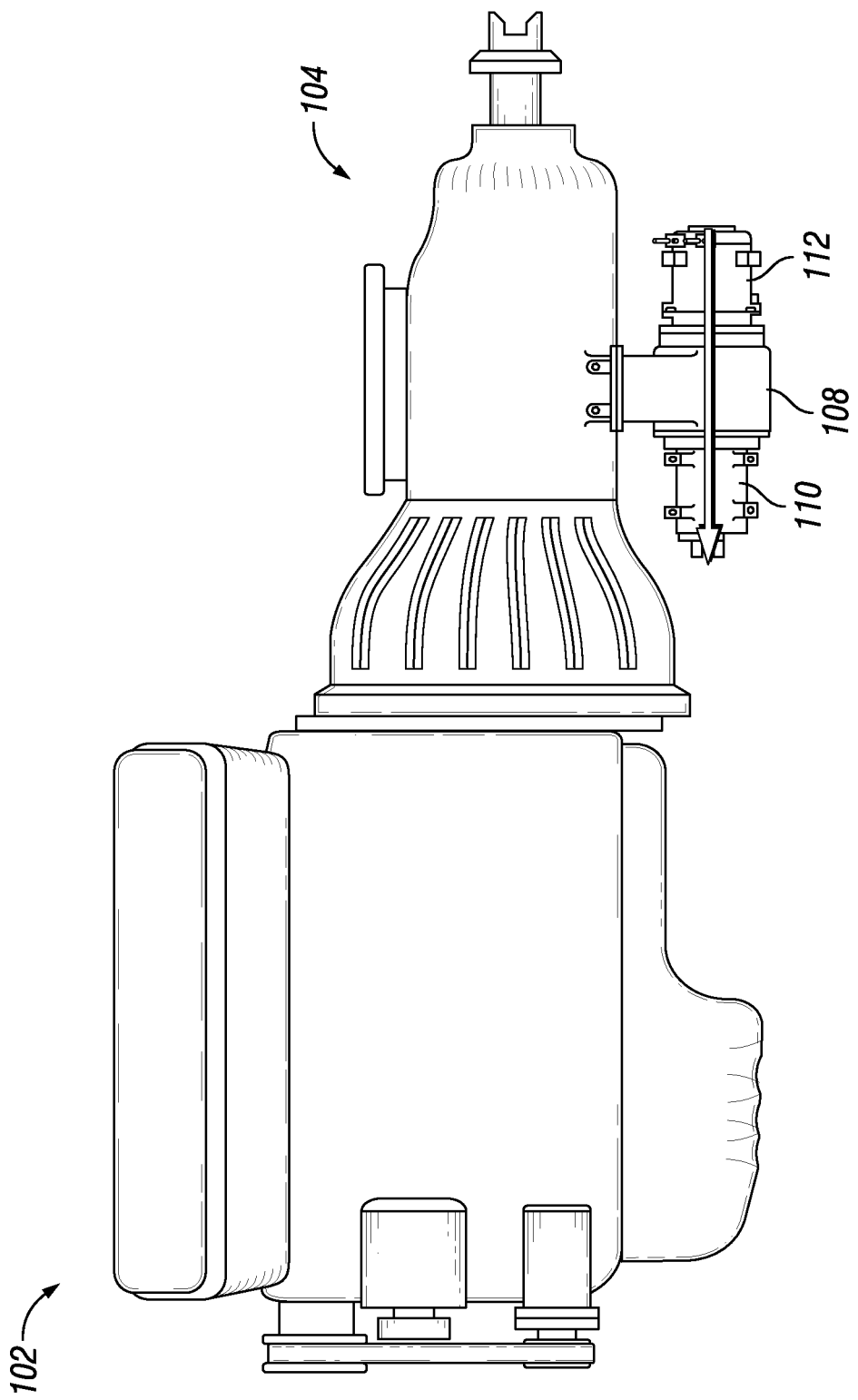
FIG. 7 illustrates a neutral or sleep configuration in an embodiment of an electrically regenerative accessory drive.

Referencing FIG. 7, power flows for an example PTO device operating in a sleep mode (e.g., where the driveline is not capable of providing power to loads, and/or where operating conditions make driveline power undesirable) are depicted. In certain embodiments, the sleep mode may be utilized when motive loads are not available (e.g., the vehicle is not moving) and/or when the prime mover is not turning. In certain embodiments, the sleep mode may be utilized when torque engagement with the driveline is not desired—for example during shifting operations, when the prime mover is motoring but a vehicle speed is below a vehicle speed target, etc. In the example sleep mode, the PTO device is de-coupled from the driveline, and the motor/generator 112 powers the load 110 using stored energy from the electrical system, such as the battery assembly 116.

Figure 8:
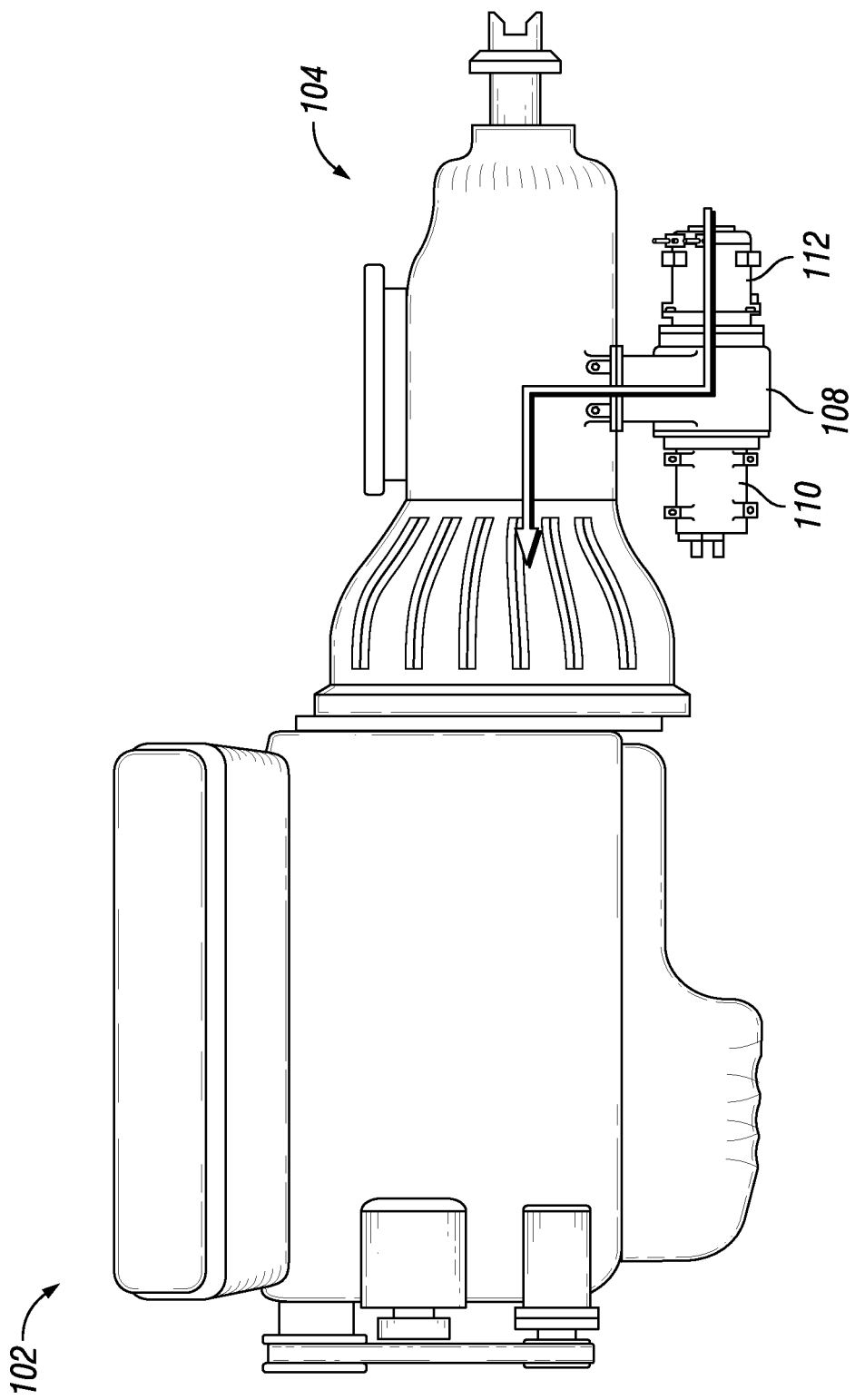
FIG. 8 illustrates a crank configuration in an embodiment of an electrically regenerative accessory drive.

Referencing FIG. 8, power flows for an example PTO device operating in a crank mode (e.g., where the prime mover 102 is not yet started) are depicted. The example crank mode of FIG. 8 depicts the motor/generator 112 providing power to the driveline, and the load 110 is de-coupled from the motor/generator 112 and the driveline.

Figure 9:
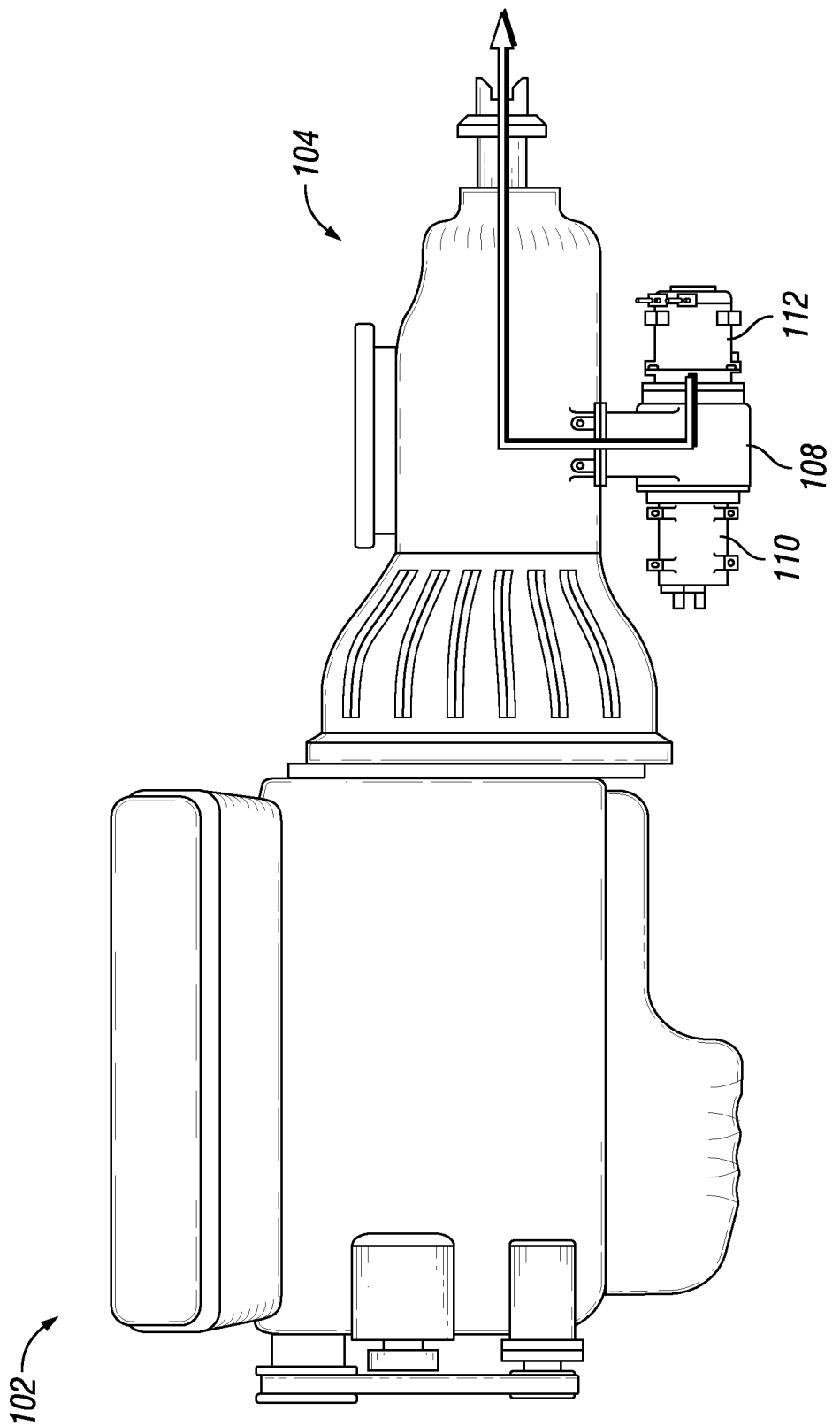
FIG. 9 illustrates a creep configuration in an embodiment of an electrically regenerative accessory drive.

Referencing FIG. 9, power flows for an example PTO device operating in a creep mode (e.g., where the motor/generator 112 provides motive power to the driveline) are depicted. The example creep mode of FIG. 9 depicts the motor/generator 112 providing power to the driveline, and the load 110 is de-coupled from the motor/generator 112 and the driveline. It can be seen that, in certain embodiments, the PTO device operates in the same manner in the crank mode as in the creep mode, and the system including the driveline enforces whether motor/generator 112 power to the driveline is applied to the motive load (e.g., the wheels) or to the prime mover 102. In certain embodiments, for example where the PTO device enforces a reverse or forward position, where the PTO device uses a different gear ratio between the PTO device and the driveline in the crank mode versus the creep mode, where a controller of the PTO device notifies the system that a creep mode is being engaged, and/or where a torque response of the motor/generator 112 changes between the crank mode and the creep mode, the PTO device may operate in a different manner in the crank mode versus the creep mode.

Figure 10:
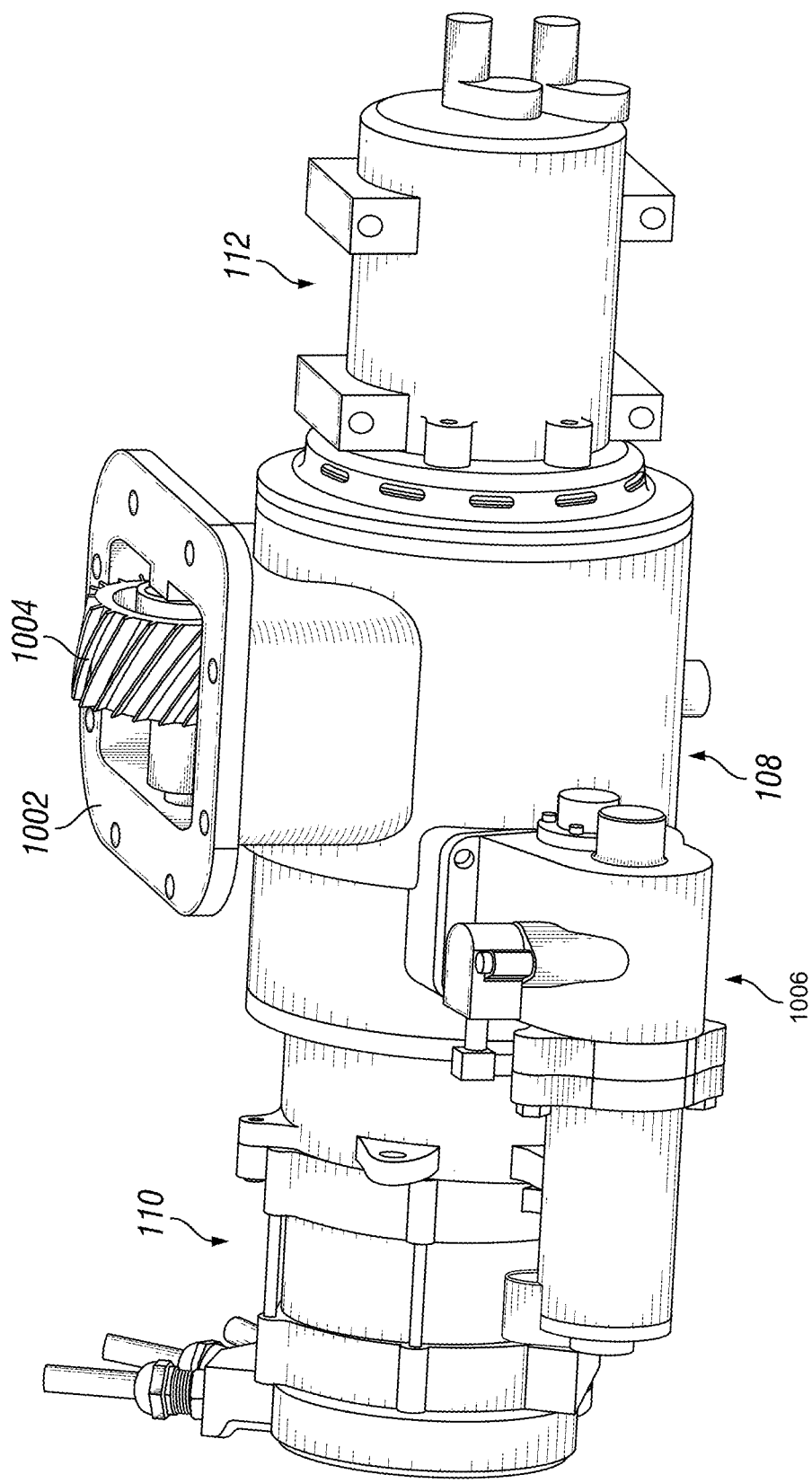
FIG. 10 illustrates a physical representative embodiment for components in an electrically regenerative accessory drive.

Referencing FIG. 10, an example perspective illustration of the mechanical layout of a PTO device is depicted. The example PTO device is configured to mount to a transmission at a PTO interface—for example to an 8-bolt PTO interface at the flange 1002. The example PTO device includes a gear box 108, which may be a planetary gear assembly. The example PTO device includes a torque coupling (idler gear 1004 in the example), a motor/generator 112, and a load 110. The example PTO device further includes a shift actuator 1006 configured to arrange the gear box 108 to provide the desired power flow arrangement.

Figure 11:
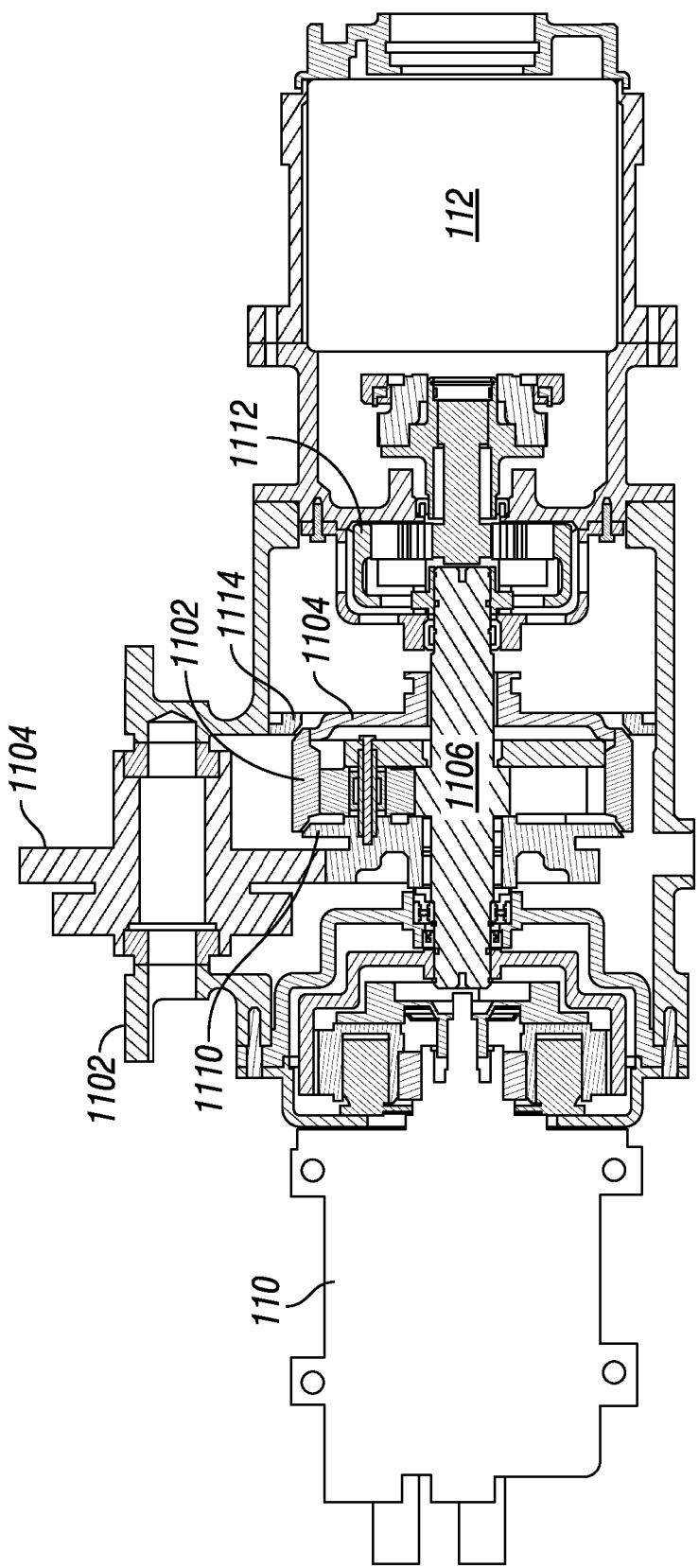
FIG. 11 illustrates a cross-sectional view of a physical representative embodiment for components in a neutral configuration in an electrically regenerative accessory drive.

Referencing FIG. 11, a cutaway view of a PTO device is depicted, consistent in certain embodiments with the example depicted in FIG. 10. In the example of FIG. 11, the shift actuator 1006 is in a "neutral" position, which prevents torque interaction between the idler gear 1004 and either the load 110 or the motor/generator 112. Any arrangement of a gear box 108 and/or PTO device is contemplated herein. In the example of FIG. 11, the idler gear 1004 is driven by the driveline, and engages a driven gear 1110. Further to the example of FIG. 11, ring gear 1102 allows the planetary gears coupled to the driven gear 1110 to rotate freely in the neutral position, and accordingly the load drive shaft 1106 does not receive or provide torque to the driveline. The motor/generator 112 in the example of FIG. 11 is coupled to the load drive shaft 1106 in a ratio determined through planetary gear set 1112, and accordingly the motor/generator 112 is capable to selectively drive the load 110. In certain embodiments, the motor/generator 112 may be de-couplable from the load drive shaft 1106, for example with a clutch (not shown). In the example of FIG. 11, sliding clutch 1104 is moved by the shift actuator 1006 to arrange the gear box 108 and/or planetary gear assembly. In the example of FIG. 11, stationary ring gear 1114 is present for engagement with the ring gar 1102, although stationary ring gear 1114 is not engaged with the ring gear 1102 in the neutral position depicted in FIG. 11. In certain embodiments, the example of FIG. 11 is consistent with a sleep mode operation.

Figure 12:
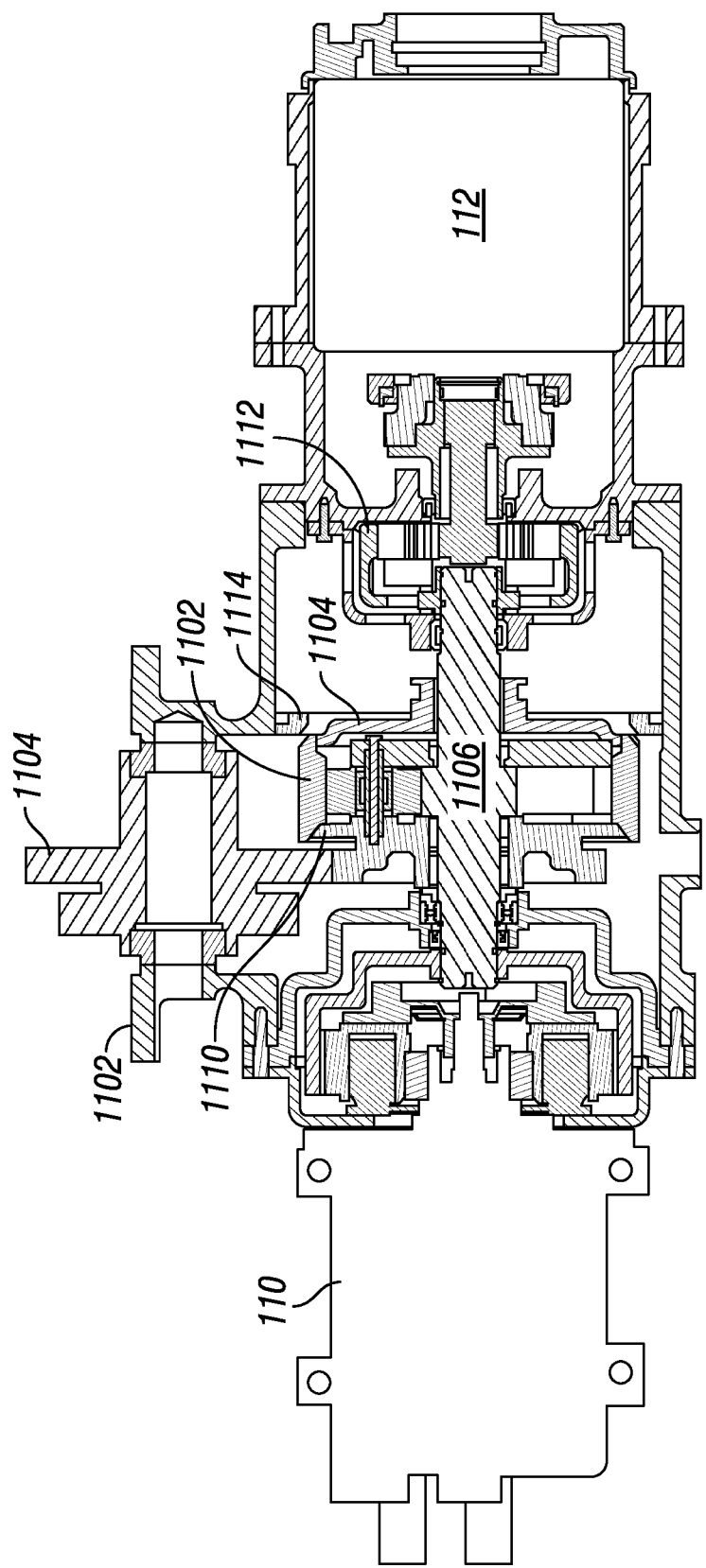
FIG. 12 illustrates a cross-sectional view of a physical representative embodiment for components configured with a shifter positioned toward a load in an electrically regenerative accessory drive.

Referencing FIG. 12, the cutaway view of the PTO device is depicted, consistent with the device of FIG. 11. In the example of FIG. 12, the shift actuator 1006 is in a "toward load" position, which engages ring gear 1112 (an inner ring gear, in the example of FIG. 12) with the driven gear 1110, and the ring gear 1112 is driven by the driven gear 1110. In the example of FIG. 12, the idler gear 1004 transfers torque between the driveline and the driven gear 1110, and due to the coupling with the ring gear 1112 rotates the load drive shaft 1106. In the example of FIG. 12, the motor/generator 112 and/or the load 110 are capable to be driven by the driveline, and/or may be selectably de-coupled from the load drive shaft 1106 (e.g., with a clutch). In certain embodiments, the example of FIG. 12 is consistent with a cruise mode and/or driving mode operation.

Figure 13:
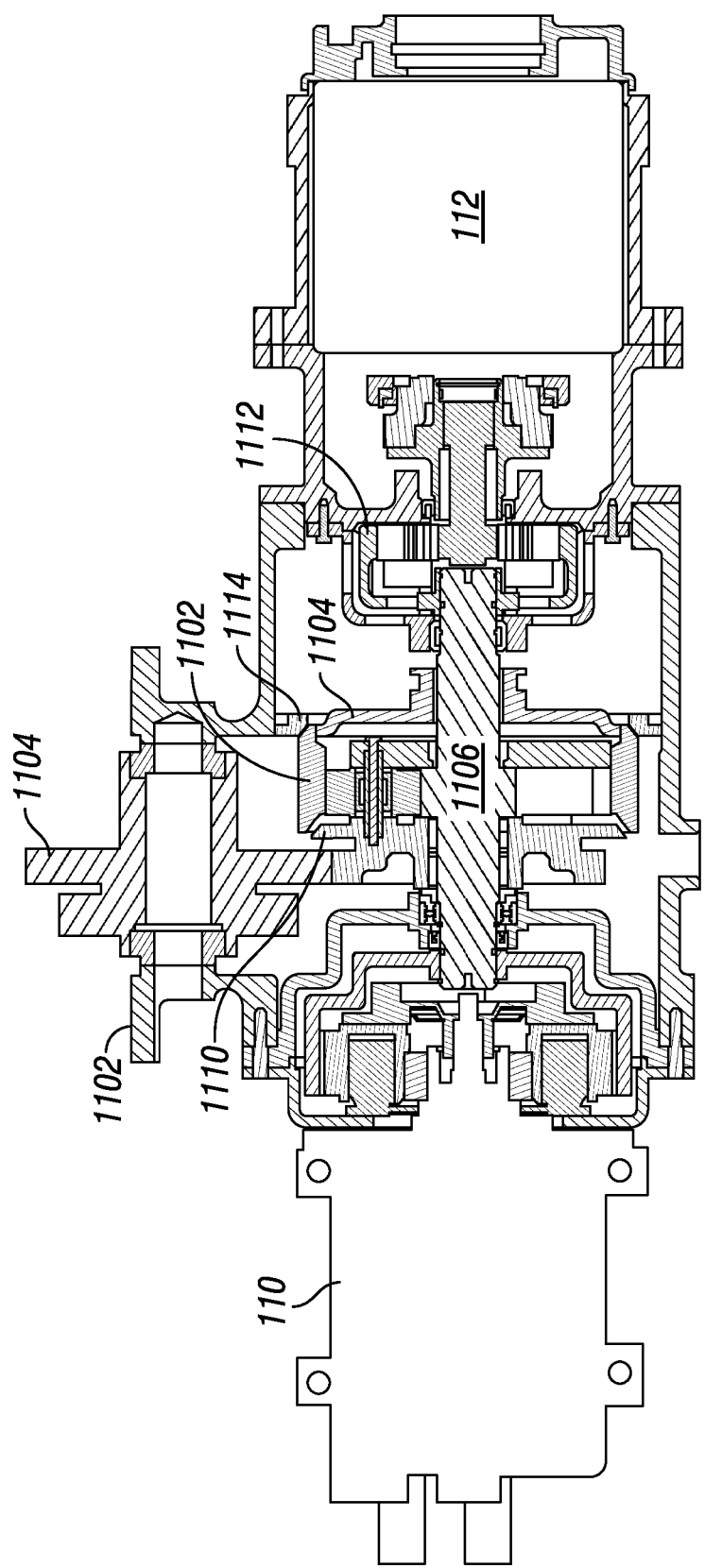
FIG. 13 illustrates a cross-sectional view of a physical representative embodiment for components configured with a shifter positioned toward a motor/generator in an electrically regenerative accessory drive.

Referencing FIG. 13, the cutaway view of the PTO device is depicted, consistent with the device of FIG. 11. In the example of FIG. 13, the shift actuator 1006 is in a "toward motor" position, which engages ring gear 1112 (an outer ring gear, in the example of FIG. 13) with the stationary ring gear 1114, locking the ring gear 1112 from rotating. In the example of FIG. 13, and the load drive shaft 1106 can thereby drive the driven gear 1110 in a reduction ratio determined by the planetary gearing coupled to the driven gear 1110. In the example of FIG. 13, the motor/generator 112 is capable to power the driveline in a selected ratio, and in certain embodiments the load 110 is de-coupled form the load drive shaft 1106 in the position of FIG. 13. In certain embodiments, the example of FIG. 13 is consistent with either a crank mode and/or a creep mode operation.

Figure 14:
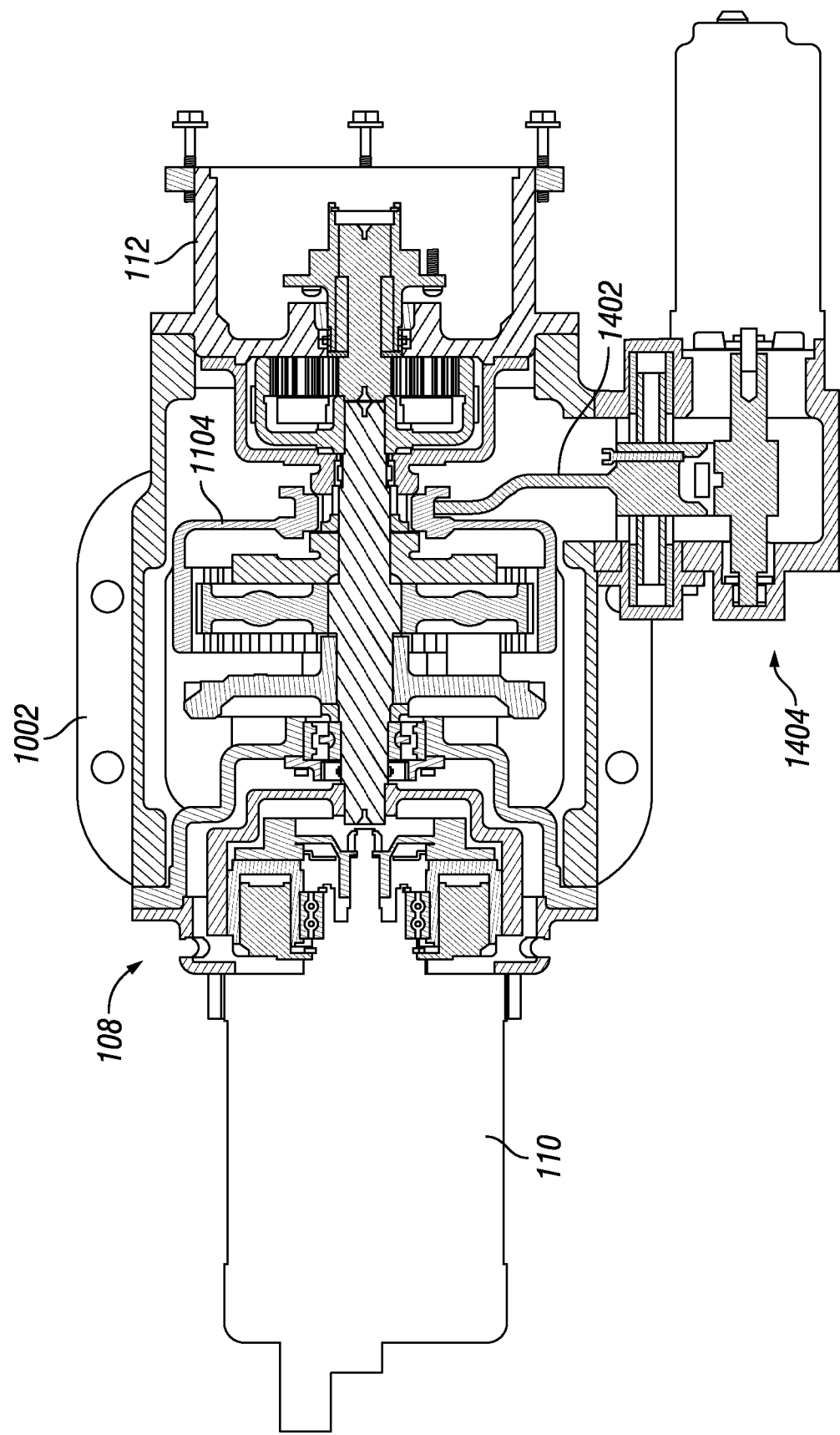
FIG. 14 illustrates a cross-sectional view of a physical representative embodiment for components including a shift-actuator in an electrically regenerative accessory drive.

Referencing FIG. 14, another cutaway view of the PTO device is depicted, consistent with the device of FIG. 11, at a different cutaway angle to depict certain aspects of the shift actuator 1006 (shown as cutaway shift actuator 1404). The cutaway shift actuator 1404 drives a shift fork 1402 that engages the sliding clutch 1104, thereby controlling the position of the PTO device gear box 108. Referencing FIG. 15, a PTO device 1500 is shown schematically in a cutaway view. It can be seen that the ratios of the planetary gear assembly, including the planetary gear between the motor/generator 112 and the load drive shaft 1106, the planetary gear between the load 110 and the load drive shaft 1106, and the planetary gear associated with the driven gear 1110, can be utilized to select gear ratios for various power flows through the PTO device 1500. Additionally, a gear ratio between the idler gear 1004 and an engaged gear (e.g., one of the gears on a countershaft of the transmission), and/or a gear ratio between the idler gear 1004 and the driven gear 1110, are design selections that affect the gear ratios of power flows through the PTO device 1500. The example PTO device 1500, including the utilization of one or more planetary gears in a planetary gear assembly, is a non-limiting example to illustrate a device capable to perform certain operations described throughout the present disclosure. An example PTO device can include any type of torque coupling arrangements and/or gear ratio selections (including run-time and/or design selections).

One of skill in the art, having the benefit of the disclosure herein, will understand that gear ratio selections, including both actable run-time options and fixed design time selections, can be made to support a number of operating modes, loads, and the like. Certain considerations for determining gear ratio selections include, without limitation: the torque profile and operating parameters of the motor/generator; the torque requirements of the driveline including PTO torque and power limitations; the torque capabilities of the driveline including the prime mover and/or transmission; cranking torque and speed requirements of the prime mover; final gear ratios to the wheels or motive load; the torque, speed, and power requirements of the shared load; the available installation space for the PTO device; the driveline engagement options for the system (e.g., transmission PTO interfaces and available gears for coupling); the operating modes to be supported; the torque and speed maps of various devices in the system (e.g., the prime mover, the motor/generator, the transmission, and/or the vehicle system in use); the duty cycle of the vehicle and/or PTO device; offsetting costs and/or space savings from omitted devices due to the PTO device; and/or the commercial sensitivities of the system having the PTO device to capital expenditures, engineering and integration costs, and operating costs.

Figure 16:
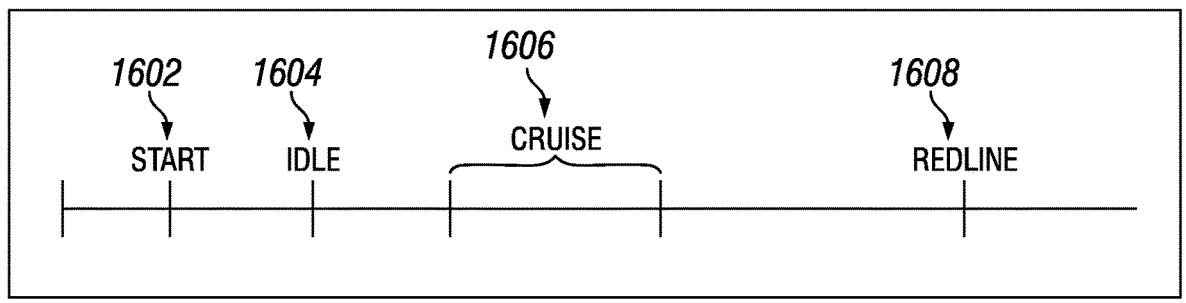
FIG. 16 depicts driveline speed ranges for an electrically regenerative accessory drive in an embodiment of the present disclosure.

Referencing FIG. 16, example operating speed ranges for the prime mover 102 are depicted. Example operating speed ranges can be determined for any aspect of the driveline and/or the system, and can be utilized to determine desired capabilities for the motor/generator 112 and/or for selecting gear ratios in the PTO device. In the example of FIG. 16, an operating speed 1602 for "start" is depicted, which may, for example, be utilized to determine gear ratios and/or motor/generator 112 capabilities for a crank mode operation. An operating speed 1604 for "idle" is depicted, which may, for example, be utilized to determine requirements to support the load 110 (e.g., as the load 110 is generally designed for proper operation at a proportion of prime mover speed, with the idle speed as the lower normal operating limit). An operating speed 1606 for "cruise" is depicted, which may for example be utilized to determine motor/generator 112 capabilities for nominal charging operations (e.g., where the motor/generator 112 is being charged by the driveline in cruise operations). An operating speed 1608 for "redline" is depicted, which may for example be utilized to determine the highest prime mover 102 speed expected during operation of the vehicle. The actual values for the speed ranges 1602, 1604, 1606, 1608 are design considerations for a particular system, but a system can be configured with a PTO device for any speed ranges 1602, 1604, 1606, 1608.

An example PTO device includes one or more aspects to protect from an overspeed operation of the motor/generator 112. In an example, a 2-speed gearbox 108 is mounted on the PTO 106 with the motor/generator 112 and load (e.g., HVAC compressor) connected on either side. The motor/generator 112 is connected to the prime mover 102 (e.g., the engine) through a 28:1 speed ratio in the cranking mode. In an example, cranking speed of the prime mover 102 varies from 150 to 400 RPM, and in an example when the engine starts it speeds up (e.g., to 840 rpm). In certain embodiments, the clutch 108 is opened as soon as the engine starts (e.g., reaches a predetermined speed such as 400 RPM). The opening of the clutch 108 prevents the engine speed excursion from providing an overspeed condition to the motor/generator 112. Additionally or alternatively, a clutch (not shown) between the motor/generator 112 and the load drive shaft 1106 may be utilized to prevent an overspeed condition of the motor/generator 112.

The example 28:1 speed ratio (motor faster) eases the torque requirement on the motor/generator 112 (e.g., relative to a lower ratio such as 21:1), and allows for greater off-nominal starting capability (e.g., cold start, which may have a greater torque requirement). However, a greater speed ratio may increase the likelihood that a motor/generator 112 overspeed may result without overspeed protection aspects.

In certain embodiments, an operation to dis-engage the clutch 108 as soon as engine 102 starts is sufficiently responsive to prevent an overspeed event. For example, an engine may take 500 ms to overspeed to 840 rpm after start speed is reached, and a clutch response time can be between about 150 ms (e.g., for dis-engagement) to 250 ms (e.g., for engagement). The use of the clutch 108 may be desirable in certain embodiments where the designer of the PTO device also has access to controls of the clutch 108 and/or where appropriate communication messages to the transmission are available, and/or where the vehicle application allows utilization of the clutch 108 during start-up operations.

In another example, engine cranking is brought close to, or into, the idle range and/or the start range, before engine fueling is enabled. For example, where the start range is considered to be 400 rpm, the motor/generator 112 operating in the crank mode may bring the engine speed close to (e.g., 350-400 rpm) and/or into (e.g., 400-425 rpm) the start range before engine fueling is enabled. In a further example, such as where the engine idle speed is 500 rpm, the motor/generator 112 operating in the crank mode may bring the engine speed close to and/or into the idle range before engine fueling is enabled. The lower speed error (e.g., close to the start and/or idle speed) and/or negative speed error (e.g., above the start and/or idle speed) introduced by the crank operations reduces (or briefly eliminates) the fueling target by the fueling governor of the engine, reducing the engine speed overshoot and accordingly the tendency for the motor/generator 112 to experience an overspeed event. The use of engine fueling control may be desirable in certain embodiments where the designer of the PTO device also has access to the controls of the engine 102 and/or where appropriate communication messages to the engine are available.

In another example, the motor/generator 112 can be switched from the motoring mode to the generating mode as soon as the engine starts (e.g., reaches a start speed, reaches an idle speed, and/or begins fueling). Accordingly, the motor/generator 112 can directly dampen the engine speed excursion and reduce the tendency of the motor/generator 112 to overspeed. Additionally, energy harvested from the engine on startup can be stored in the battery assembly 116. Any or all of the described overspeed control operations and/or aspects may be included in a particular system.

Figure 17:
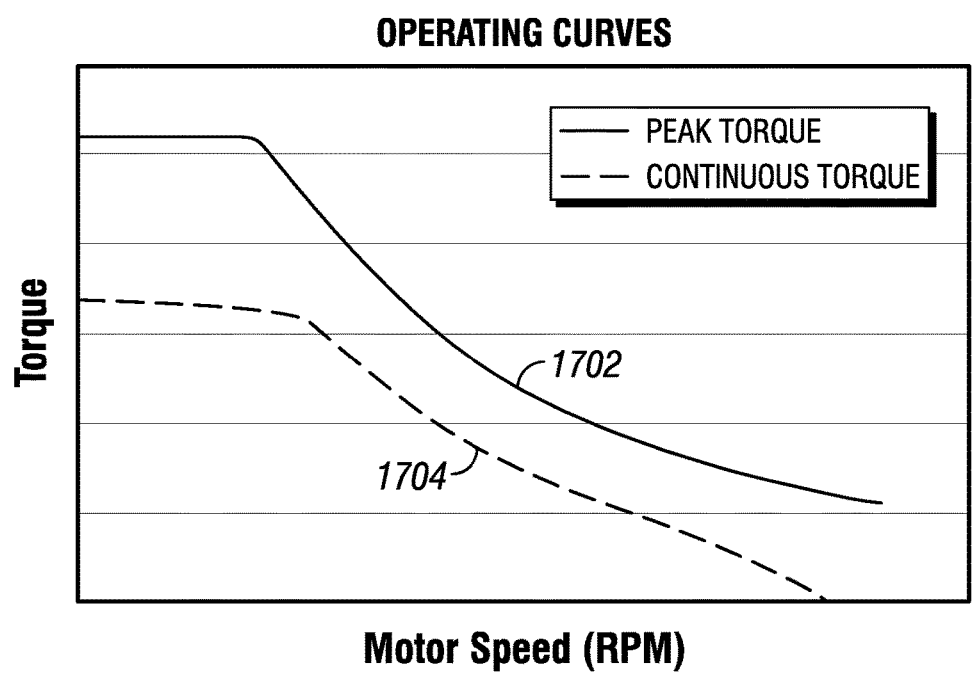
FIG. 17 depicts example operating curves for an electrically regenerative accessory drive in an embodiment of the present disclosure.
Figure 18:
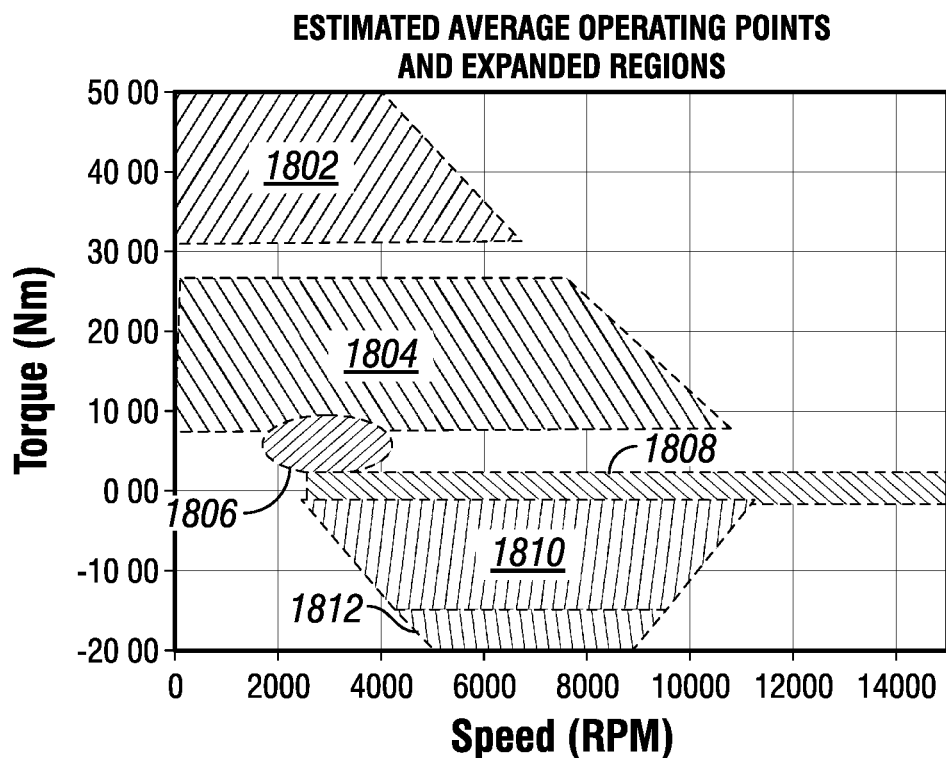
FIG. 18 depicts motor speed-torque ranges for an electrically regenerative accessory drive in an embodiment of the present disclosure.
Figure 19:
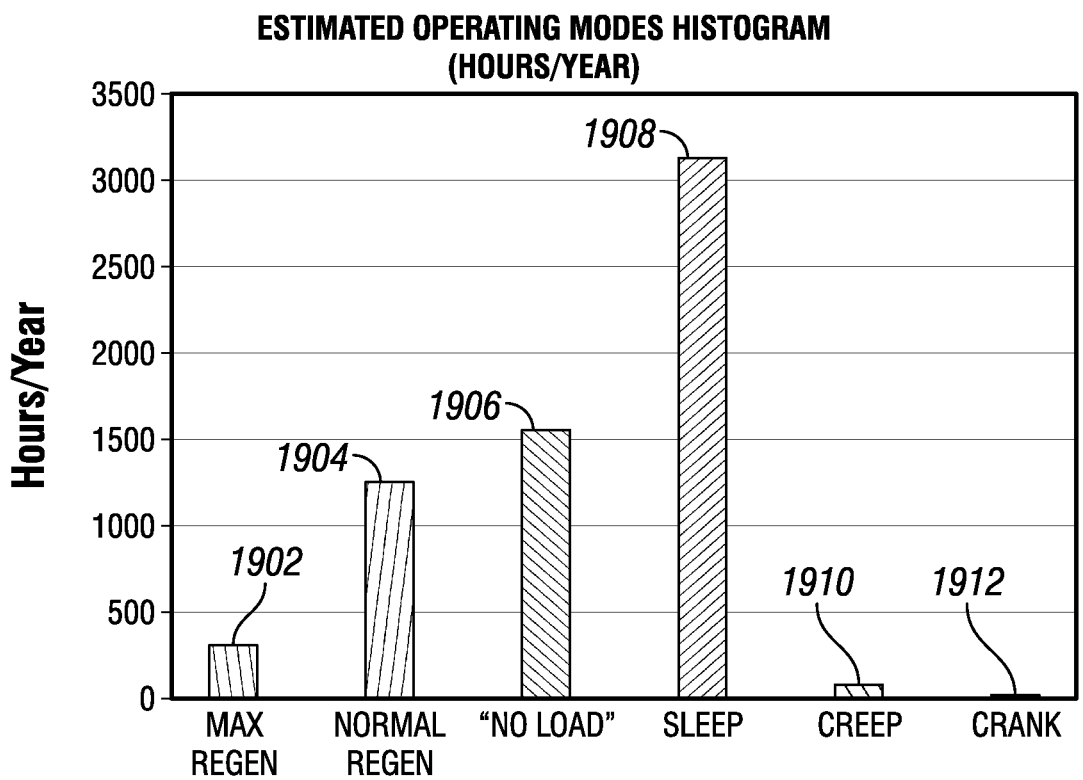
FIG. 19 depicts an example operating mode duty cycle for an electrically regenerative accessory drive in an embodiment of the present disclosure.

Referencing FIG. 17, example operating curves for a motor/generator 112 are depicted. The actual values of the operating curves are design considerations for a particular system, but a system can be configured for any motor/generator 112 having sufficient torque (with appropriate gear ratios) and power capability (e.g., a function of the torque multiplied by the speed) to perform the desired interactions with the load and the driveline, and to support the desired operating modes of the PTO device. Referencing FIG. 18, example operating regions for the motor/generator 112 are depicted. In the example, region 1802 represents a maximum power output region (e.g., crank mode), region 1804 represents a high power output region (e.g., creep mode), region 1806 represents a nominal power output region (e.g., sleep mode, such as when the motor/generator 112 is powering the load 110 and de-coupled from the driveline), region 1808 represents a nominal no load region (e.g., where the motor generator 112 is not coupled to the driveline or powering the load 110), region 1810 represents a normal regeneration mode (e.g., cruise mode), and region 1812 represents a maximum regeneration mode (e.g., regeneration from a high motive power load, such as in descending a steep hill). The actual values of the operation regions are design considerations for a particular system, but a system can be configured to support whichever operating regions are expected to be present on the vehicle. Referencing FIG. 19, an example duty cycle histogram is presented for a vehicle, with expected hours to be experienced in a max regen 1902 condition, a normal regen 1904 condition, a no load 1906 condition, a sleep 1908 condition, a creep 1910 condition, and a crank 1912 condition. The actual values of the duty cycle histogram are design considerations for a particular system, and can be used to determine, without limitation: gear ratios; which gear ratio selections should be supported; the requirements for the motor/generator 112 capabilities including peak and continuous ratings and high efficiency operation regions; and/or sizing of the battery assembly 116. Certain further considerations for the motor/generator 112 and/or the battery assembly 116 include, without limitation: the required power levels; the driveline speeds at various operating conditions; the time and power output of the sleep mode; the availability to regenerate the battery assembly 116 away from the sleep mode; crank requirements (torque, time, temperature, and speed slew rate or trajectory); the efficiency profile of the motor/generator 112 at various speed and torque values; the cost in components, integration, and design for the provision of multiple gear ratios; and the durability and life expectations of the motor/generator 112.

In certain embodiments, characteristics of the motor/generator 112 beyond just the torque and speed considerations may be valuable for certain embodiments, and may be less desirable for other embodiments. For example, a permanent magnet motor may have higher efficiency at certain operating conditions, but may be higher cost, higher inertial torque, and lower torque capability. A permanent magnet motor may be capable of high speed operation, but may generate undesirable EMF on the motor phase lines. In another example, an externally excited motor may have lower operating efficiency, but have a low cost and the ability to selectively disable the rotor field, minimizing drag torque during no load operation. In another example, an induction motor may have a medium efficiency and high torque capability, but have higher cost, size, and weight compared to an externally excited motor. The capabilities of a particular motor further depend on the specific design, so these criteria may be different for motors of these types depending upon the specific design. Additionally or alternatively, certain aspects such as expected bearing life, brushes, control of rotating torque (e.g., a disconnecting clutch and/or capability to turn off the magnetic field), and/or maintenance requirements may make a particular motor favored or disfavored for a particular system.

In certain embodiments, depending upon the desired operating modes, it may be desirable that a PTO device has an extended lifetime. For example, in certain embodiments, the PTO device, and the motor/generator 112 specifically, operates both during the day (e.g., regenerating the battery assembly 116 and/or recovering motive power) and during the night (e.g., providing climate control and powering personal devices in the sleep mode). Accordingly, the usage of the PTO device over a given period of the vehicle operating cycle may be higher than other accessories on the vehicle. Accordingly, robustness of typical failure components such as bearings may be a strong consideration for system design. Additionally, temperature control of components and/or reduced operating speeds (e.g., through gear ratio selections and/or additional gear options) for the PTO device may have particular value for certain embodiments.

Incorporation of an PTO device having a motor/generator 112 system into a traditional production electrical system may include changes to the electrical system, such as conversion of power distribution from a 12V system to a 12V/48V system, removal of the starter and alternator, restructuring the startup sequence, control of accessory and ignition modes, and the like. In embodiments, a networked communication system (e.g., Controller Area Network (CAN)) may provide for communications amongst PTO electrical components, such as with the ECU 122, TCU 120, and the like.

For the startup sequence of a prime mover 102 having a PTO device integrated therewith, the starter and/or the alternator may be removed and replaced by the PTO device components (e.g., load 110, gearbox 108, motor/generator 112, and the like). In the traditional production system, starting is controlled through a network of relays, which could be cumbersome to control all of the available operating modes for the PTO device, so the PTO device sequence, operating states, and other state control functions may be managed through a networked communication system. For example, a general engine start sequence may be as follows: (1) a driver turns the key to an ignition position, (2) ECU 122, TCU 120, and MDC 114 are turned on, (3) the driver turns the key to a start position, (4) control units check for the system being ready to start (e.g., the TCU 120 checks that transmission is in neutral and broadcasts over network, ECU 122 checks that the engine is ready to start and broadcasts over the network, and the like), (5) engine is started (e.g., MDC 114 cranks engine, ECU 120 starts fueling and controlling the engine, and the like), and (6) the driver returns the key to the ignition position. The PTO device may include a shift control override, such as where the transmission cannot be shifted with PTO load on the countershaft. For example, before each shift, the TCU 120 commands the MDC 114 to bring the motor shaft to zero torque. The PTO device may include a sleep mode and wake mode, such as where the load 110 (e.g., HVAC compressor) can be enabled with the engine off.

In embodiments, the motor drive converter (MDC) 114 may be a combined motor drive and DC-DC converter intended to support electrification of vehicles, such as using a multi-rail 48 V/12 V architecture. The motor drive supports starter and generator operation of a motor/generator 112 (e.g., a permanent magnet synchronous motor, wire-wound synchronous motor, induction motor, and the like) and the DC-DC converter bridges system voltages (e.g., a 48V system and a 12V system with bidirectional power flow). Motor position information is provided from a sensor in the motor/generator 112, such as fed to a field-oriented control algorithm running on a processor in the MDC 114. The MDC 114 may provide for continuous and peak power (e.g., 10 kW peak/5 kW continuous power), such as providing transient 10 kW power (e.g., 30 seconds) during crank mode, continuous 5 kW power during cruise mode in flat road conditions (e.g., split between the 48V sub-system and the DC-to-DC converter sub-system), continuous 3 kW continuous power during sleep mode, and the like. The MDC enclosure may be configured to efficiently dissipate heat, such as being made of an aluminum heatsink. The assembled MDC 114, when mated with electrical connectors, may provide ingress protection for the internal components, as well as oleophobic and hydrophobic protection, such as with a vent to reduce structural loads on the enclosure when exposed to altitude and temperature gradients.

Figure 20:
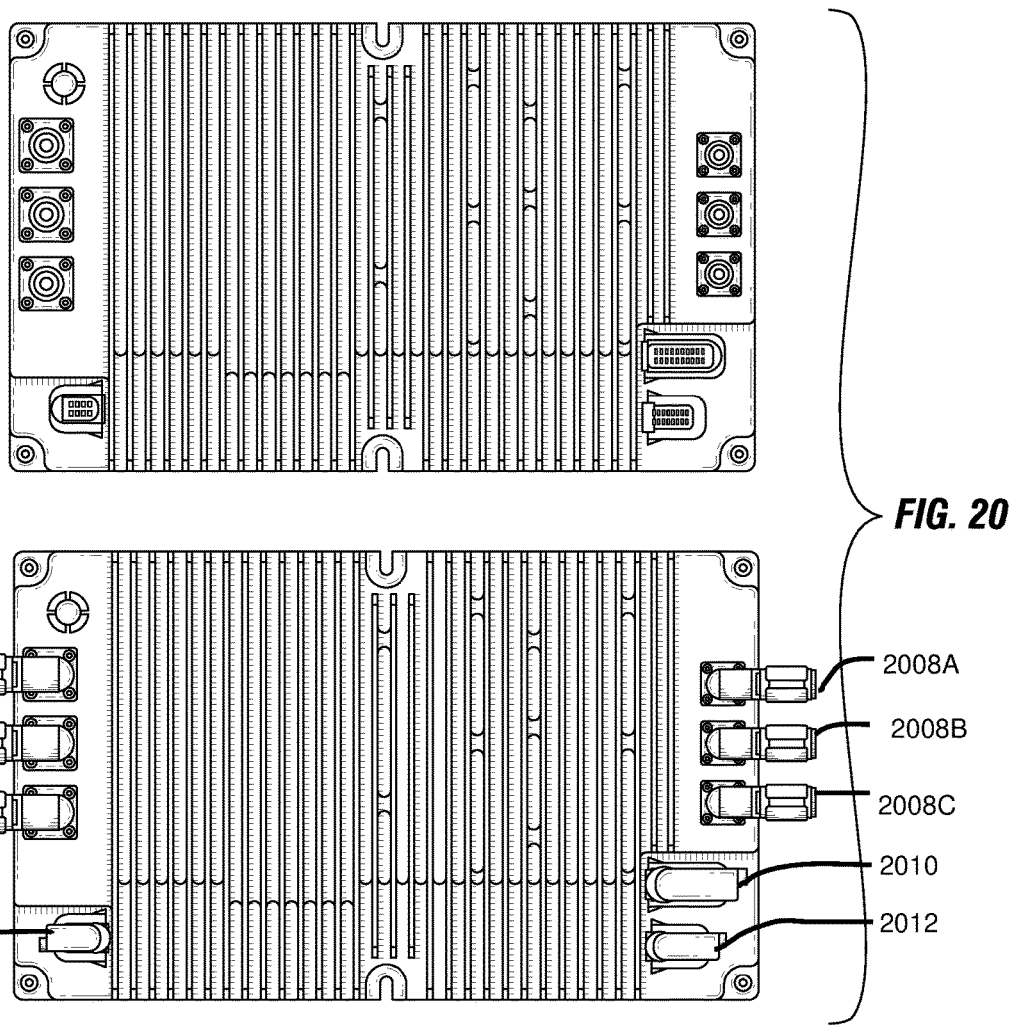
FIG. 20 depicts a physical layout of a motor drive controller for an electrically regenerative accessory drive in an embodiment of the present disclosure.

Referencing FIG. 20, an example physical layout of an MDC 114 is depicted, showing DC power input signals from the battery assembly 116 (e.g., DC Ground 2002, 12V DC 2004, 48V DC 2006), AC power phased output signals to the motor/generator 112 (e.g., 48-VAC 3-phases 2008A, 2008B, 2008C), communications signals (e.g., motor communications 2010, PTO communications 2012, truck communications 2014, and the like). The location of the MDC 114 may be near to both the transmission 104 and battery assembly 116 to minimize heavy cabling and voltage drop in the system. For example, the MDC 114 may be located on a surface of battery box of the battery assembly 116. In certain embodiments, the MDC 114 may be distributed and have certain aspects located throughout the system.

Figure 21A:
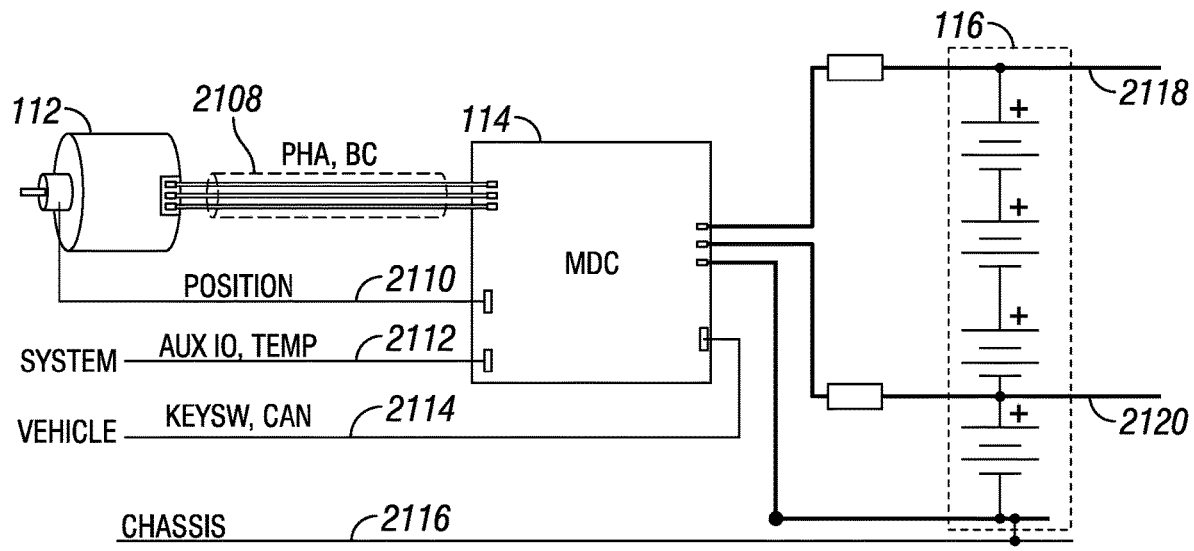
FIG. 21A schematically depicts a motor drive controller with a split battery configuration for an electrically regenerative accessory drive in an embodiment of the present disclosure.
Figure 21B:
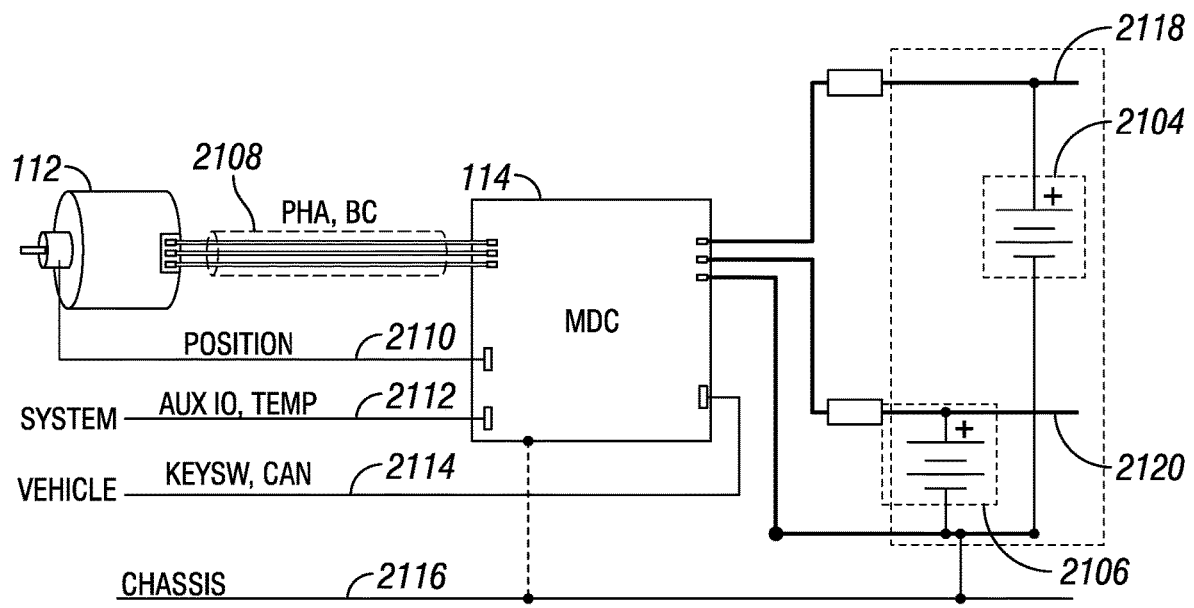
FIG. 21B schematically depicts a motor drive controller with a two-battery configuration for an electrically regenerative accessory drive in an embodiment of the present disclosure.
Figure 22:
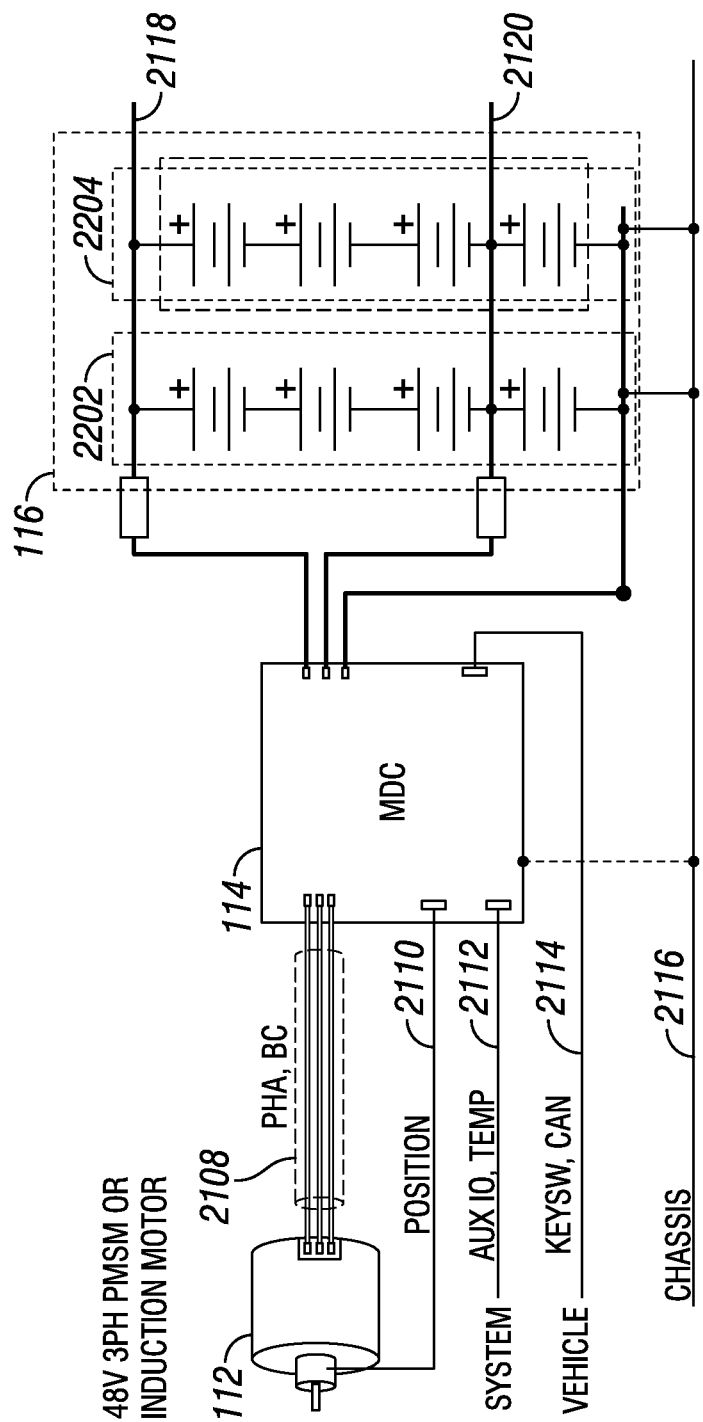
FIG. 22 schematically depicts a motor drive controller with a dual split battery configuration for an electrically regenerative accessory drive in an embodiment of the present disclosure.

Referencing FIG. 21A, an example power distribution configuration for a PTO device is depicted. Power distribution may be configured to run off one or more configurations of the battery assembly 116, such as banks of 12V batteries, separate 12V and 48V batteries, and the like. For example, as depicted in FIG. 21A, the battery assembly 116 may be configured of a battery pack of four 12V batteries in series, providing a 48V power interface 2118. In the example of FIG. 21A, the battery assembly 116 further includes a quarter-tapped 12V power interface 2120, providing for the 12V power. The example of FIG. 21A further includes communications 2110 to the MDC 114 such as a motor speed (e.g., provided by the motor and/or a speed sensor), communications 2112 with a system (e.g., providing auxiliary I/O, temperatures, etc.), and/or communications 2114 with a vehicle (e.g., providing vehicle state information, keyswitch signal, CAN communications, or the like). The example of FIG. 21A further includes a chassis electrical coupling 2116 (e.g., for grounding), and communications 2108 between the MDC 114 and the motor 112 (e.g., three-phase AC power from controlled inverters on the MDC 114). Referencing FIG. 21B, a PTO device further includes the battery assembly 116 having a single 48V battery 2104 (e.g., a Li-ion battery), with a separate 12V battery to provide the 12V power interface 2120. Referencing FIG. 22, an example battery assembly 116 further includes a two battery packs 2202, 2204 each having 4 four 12V batteries in series (8 total batteries in the example of FIG. 22). In the example of FIG. 22, the 12V power interface 2120 may include a single 12V battery providing the 12V power, or a pair of 12V batteries in parallel (e.g., one from each of the battery packs), depending upon the amount of 12V energy storage is desired for the system. The selection of the number of batteries to include in a battery assembly 116 is a design choice that depends upon the system voltages desired (e.g., both the number of distinct voltages, and the values of those voltages), the total amount of energy that is to be stored in the battery pack, the amount of current to be delivered by the battery pack, and the voltages, energy capacities, and current capacities of the batteries in the battery pack.

As depicted in FIG. 22, a first bank of 12V batteries 2202 and second bank of 12V batteries 2204 may be utilized. The 12V and 48V outputs may be connected through the MDC's DC-to-DC converter and monitored by the battery management system (BMS) 118. The BMS 118 may monitor and report back current, voltage, and temperature measurements and, when the DC-to-DC converter is off, may have the ability to send a wake signal to enable charging and balancing. The BMS 118 may monitor battery conditions for life-time characteristics, such as voltages for different batteries throughout the charge-discharge, and provide active balancing via discharge control to manage the batteries to the same voltage. The PTO device electrical system may implement a single point ground 2116, such as with a central ground located on the negative terminal of the MDC 114, with battery strings grounded to that point. As depicted in FIGS. 21A, 21B, and 22, the MDC 114 provides the three-phase power lines 2108 to the motor/generator 112, such as input voltages when the motor/generator 112 is operating as a motor and output voltages when the motor/generator 112 is operating as a generator. Control and sensor signals may also be provided to/from the MDC 114 in the control of the PTO system, such as position information 2110 from the motor/generator 112, auxiliary I/O and temperature data 2112 for the system, key switch information and network data 2114 for the vehicle, and the like.

Figure 23:
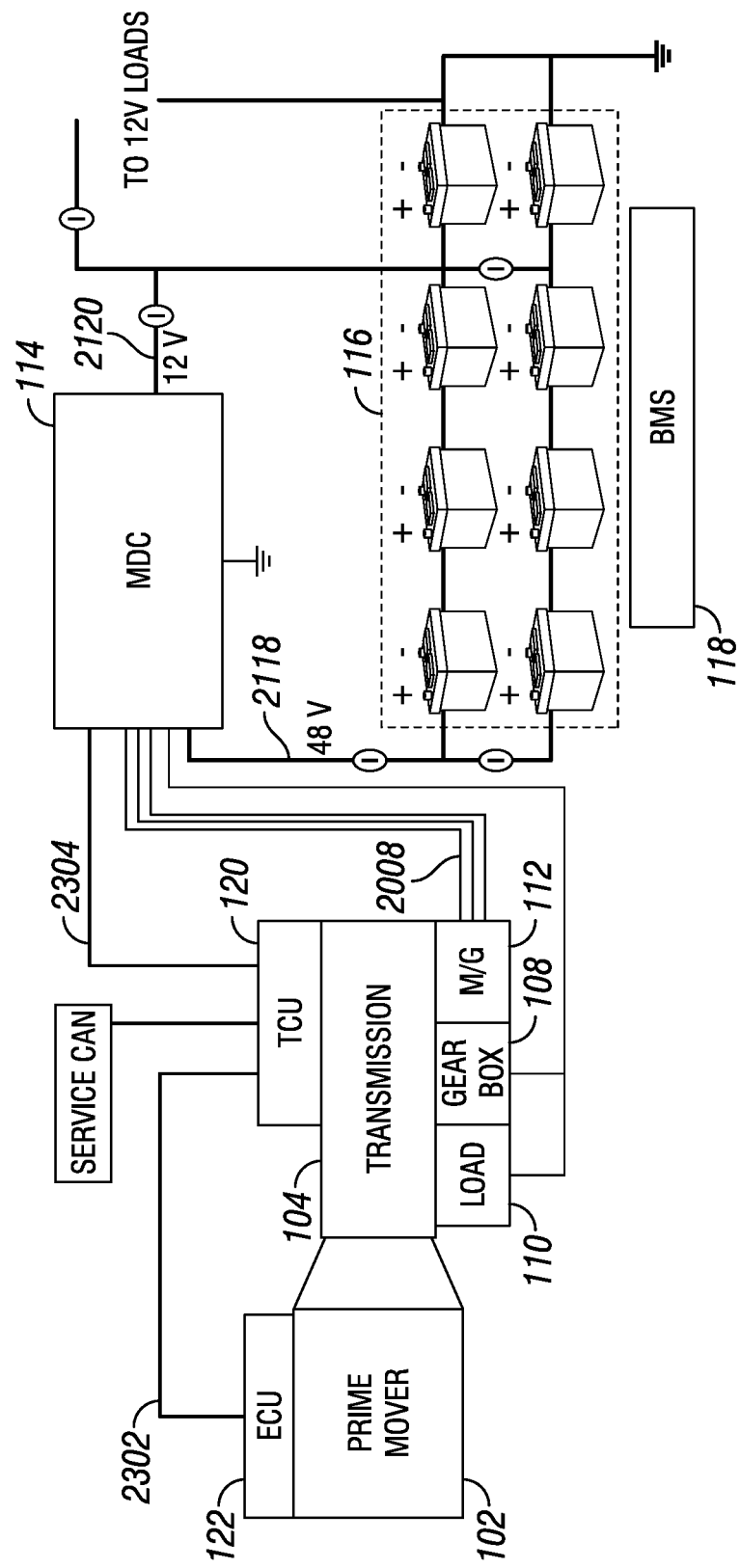
FIG. 23 schematically depicts a system architecture for an electrically regenerative accessory drive interfacing with two separate load voltages in an embodiment of the present disclosure.

FIG. 23 depicts a 48-volt system architecture for an electrically regenerative accessory drive in an embodiment of the present disclosure. In addition to other examples depicted throughout the present disclosure, the example of FIG. 23 depicts a number of communication networks distributed around the vehicle. For example, communication link 2302 is depicted with the ECU 122 in communication with the TCU 120, for example on a private CAN link, or on a J1939 public datalink, and/or a network having any known communication protocol. Communication link 2304 similarly is depicted between the TCU 120 and the MDC 114, which may be the same communication link as link 2302, or a separate link, and may be private or public. Additionally or alternatively, any one or more of the datalinks may be a wireless datalink. The example of FIG. 23 utilizes two battery packs, each having 4 batteries in series.

Figure 24:
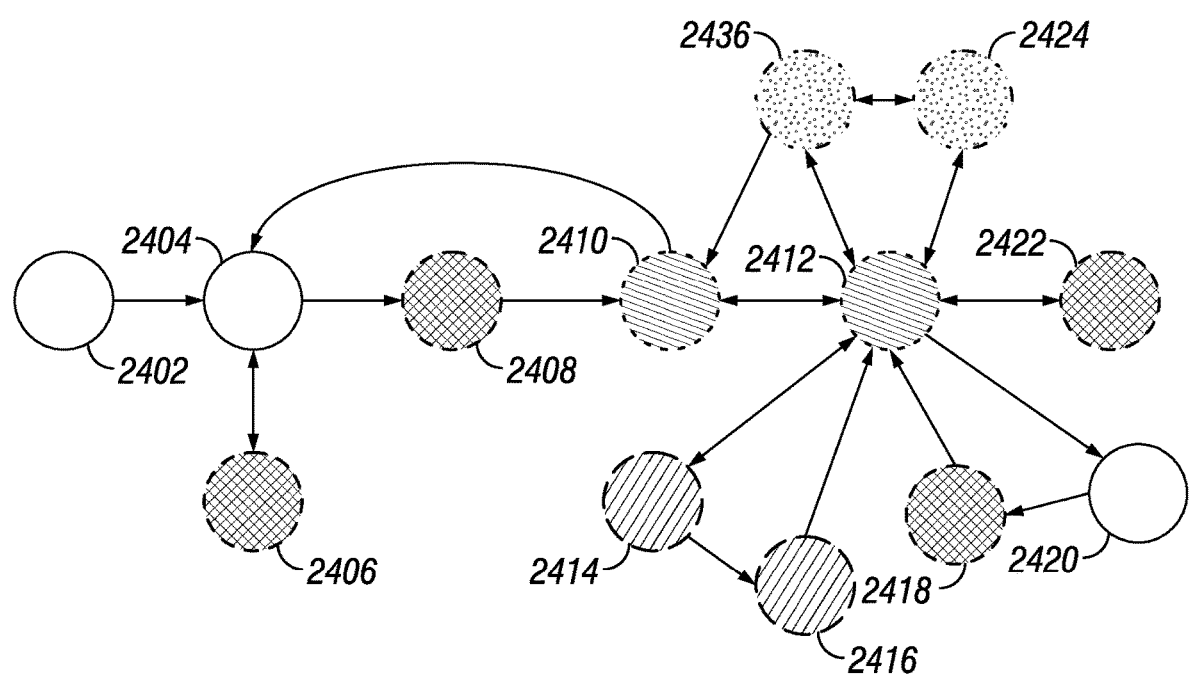
FIG. 24 depicts an example state diagram for an electrically regenerative accessory drive in an embodiment of the present disclosure.

FIG. 24 depicts a state diagram for an example motor/generator 112. The example state diagram includes a keyoff state 2402, for example a starting condition for the motor/generator 112 applied by the MDU 112 at a startup time for the vehicle. The example state diagram depicts a transition to an engine off state 2404, for example in response to a keyswitch signal before the engine is started. The example state diagram further depicts a transition to a sleep state 2406, for example in response to a system shutdown and/or an auxiliary input (e.g., from a sleeper cab console or a selected keyswitch position) to the MDU 114 indicating that powering of a shared load 110 is desired even though the engine is not running. The example state diagram further includes a transition back to the engine off state 2404 when conditions are met (e.g., an auxiliary input is no longer present). The example state diagram further includes a transition to crank state 2408 (to start the engine), and/or a neutral state 2410 (e.g., the PTO device is not in torque communication with the driveline). The driving state 2412 (or cruise, etc.) can be transitioned to when the vehicle is moving, and the states 2414 (driving in coast) and 2416 (driving with engine off—e.g., motoring) are available under the appropriate system conditions. The crank state 2418 is depicted from the engine stop state 2420 (e.g., for a start/stop embodiment of the PTO device), but the crank state 2408 may additionally or alternatively be utilized. The creep engine on state 2436 and creep engine off states 2424 are depicted, depending upon the conditions present in the system, and the desired configuration to engage a creep mode. Finally, the drive shifting state 2422 is depicted, which may be utilized, for example, to provide for the PTO device to decouple from the driveline (e.g., engage a neutral position of the shift actuator 1006) during a shifting event. The depicted states are non-limiting, and the state diagram provides an example framework to control the transitions of the PTO device between operating modes.

Figure 25:
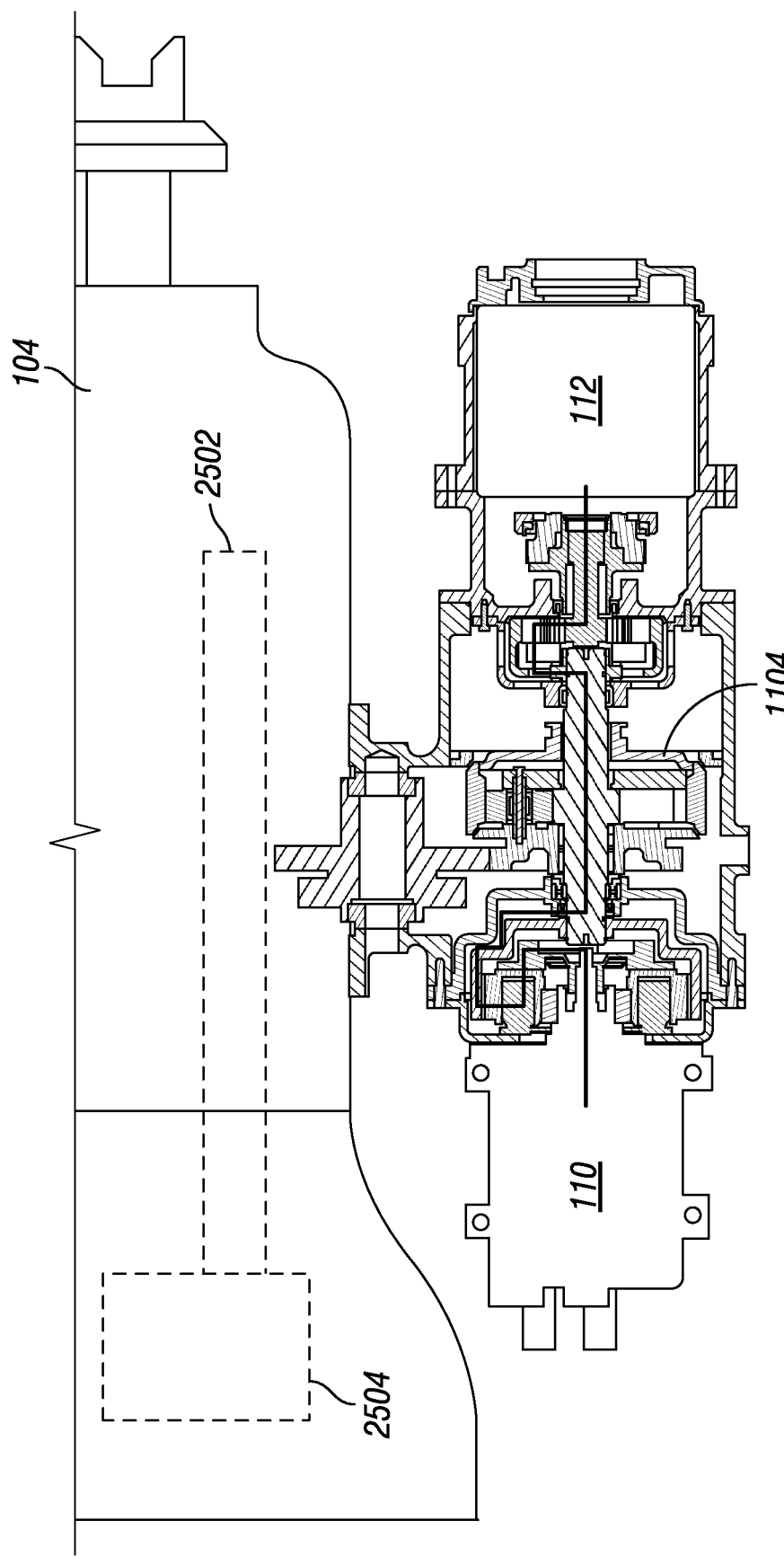
FIG. 25 illustrates power flows in a sleep mode drive-line configuration for an electrically regenerative accessory drive in an embodiment of the present disclosure.

Referencing FIG. 25, an example depiction of power flows through the PTO device in a sleep mode is depicted. The example PTO device includes the motor/generator 112 powering the load 110 through the load drive shaft, for example with a first gear ratio applied at the planetary gear coupling the motor/generator 112 to the load drive shaft, and with a second gear ratio applied at the planetary gear coupling the load 110 to the load drive shaft. The PTO device in the position depicted in FIG. 25 does not communicate torque with the driveline. For clarity of presentation, the countershaft 2502 from an example transmission and the clutch 2504 between the transmission and the prime mover is depicted, but power does not flow from the driveline to the PTO device in the example of FIG. 25. In certain embodiments, an actuator 1104 in the neutral position provides the PTO device configured as in FIG. 25.

Figure 26:
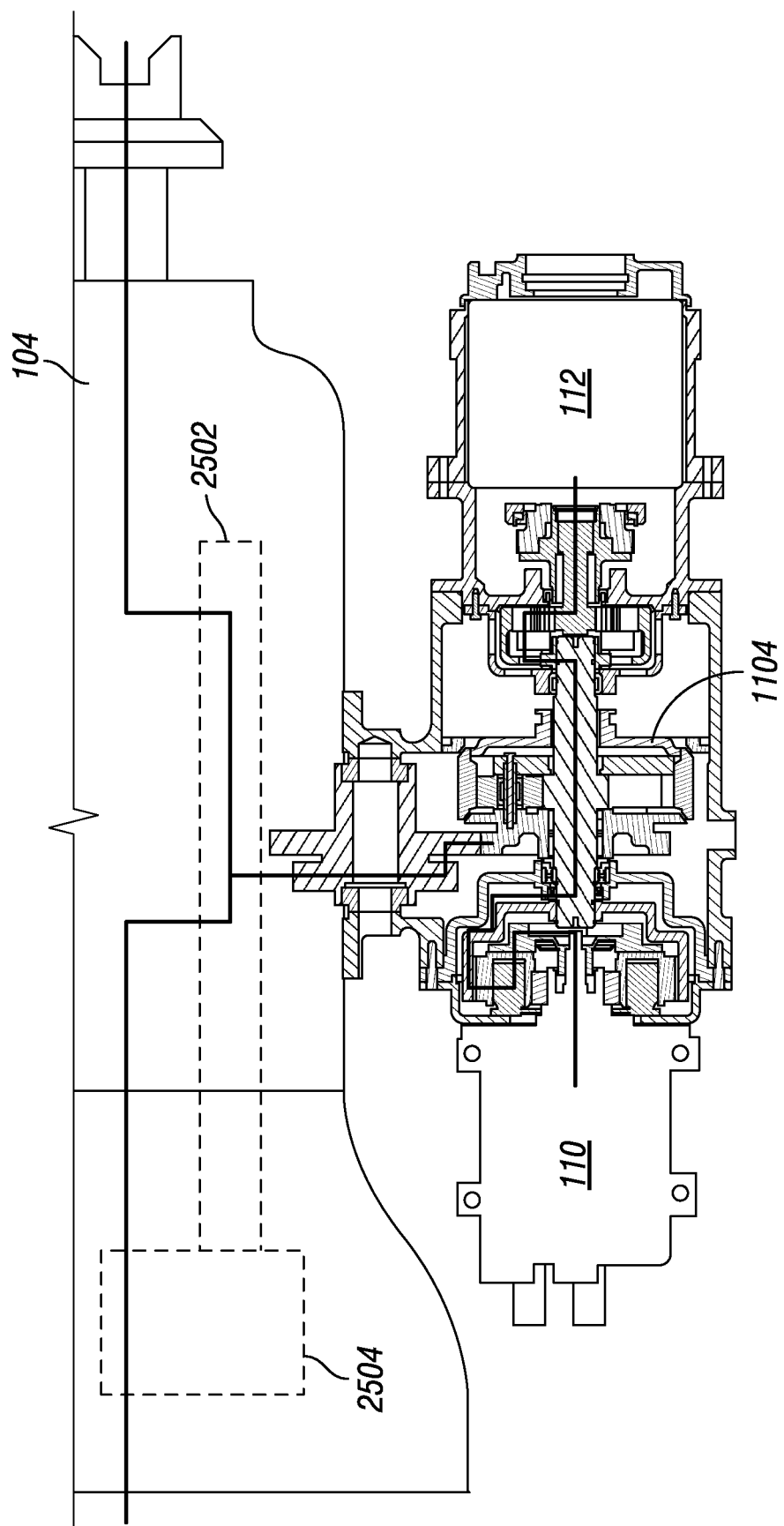
FIG. 26 illustrates power flows in a cruise and/or motive load mode drive-line configuration for an electrically regenerative accessory drive in an embodiment of the present disclosure.

Referencing FIG. 26, an example depiction of power flows through the PTO device in a cruise mode and/or motive load powered mode is depicted. The example PTO device includes the drive shaft powering the motor/generator 112 and the load 110 through the load drive shaft, for example with selected gear ratios provided between the countershaft and the idler gear, between the idler gear and the driven gear, and between the driven gear and the load drive shaft. Further, the planetary gears at the motor/generator 112 and the load 110, respectively, provide further selectable gear ratios. In certain embodiments, an actuator in the "toward load" position provides the PTO device configured as in FIG. 26.

Figure 27:
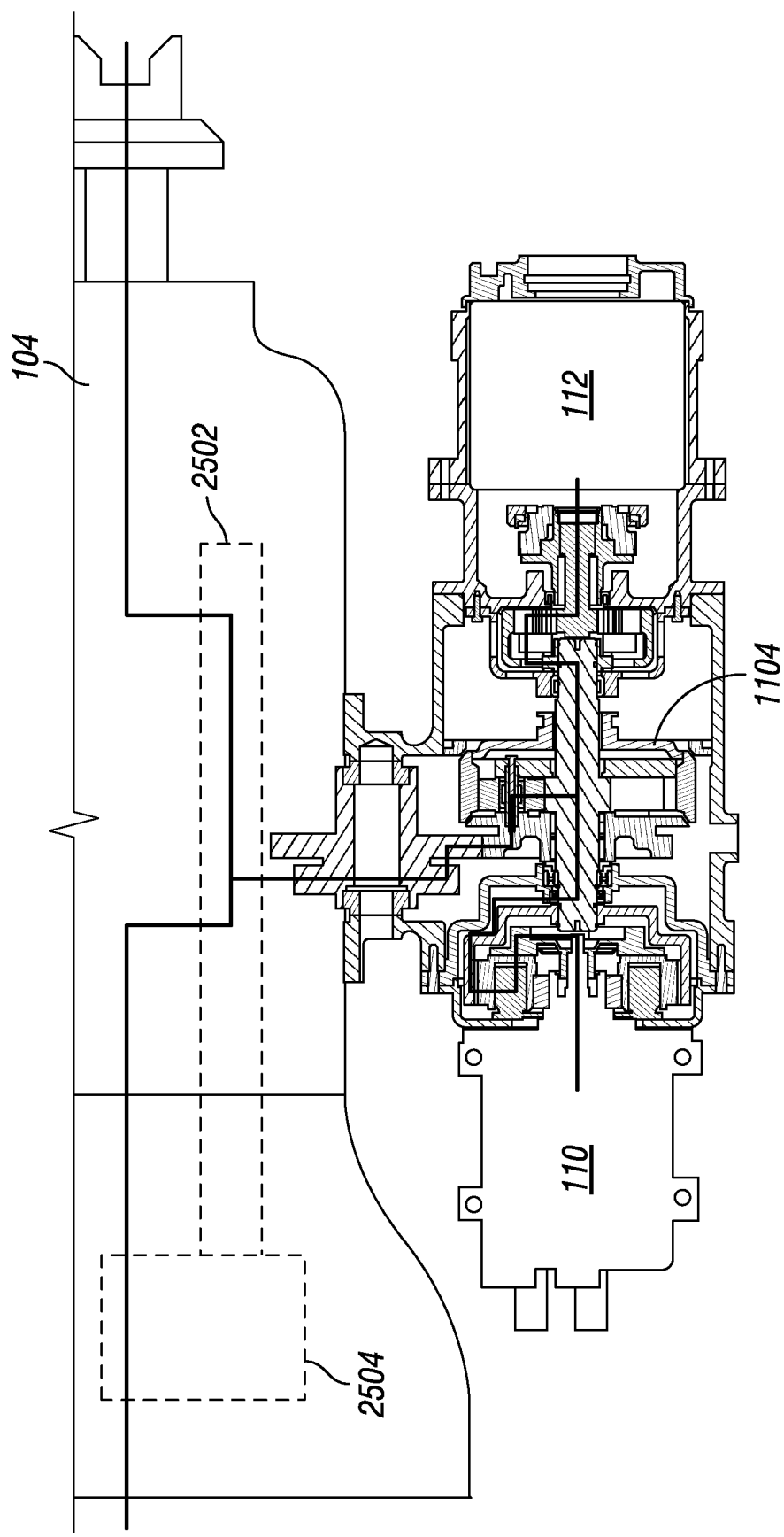
FIG. 27 illustrates power flows in a crank and/or creep mode drive-line configuration for an electrically regenerative accessory drive in an embodiment of the present disclosure.

Referencing FIG. 27, an example depiction of power flows through the PTO device in a crank mode and/or a creep mode is depicted. The example PTO device includes the motor/generator 112 powering the drive shaft, for example with selected gear ratios provided between the countershaft and the idler gear, between the idler gear and the driven gear, and between the driven gear and the load drive shaft. In the example of FIG. 27, the planetary gear associated with the driven gear provides for an additional ratio between the motor/generator 112 and the driveline, allowing for an increase in torque by the motor/generator 112 to the driveline. In certain embodiments, the load 110 may be powered during crank mode and/or creep mode operations, and/or the load 110 may be de-coupled from the load drive shaft (e.g., using a clutch). Further, the planetary gears at the motor/generator 112 and the load 110, respectively, provide further selectable gear ratios. In certain embodiments, an actuator in the "toward motor" position provides the PTO device configured as in FIG. 27.

An example system includes a PTO device that selectively couples to a driveline of a vehicle, a motor/generator 112 electrically coupled to an electrical power storage system, a shared load 110 selectively powered by the driveline or the motor/generator 112. The example system further includes where the PTO device further includes a coupling actuator (e.g., shift actuator 1006, gear box 108, idler gear 1004, and/or planetary gear assembly) that couples the shared load 110 to the motor/generator 112 in a first position, and to the driveline in a second position.

An example system includes where the coupling actuator further couples the driveline to the motor/generator in the second position, where the coupling actuator includes a two-speed gear box, and/or where the coupling actuator couples the motor-generator to the shared load in a first gear ratio in the first position (e.g., neutral or sleep mode), and couples the motor-generator to the driveline in a second gear ratio in the second position (e.g., cruise mode). An example system includes where the coupling actuator couples the motor/generator to the driveline in a second gear ratio in the second position (e.g., cruise mode), and in a third gear ratio in a third position (e.g., crank or creep mode); where the coupling actuator further couples the motor/generator to the driveline in the second gear ratio in response to the driveline providing torque to the motor/generator; and/or where the coupling actuator further couples the motor/generator to the driveline in the third gear ratio in response to the motor/generator providing torque to the driveline. An example system includes where the coupling actuator further de-couples the motor/generator from the driveline in the first position.

Figure 28:
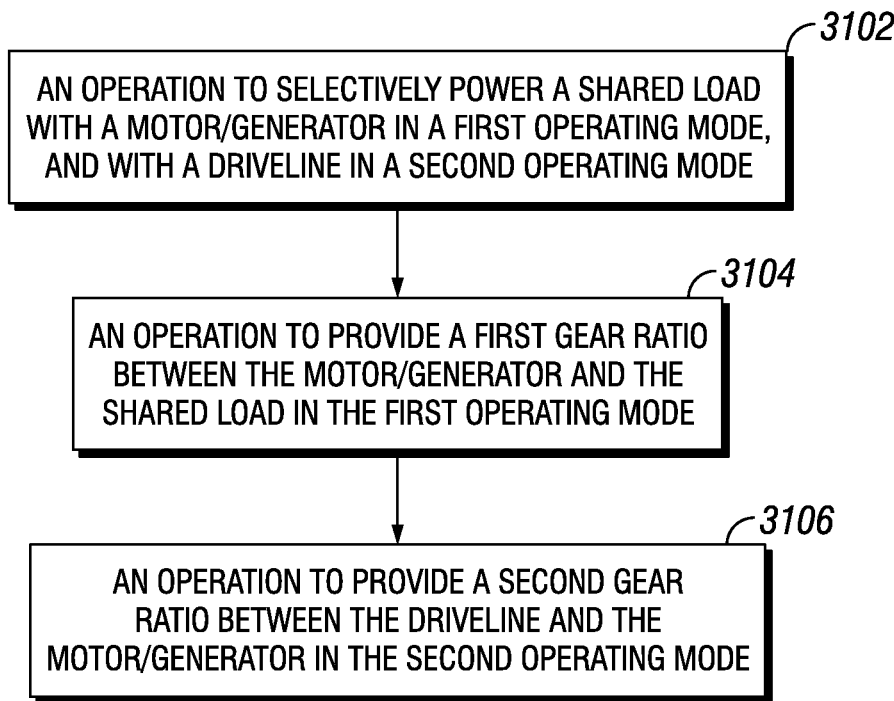
FIG. 28 is a schematic flow diagram of a procedure for operating a PTO device in selected operating modes and ratios.

Referencing FIG. 28, an example procedure includes an operation 3102 to selectively power a shared load with a motor/generator in a first operating mode (e.g., neutral or sleep mode), and with a driveline in a second operating mode (e.g., cruise mode); an operation 3104 to provide a first gear ratio between the motor/generator and the shared load in the first operating mode; and an operation 3106 to provide a second gear ratio between the driveline and the motor/generator in the second operating mode.

Certain further aspects of an example procedure are described following, any one or more of which may be present in certain embodiments. An example procedure further includes an operation to power the motor/generator with the driveline in the second operating mode, and an operation to charge an electrical power storage system with the motor/generator in the second operating mode; an operation to power the motor/generator with the electrical power storage system in the first operating mode; an operation to power the driveline with the motor/generator in a third operating mode; and/or an operation to provide a third gear ratio between the motor/generator and the driveline in the third operating mode.

An example system includes a PTO device structured to selectively couple to a driveline of a vehicle, a motor/generator 112 electrically coupled to an electrical power storage system (e.g., battery assembly 116), a shared load 110 selectively powered by one of the driveline or the motor/generator, and where the PTO device further includes a coupling actuator including a planetary gear assembly, the coupling actuator structured to couple the shared load to the motor/generator at a first gear ratio in a first position (e.g., neutral or sleep mode) of the planetary gear assembly, and to couple the shared load to the driveline at a second gear ratio in a second position (e.g., cruise mode) of the planetary gear assembly.

Certain further aspects of an example system are described following, any one or more of which may be present in certain embodiments. An example system includes where the first position of the planetary gear assembly includes a neutral position that de-couples the driveline from both of the motor/generator and the shared load. An example system includes where the shared load is selectively rotationally coupled to a load drive shaft 1106, and where the motor/generator is selectively rotationally coupled to the load drive shaft through a second planetary reduction gear, and/or where the shared load is selectively rotationally coupled to the load drive shaft through at least one of a clutch and a third planetary gear. An example system includes where the coupling actuator is further structured to couple the driveline to the motor/generator at a third gear ratio in a third position (e.g., crank or creep mode) of the planetary gear assembly, where the second position of the planetary gear assembly includes a ring gear of the planetary gear assembly engaging a driven gear of the planetary gear assembly, where the first position of the planetary gear assembly includes a free-wheeling position of the planetary gear assembly, where the third position of the planetary gear assembly includes engaging a second ring gear of the planetary gear assembly with a stationary gear of the planetary gear assembly, and/or where the ring gear includes an inner ring gear, and where the second ring gear includes an outer ring gear.

Figure 29:
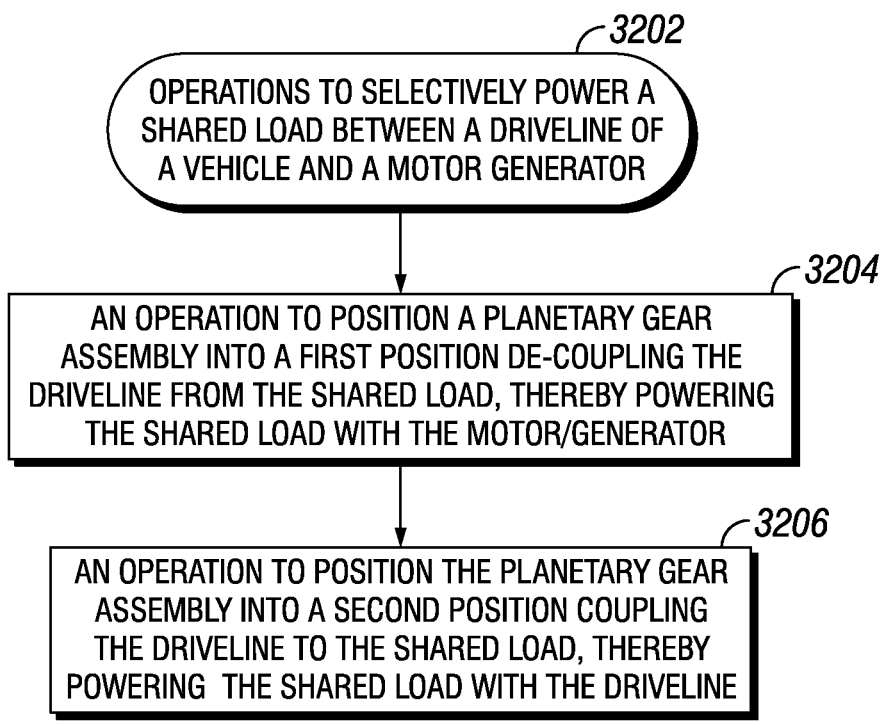
FIG. 29 is a schematic flow diagram of a procedure for selecting ratios in a PTO device having a planetary gear assembly.

Referencing FIG. 29, an example procedure includes an operation 3202 to selectively power a shared load between a driveline of a vehicle and a motor/generator, an operation 3204 to selectively power including positioning a planetary gear assembly into a first position de-coupling the driveline from the shared load, thereby powering the shared load with the motor/generator; and an operation 3206 to position the planetary gear assembly into a second position coupling the driveline to the shared load, thereby powering the shared load with the driveline.

Certain further aspects of an example procedure are described following, any one or more of which may be present in certain embodiments. An example procedure further includes an operation to power the motor/generator with the driveline in the second position of the planetary gear assembly, thereby charging an electrical power storage system with the motor/generator; an operation to selectively power the driveline with the motor/generator; where an operation to selectively power the driveline includes positioning the planetary gear assembly into one of the second position or a third position, thereby coupling the driveline to the motor/generator, and where a gear ratio between the driveline and the motor/generator in the second position is distinct from a gear ratio between the driveline and the motor/generator in the third position; and/or an operation to de-couple the shared load from the motor/generator during the powering the driveline with the motor/generator.

An example system includes a PTO device structured to selectively couple to a transmission of a vehicle; a motor/generator 112 electrically coupled to an electrical power storage system 116; a shared load 110 selectively powered by one of a driveline of the vehicle or the motor/generator, where the PTO device further includes a coupling actuator structured to couple the driveline to the motor/generator in a first position (e.g., neutral or sleep mode), and to the shared load in a second position (e.g., cruise mode); and where the PTO device includes a housing having a first interface (e.g., FIG. 10—gear box 108 interface to the motor/generator 112) coupled to the motor/generator and a second interface (e.g., FIG. 10—gear box 108 interface to the load 110) coupled to the shared load, and where the first interface is displaced at least 90 degrees from the second interface.

Certain further aspects of an example system are described following, any one or more of which may be present in certain embodiments. An example system includes where the first interface is in an opposite direction from the second interface. An example system includes a load drive shaft 1106 disposed in the PTO device, where a first end of the load drive shaft is positioned toward the first interface and where a second end of the load drive shaft is positioned toward the second interface. An example system includes a first one of the first interface or the second interface is positioned toward a front of the vehicle, and where the other one of the first interface or second interface is positioned toward a rear of the vehicle. An example system includes the housing further including a third interface (e.g., FIG. 10, flange 1002) coupled to the transmission, and where the third interface includes an orientation perpendicular to the load drive shaft. An example system includes the housing further including a T-shape. An example system includes the housing further including a third interface coupled to a side PTO interface of the transmission, and/or where the side PTO interface includes an 8-bolt PTO interface. An example system includes the housing further including a third interface coupled to the transmission, and where the PTO device further includes a driveline coupling device structured to selectively access power from the driveline; the driveline coupling device including an idler gear 1104 engaging a countershaft gear of the transmission; the driveline coupling device including a chain (not shown—e.g., side engagement to a countershaft, chain coupling a layshaft to a countershaft gear, etc.) engaging a countershaft gear of the transmission; the driveline coupling device including a splined shaft engaging a countershaft of the transmission (e.g., a rear PTO interface); the driveline coupling device including a layshaft engaging a gear of the transmission (e.g., layshaft to extend mechanical reach, and/or apply a further selected gear ratio); and/or the driveline coupling device including a chain engaging a gear of the transmission (e.g., any gear which may or may not be a countershaft gear).

Figure 30:
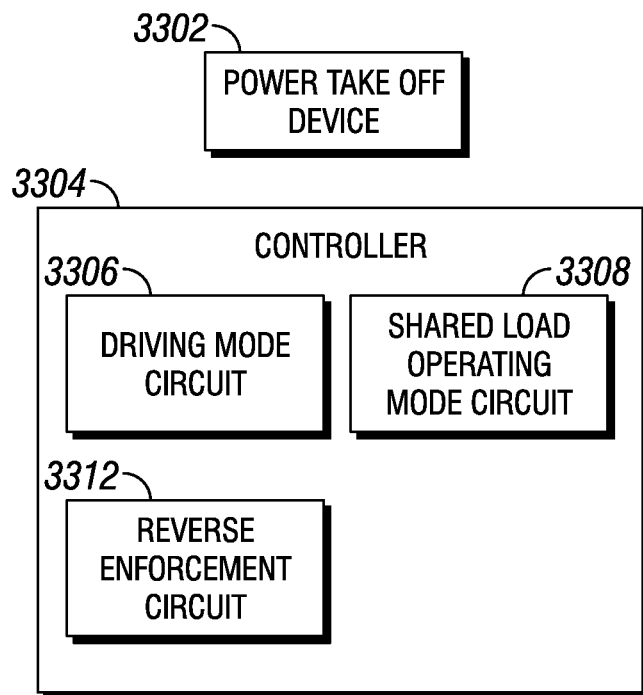
FIG. 30 is a schematic control diagram of an example PTO device.

Referencing FIG. 30, an example system includes a PTO device 3302 having a coupling actuator (e.g., shift actuator 1006, gear box 108, idle gear 1004, and/or planetary gear assembly) configured to couple a shared load 110 to a motor/generator 112 in a first position (e.g., neutral or a sleep mode), and to couple the shared load to a driveline of a vehicle in a second position (e.g., a cruise mode); a controller 3304 including a driving mode circuit 3306 structured to determine a current vehicle operating mode (e.g., utilizing keyswitch, network signals, operations exercising a state diagram, vehicle conditions such as vehicle speed, power or torque output, etc.) as one of a sleep mode or a motive mode (e.g., cruise, driving, etc.); and a shared load operating mode circuit 3308 structured to command the coupling actuator to the first position in response to the sleep mode, and to command the coupling actuator to the second position in response to the motive mode.

An example system includes the coupling actuator further configured to de-couple the driveline from the shared load and the motor/generator in the first position. An example system includes where the coupling actuator is further configured to couple the driveline of the vehicle to the motor/generator in a third position and/or where the driving mode circuit 3306 is further structured to determine the current vehicle operating mode as a creep mode, and where the shared load operating mode circuit 3308 is further structured to command the coupling actuator to the third position in response to the creep mode. An example system includes a load drive shaft 1106 selectively coupled to the shared load, where the motor/generator powers the load drive shaft in the first position, and where the driveline powers the load drive shaft in the second position; a shared load coupling actuator structured to selectively de-couple the shared load from the load drive shaft; and where the shared load operating mode circuit 3308 is further structured to command the shared load coupling actuator to de-couple the shared load from the load drive shaft in response to the creep mode. An example system includes where the driving mode circuit 3306 is further structured to determine the current vehicle operating mode as a crank mode, and where the shared load operating mode circuit 3308 is further structured to command the coupling actuator to the third position in response to the crank mode. An example system including where the coupling actuator is further configured to selectively couple the motor/generator to the driveline of the vehicle in the second position; an electrical stored power circuit 3310 structured to determine a state of charge of an electrical power storage system (e.g., battery assembly 116), and where the shared load operating mode circuit 3308 is further structured to command the coupling actuator to couple the motor/generator to the driveline of the vehicle in the second position in response to the state of charge of the electrical power storage system; and/or the coupling actuator is further configured to couple the driveline of the vehicle to the motor/generator in a third position, and where a first gear ratio between the motor/generator and the driveline of the vehicle in the second position is distinct from a second gear ratio between the motor/generator and the driveline of the vehicle in the third position (e.g., gear ratio between motor/generator and driveline is different between cruise mode and creep mode).

Figure 31:
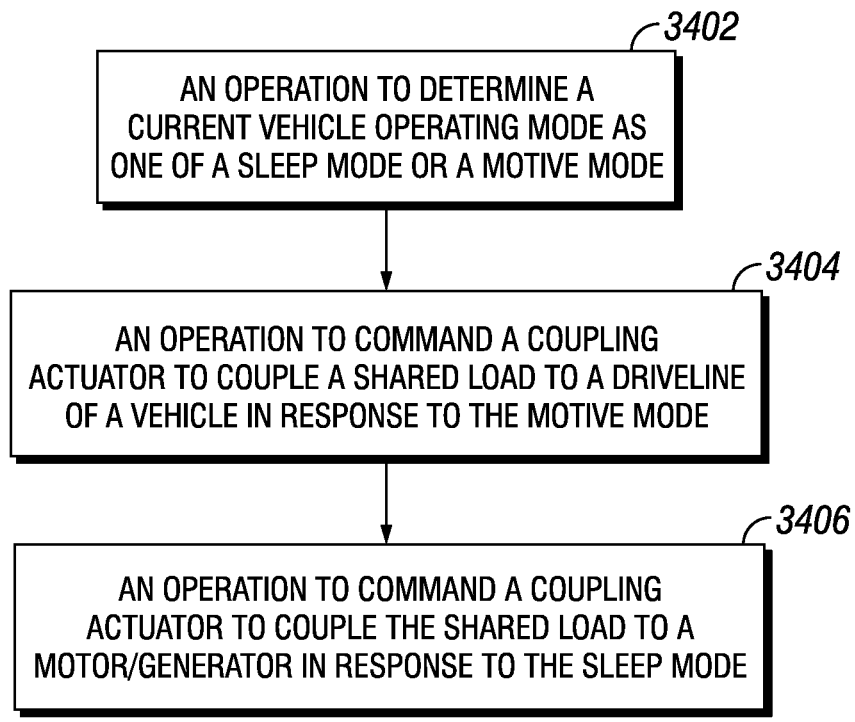
FIG. 31 is a schematic flow diagram of a procedure for controlling a PTO device in selected modes.

Referencing FIG. 31, an example procedure includes an operation 3402 to determine a current vehicle operating mode as one of a sleep mode or a motive mode; an operation 3404 to command a coupling actuator to couple a shared load to a driveline of a vehicle in response to the motive mode; and an operation 3406 to command the coupling actuator to couple the shared load to a motor/generator in response to the sleep mode.

An example procedure further includes an operation to de-couple the driveline of the vehicle from both of the shared load and the motor/generator in response to the sleep mode. An example procedure further includes an operation to determine the current vehicle operating mode as a creep mode, and to command the coupling actuator to couple the motor/generator to the driveline in response to the creep mode. An example procedure further includes an operation to determine the current vehicle operating mode as a crank mode, and to command the coupling actuator to couple the motor/generator to the driveline in response to the crank mode. An example procedure further includes an operation to selectively couple the driveline to the motor/generator in response to the motive mode (e.g., cruise mode, driving mode, etc.); an operation to determine a state of charge of an electrical power storage system, and where the selectively coupling the driveline to the motor/generator is further in response to the state of charge. Example and non-limiting operations to selectively couple the driveline to the motor/generator in response to the state of charge include one or more of the following operations: determining that a state of charge of the electrical power storage system (e.g., battery assembly) is below a threshold; determining that a state of charge of the battery assembly is sufficiently low that an estimated amount of regeneration activity of the vehicle can be stored; determining that a state of charge of the battery assembly is below an amount estimated to provide sufficient upcoming sleep mode operation for a predetermined amount of time; and/or determining that a battery assembly charge level should be increased to protect the battery assembly state of health. An example procedure further includes an operation to determine the current vehicle operating mode as one of a crank mode or a creep mode, an operation to command the coupling actuator to couple the motor/generator to the driveline in response to the one of the crank mode or the creep mode; and/or an operation to command the coupling actuator to couple the motor/generator to the driveline at a first gear ratio in response to the motive mode, and to couple the motor/generator to the driveline at a second gear ratio in response to the one of the crank mode or the creep mode, and where the first gear ratio is distinct from the second gear ratio.

Again referencing FIG. 30, an example system includes a PTO device having a coupling actuator configured to couple a shared load to a motor/generator in a first position, to couple the shared load to a driveline of a vehicle in a second position, and to couple the motor/generator to the driveline of the vehicle in a third position. The system further includes a controller 3304 including a driving mode circuit 3306 structured to determine a current vehicle operating mode as one of a sleep mode, a motive mode, or a creep mode, and a shared load operating mode circuit 3308 structured to command the coupling actuator to the first position in response to the sleep mode, to command the coupling actuator to the second position in response to the motive mode, and to command the coupling actuator to the third position in response to the creep mode.

Certain further aspects of an example system are described following, any one or more of which may be present in certain embodiments. An example system includes where the controller 3304 further includes a reverse enforcement circuit 3312 structured to determine a reverse gearing position. Operations to determine a reverse gearing position include providing and/or receiving messages on a datalink to confirm gear configurations, receiving a transmission state value indicating whether a reverse gearing position is present, and/or receiving a creep permission value indicating that creep operations that may cause vehicle movement are permitted. In certain embodiments throughout the present disclosure, datalink communications and/or other messages may be received by receiving a dedicated datalink message, by receiving an agreed upon message that is not dedicated but that provides an indication of the received information, determining the information for a message from other information available in the system (e.g., a positive forward vehicle speed could be utilized to preclude a reverse creep operation), communicating with a sensor detecting the value (e.g., a transmission gear position sensor), and/or by receiving an indicator (e.g., a voltage detected at a location, such as a controller I/O location, a hardwired input to the MDC 114, or other indicator) of the requested value. An example shared load operating mode circuit 3308 is further structured to command the coupling actuator to the third position in response to the reverse gearing position. An example system includes where the shared load operating mode circuit 3308 is further structured to provide a motor/generator direction command value in response to the creep mode, and where the motor/generator is responsive to the motor/generator direction command value. For example, in certain systems, a creep mode may allow the PTO device to provide either forward or reverse motive power the vehicle, and the direction selection may be performed by a gear selection (e.g., requesting a reverse gear shift by the transmission) and/or by controlling the rotating direction of the motor/generator. In certain embodiments, creep operations may be combined with other protective operations, such as decoupling the prime mover from the driveline (e.g., opening the clutch 108) to prevent reverse rotation of the prime mover. Additionally or alternatively, a reversing gear can be provided in the gear box 108, for example for coupling the PTO device to the driveline for the creep mode (and/or for the crank mode, such as where the normal coupling results in a reverse gear). An example system includes the driving mode circuit 3306 further structured to determine the current vehicle operating mode as a crank mode, and where the shared load operating mode circuit 3308 is further structured to command the coupling actuator to the third position in response to the crank mode; where the shared load operating mode circuit 3308 is further structured to provide the motor/generator direction command value further in response to the crank mode; and/or where the shared load operating mode circuit 3308 is further structured to provide the motor/generator direction command value as a first direction in response to the crank mode, and as a second direction in response to the creep mode. An example system includes where a first rotational coupling direction between the motor/generator and the driveline in the second position is opposite a second rotational coupling direction between the motor/generator and the driveline in the third position.

Figure 32:
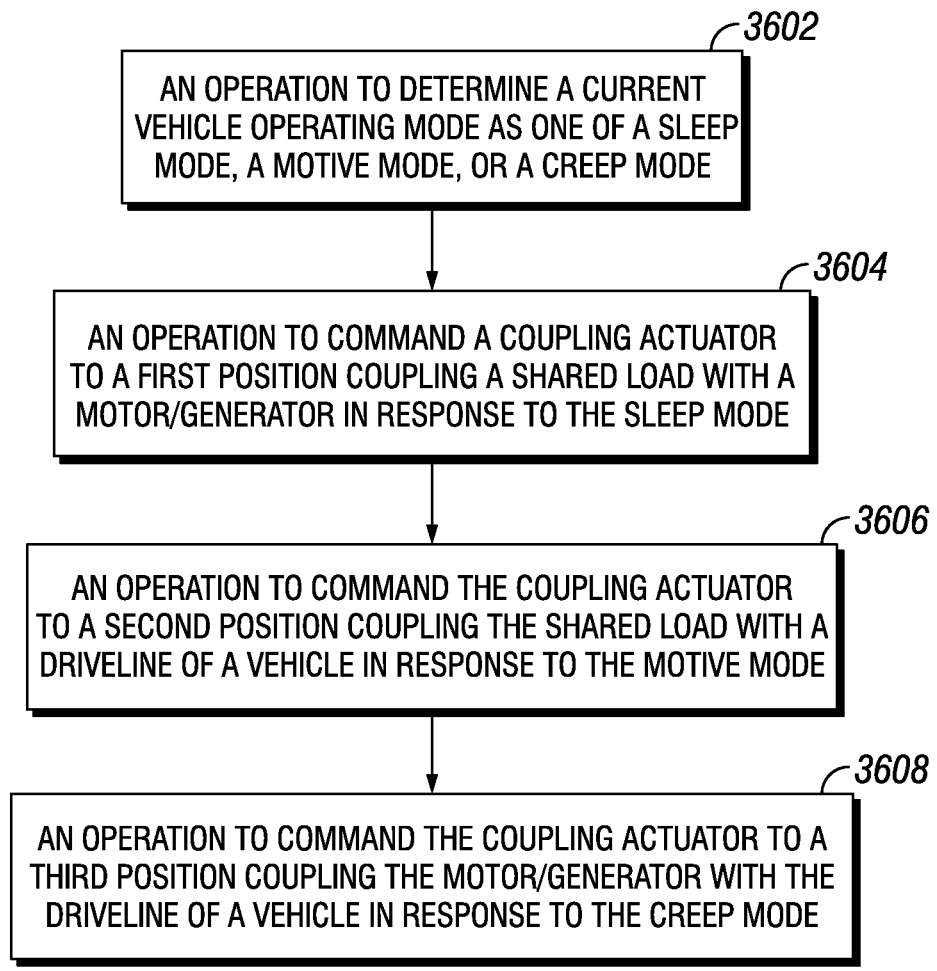
FIG. 32 is a schematic flow diagram of a procedure for operating a PTO device in selected operating modes and ratios.

Referencing FIG. 32, an example procedure includes an operation 3602 to determine a current vehicle operating mode as one of a sleep mode, a motive mode, or a creep mode; an operation 3604 to command a coupling actuator to a first position coupling a shared load with a motor/generator in response to the sleep mode; an operation 3606 to command the coupling actuator to a second position coupling the shared load with a driveline of a vehicle in response to the motive mode; and an operation 3608 to command the coupling actuator to a third position coupling the motor/generator with the driveline of the vehicle in response to the creep mode.

Certain further aspects of an example procedure are described following, any one or more of which may be present in certain embodiments. An example procedure further includes an operation to determine a reverse gearing position, and to command the coupling actuator to the third position further in response to the reverse gearing position; an operation to determine the reverse gearing position in response to a transmission state value; an operation to determine the reverse gearing position in response to a creep permission value; an operation to provide a motor/generator direction command value in response to the creep mode; an operation to determine the current vehicle operating mode as a crank mode, and commanding the coupling actuator to the third position in response to the crank mode; and/or an operation to provide the motor/generator direction command value as a first direction in response to the creep mode, and as a second direction in response to the crank mode.

Certain further aspects of an example procedure are described following, any one or more of which may be present in certain embodiments. An example procedure further includes an operation to determine a reverse gearing position; an operation to command the coupling actuator to the third position in response to a predetermined correlation between: one of the crank mode or the creep mode; and the reverse gearing position.

An example system includes a countershaft transmission, having an input shaft coupled to a prime mover, an output shaft coupled to a motive driveline, and a countershaft selectively transferring torque from the input shaft to the output shaft at selected gear ratios. The transmission further includes a PTO gear including a transmission housing access at a selected gear on the countershaft (e.g., a side access providing a coupling access to a selected gear on the countershaft). The example system further includes a PTO device structured to selectively couple to the selected gear on the countershaft; a motor/generator electrically coupled to an electrical power storage system; a shared load selectively powered by one of the selected gear or the motor/generator; and where the PTO device further includes a sliding clutch structured to couple the shared load to the motor/generator in a first position, and to the selected gear in a second position.

Certain further aspects of an example system are described following, any one or more of which may be present in certain embodiments. An example system includes a main shaft of the transmission coupled to the output shaft of the transmission (e.g., through a planetary gear assembly), and where the countershaft transfers torque to the output shaft through the main shaft (e.g., the countershaft receives torque through a first gear mesh from the input shaft, and transfers torque through a second gear mesh to the main shaft, thereby transferring torque to the output shaft). An example system includes where the selected gear on the countershaft corresponds to a direct drive gear of the input shaft (e.g., a gear at a lockup position between the input shaft and the main shaft). An example system includes where the transmission housing access includes an 8-bolt PTO interface. An example system includes where the PTO device further includes an idler gear engaging the selected gear.

An example system includes a countershaft transmission, having an input shaft coupled to a prime mover; an output shaft coupled to a motive driveline; and a countershaft selectively transferring torque from the input shaft to the output shaft at selected gear ratios; a PTO access including a rear transmission housing access positioned at the countershaft; a PTO device structured to selectively couple to the countershaft; a motor/generator electrically coupled to an electrical power storage system; a shared load selectively powered by one of the selected gear or the motor/generator; and where the PTO device further includes planetary gear assembly structured to couple the shared load to the motor/generator in a first position, and to the countershaft in a second position.

Certain further aspects of an example system are described following, any one or more of which may be present in certain embodiments. An example system includes where the PTO device further includes a splined shaft engaging the countershaft. An example system includes a clutch interposed between the motor/generator and the planetary gear assembly, where the clutch is structured to selectively disconnect the planetary gear assembly from the countershaft. An example system includes where the planetary gear assembly is further structured to further couple the motor/generator to the countershaft in the second position, and/or where the planetary gear assembly is further structured to couple the motor/generator to the countershaft in a third position, to provide a first gear ratio between the motor/generator and the countershaft in the second position, and to provide a second gear ratio between the motor/generator and the countershaft in the third position.

An example system includes a PTO device structured to selectively couple to a driveline of a vehicle; a motor/generator electrically coupled to an electrical power storage system; a shared load selectively powered by one of the driveline or the motor/generator; and where the PTO device further includes a coupling actuator structured to couple the shared load to the motor/generator at a first selected ratio in a first position (e.g., a neutral or sleep mode), and to couple the shared load to the driveline at a second selected ratio in a second position (e.g., a cruise mode or driving mode).

Certain further aspects of an example system are described following, any one or more of which may be present in certain embodiments. An example system includes where the coupling actuator is further structured to couple the motor/generator to the driveline at a third selected ratio in the second position. An example system includes where the coupling actuator is further structured to couple the motor/generator to the driveline at a fourth selected ratio in a third position (e.g., a creep mode or a cranking mode); a load drive shaft selectively coupled to the shared load, where the motor/generator powers the load drive shaft in the first position, and where the driveline powers the load drive shaft in the second position; where the coupling actuator is further structured to de-couple the shared load from the load drive shaft in the third position; and/or where the coupling actuator is further structured to de-couple the load drive shaft from the driveline in the first position. An example system includes where the motor/generator is further structured to charge the electrical power storage system in the second position.

Figure 33:
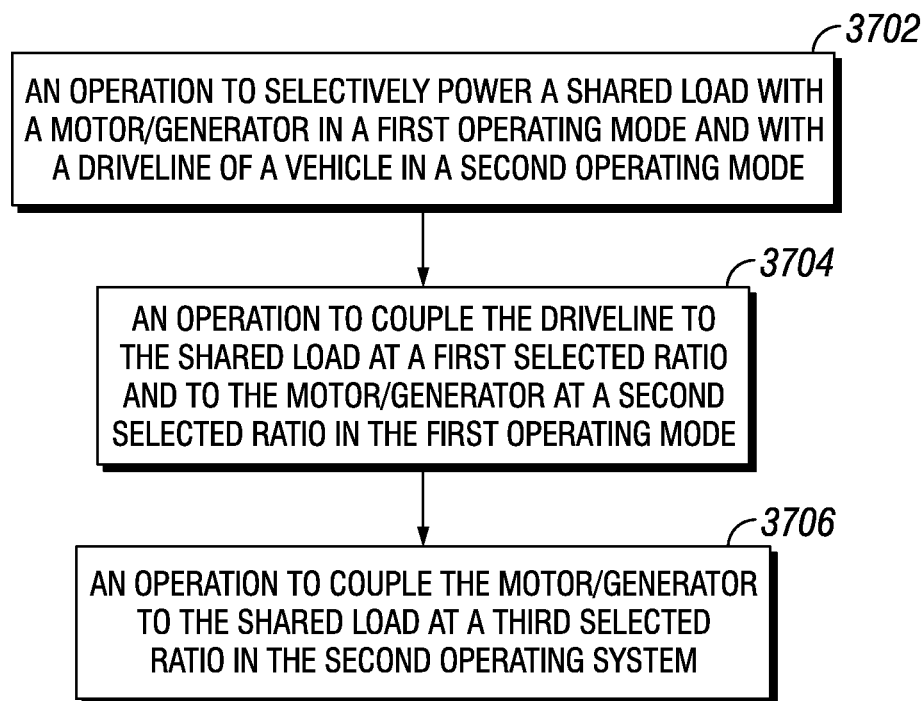
FIG. 33 is a schematic flow diagram of a procedure for operating a PTO device in selected operating modes and ratios.

Referencing FIG. 33, an example procedure includes an operation 3702 to selectively power a shared load with a motor/generator in a first operating mode and with a driveline of a vehicle in a second operating mode, where the selectively powering includes an operation 3704 to couple the driveline to the shared load at a first selected ratio and to the motor/generator at a second selected ratio in the first operating mode; and an operation 3706 to couple the motor/generator to the shared load at a third selected ratio in the second operating mode.

Certain further aspects of an example procedure are described following, any one or more of which may be present in certain embodiments. An example procedure further includes an operation to selectively power the driveline with the motor/generator in a third operating mode at a fourth selected ratio; where the third operating mode includes a creep mode, and an operation to power the driveline with the motor/generator provides motive power to the driveline; an operation to selectively power the driveline with the motor/generator in a fourth operating mode at a fifth selected ratio; and/or where the fourth operating mode includes a crank mode (e.g., providing distinct ratios between the motor/generator and the driveline between the crank mode and the creep mode), and where an operation to power the driveline with the motor/generator provides cranking power to start a prime mover coupled to the driveline.

An example system includes a PTO device structured to selectively couple to a driveline of a vehicle; a motor/generator electrically coupled to an electrical power storage system; a power flow control device (e.g., including at least one or more of an MDC 114, shift actuator 1006, gear box 108, planetary gear assembly, idler gear 1004, torque coupling, one or more clutches, and/or a coupling actuator) structured to power a shared load with a selected one of the driveline or the motor/generator; where the power flow control device is further structured to selectively transfer power between the motor/generator and the driveline; and where the power flow control device is further structured to de-couple both of the motor/generator and the shared load from the driveline when the motor/generator powers the shared load.

Certain further aspects of an example system are described following, any one or more of which may be present in certain embodiments. An example system includes where the power flow control device is further structured to power the motor/generator with the driveline to charge the electrical power storage system. An example system includes where the electrical power storage system is sized to provide a selected amount of off-line power for a selected amount of time; where the selected amount of off-line power includes at least one of the amounts consisting of: an amount of power drawn by the shared load, an amount of power to operate a climate control system of the vehicle, an amount of power to operate a climate control system of the vehicle plus vehicle living space accessories, and/or an amount of power to operate accessories of a vehicle; and/or where the selected amount of time includes at least one of the amounts of time consisting of: 30 minutes, 2 hours, 8 hours, 10 hours, 12 hours, and 24 hours. An example system includes power electronics (e.g., an inverter, a rectifier, and/or a DC/DC converter) disposed between the electrical power storage system and at least one accessory of the vehicle, where the power electronics are structured to configure electrical power provided from the electrical power storage to an electrical power format (e.g., a voltage level, an RMS voltage, a frequency, a phase, and/or a current value) for the at least one accessory; and/or where each of the at least one accessories comprise one of a nominal 12V DC (e.g., 11.5-12.5V, 10.5-14V, 9V-15V, etc.) accessory and a nominal 110V AC (e.g., 110V, 115V, 120V, 50 Hz, 60 Hz, etc.) accessory. An example system includes where the power flow control device is further structured to de-couple the motor/generator from the shared load when the motor/generator powers the driveline; and/or where the power flow control device is further structured to provide a first gear ratio between the motor/generator and the driveline when powering the motor/generator from the driveline, and to provide a second gear ratio between the motor/generator and the driveline when powering the driveline with the motor/generator. An example system includes where the power flow control device including a planetary gear assembly structured to route power between the shared load, the motor/generator, and the driveline; where the planetary gear assembly further includes a driven gear coupled to a countershaft gear; and/or where the power flow control device further includes an idler gear interposed between the driven gear and the countershaft gear.

Figure 34:
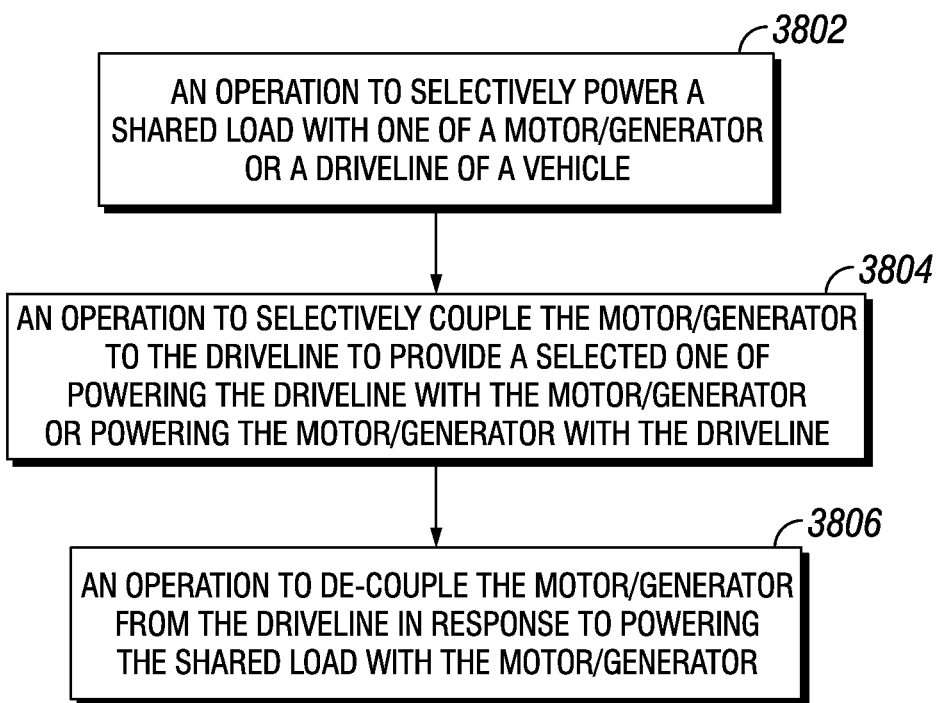
FIG. 34 is a schematic flow diagram of a procedure for operating a PTO device.

Referencing FIG. 34, an example procedure includes an operation 3802 to selectively power a shared load with one of a motor/generator or a driveline of a vehicle; an operation 3804 to selectively couple the motor/generator to the driveline to provide a selected one of powering the driveline with the motor/generator or powering the motor/generator with the driveline; and an operation 3806 to de-couple the motor/generator from the driveline in response to powering the shared load with the motor/generator.

Certain further aspects of an example procedure are described following, any one or more of which may be present in certain embodiments. An example procedure further includes an operation to couple the motor/generator to the driveline to charge an electrical power storage system; and operation to power an off-line device with at least one of the motor/generator or the electrical power storage system in response to a prime mover of the vehicle being shut down (e.g., keyswitch is off, motive power request is zero, keyswitch is in an auxiliary position, a state value indicates the prime mover is shutting down, and/or a speed value of the prime mover indicates shutdown, etc.); an operation to configure electrical power from the electrical power storage system to an electrical power format for the off-line device; where the shared load includes a climate control device for the vehicle, and an operation to selectively power the shared load with the motor/generator is in response to the prime mover of the vehicle being shut down.

Figure 35:
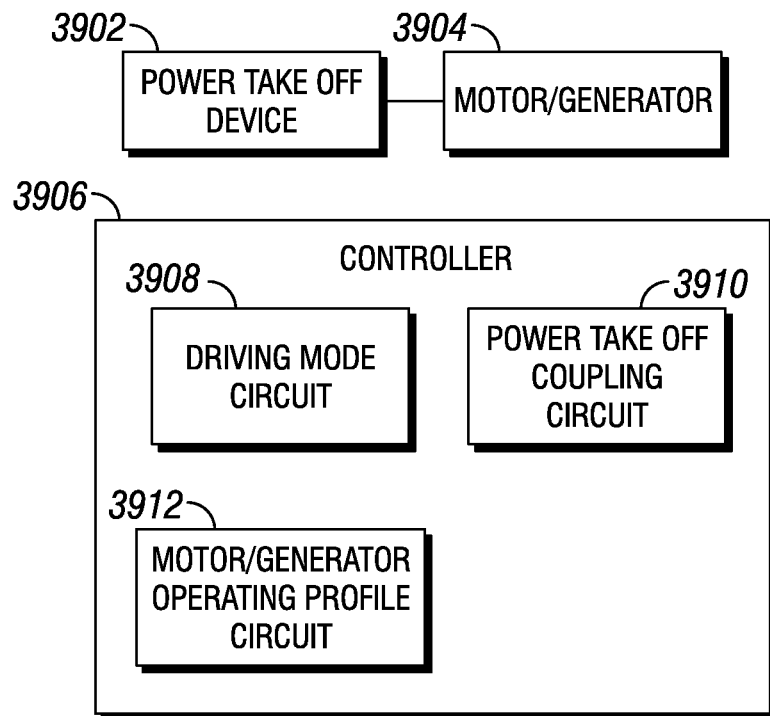
FIG. 35 is a schematic control diagram of an example PTO device.

Referencing FIG. 35, an example system includes a PTO device 3902 structured to selectively couple to a driveline of a vehicle; a motor/generator 3904 electrically coupled to an electrical power storage system; a controller 3906, including: a driving mode circuit 3908 structured to determine a current vehicle operating mode as one of a motive power mode or a charging mode; a PTO coupling circuit 3910 structured to provide a motive power coupling command in response to the motive power mode, and to provide a charge coupling command in response to the charging mode; and where the PTO device includes a coupling actuator responsive to the motive power coupling command to couple the motor/generator to the driveline of the vehicle in a first gear ratio, and responsive to the charge coupling command to couple the motor/generator to the driveline of the vehicle in a second gear ratio.

Certain further aspects of an example system are described following, any one or more of which may be present in certain embodiments. An example system includes where the motive power mode includes one of a crank mode, a creep mode, or a launch mode. An example system includes where the driving mode circuit 3908 is further structured to determine the charging mode in response to a state of charge of the electrical power storage system. An example system includes an accessory, and where the coupling actuator selectively couples the accessory to one of the driveline or the motor/generator; and/or where the driving mode circuit 3908 is further structured to determine the current vehicle operating mode as a sleep mode, where the PTO coupling circuit 3910 is further structured to provide a sleep power command in response to the sleep mode, and where the coupling actuator is further responsive to couple the motor/generator to the accessory in response to the sleep power command. An example system includes a motor/generator operating profile circuit 3912 structured to determine a motor/generator efficient operating point, and where the PTO coupling circuit 3910 is further structured to adjust the charge coupling command in response to the motor/generator efficient operating point, and where the coupling actuator is further responsive to the adjusted charge coupling command to couple the motor/generator to the driveline of the vehicle in a selected one of the first gear ratio and the second gear ratio.

Figure 36:
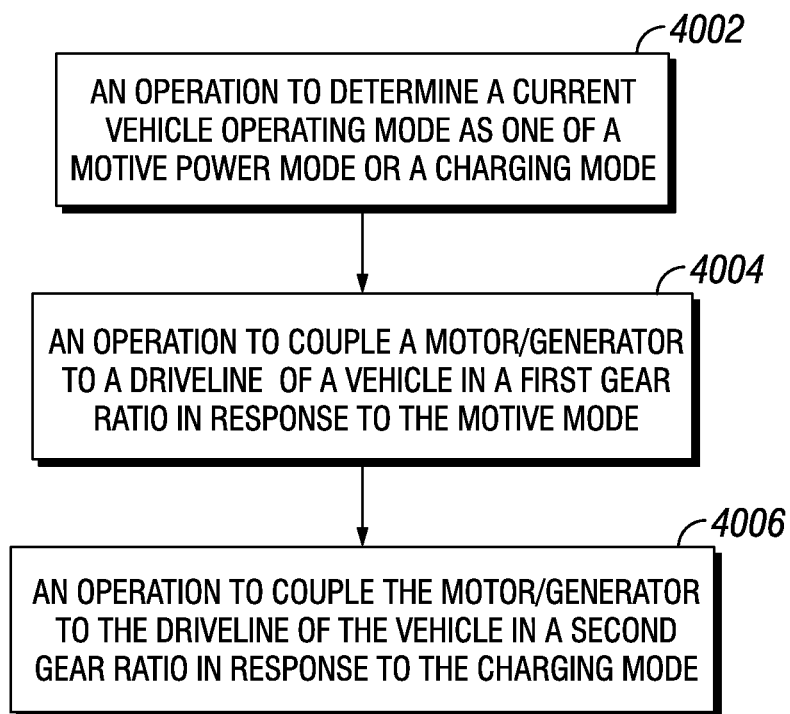
FIG. 36 is a schematic flow diagram of a procedure for operating a PTO device.

Referencing FIG. 36, an example procedure includes an operation 4002 to determine a current vehicle operating mode as one of a motive power mode or a charging mode;

an operation 4004 to couple a motor/generator to a driveline of a vehicle in a first gear ratio in response to the motive power mode; and an operation 4006 to couple the motor/generator to the driveline of the vehicle in a second gear ratio in response to the charging mode.

Certain further aspects of an example procedure are described following, any one or more of which may be present in certain embodiments. An example procedure further includes an operation to determine a state of charge of an electrical power storage system electrically coupled to the motor/generator, and determining the vehicle operating mode as the charging mode further in response to the state of charge of the electrical power storage system; an operation to power an accessory from a selected one of the driveline and the motor/generator; an operation to determine the vehicle operating mode as a sleep mode, and selecting the motor/generator to power the accessory in response to the sleep mode; an operation to select the one of the driveline and the motor/generator in response to the state of charge of the electrical power storage system; and/or an operation to determine a motor/generator efficient operating point (e.g., a speed and/or torque output of the motor/generator that is in a high efficiency operating region, and/or that is in an improved efficiency operating region; where the operation to determine the motor/generator efficient operating point may further include searching the space of available operating points based on available gear ratio selections), and coupling the motor/generator to the driveline of the vehicle in a selected one of the first gear ratio and the second gear ratio further in response to the motor/generator efficient operating point.

Figure 37:
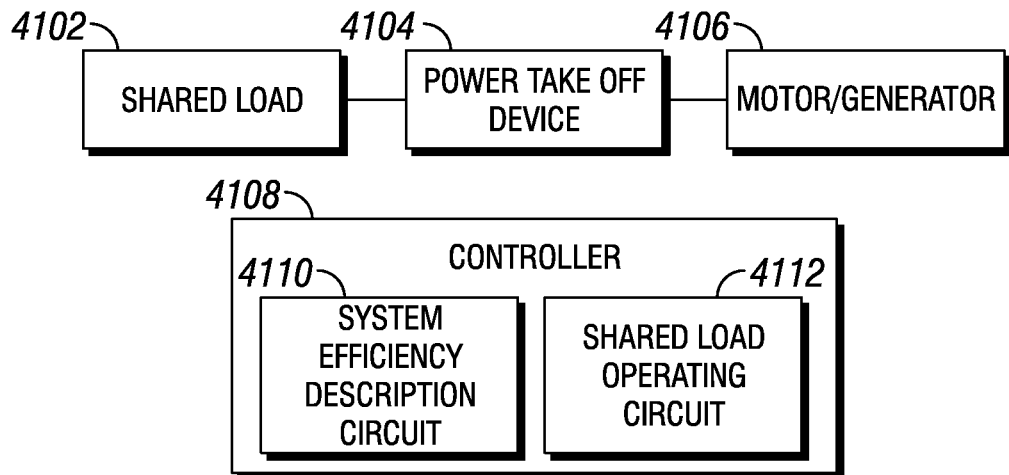
FIG. 37 is a schematic control diagram of an example PTO device.

Referencing FIG. 37, an example system includes a PTO device 4104 structured to selectively couple to a driveline of a vehicle; a motor/generator 4106 electrically coupled to an electrical power storage system; a shared load 4102 selectively powered by one of the driveline or the motor/generator; and where the PTO device further includes a coupling actuator structured to couple: the shared load to the motor/generator in a first position; the shared load and the motor/generator to the driveline in a second position; and the shared load to the driveline in a third position.

Certain further aspects of an example system are described following, any one or more of which may be present in certain embodiments. An example system includes where the coupling actuator includes a planetary gear assembly having a planetary gear with three positions, where a first position of the planetary gear couples the motor/generator to the driveline in a first gear ratio, where a second position of the planetary gear couples the motor/generator to the driveline in a second gear ratio, and where a third position de-couples the motor/generator from the driveline; a load drive shaft, where the coupling actuator further includes at least one of a clutch and a second planetary gear, and where the at least one of the clutch and the second planetary gear couple the shared load to the load drive shaft in a first position, and de-couple the shared load from the load drive shaft in a second position; and/or a third planetary gear coupling the motor/generator to the load drive shaft. An example system includes a controller 4108, the controller including a system efficiency description circuit 4110 structured to determine at least one efficiency value selected from the efficiency values consisting of: a driveline efficiency value, a motor/generator efficiency powering value, and a motor/generator efficiency charging value; and a shared load operating circuit 4112 structured to command the coupling actuator in response to the at least one efficiency value; and where the coupling actuator is responsive to the command. An example system includes where the system efficiency description circuit is further structured to determine a state of charge of the electrical power storage system, and where the shared load operating circuit is further structured to command the coupling actuator in response to the state of charge.

Figure 38:
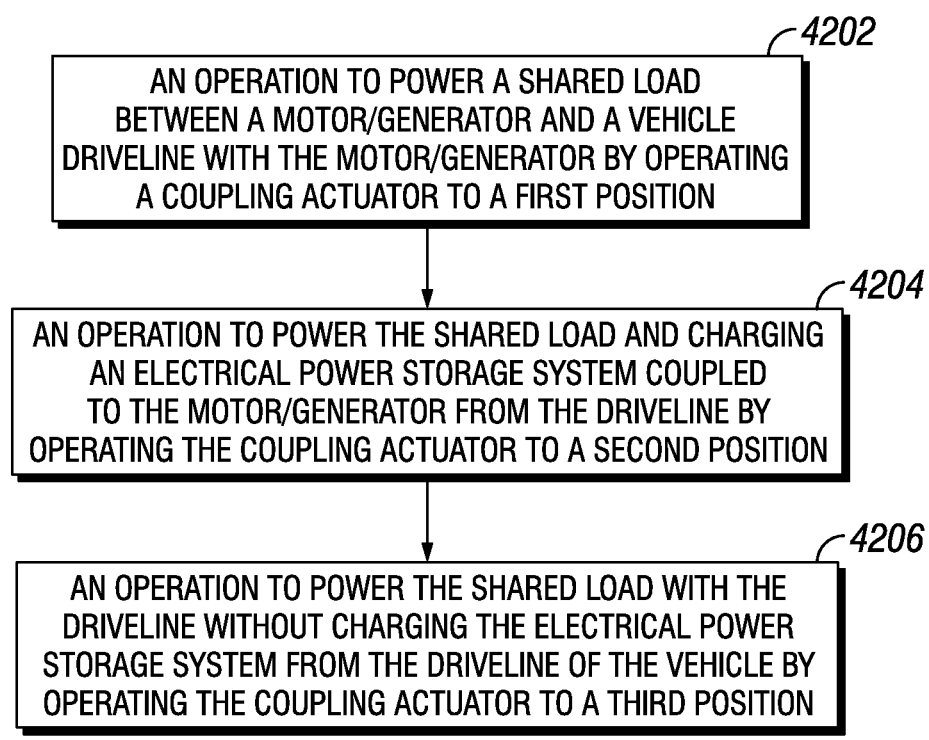
FIG. 38 is a schematic flow diagram of a procedure for operating a PTO device.

Referencing FIG. 38, an example procedure includes an operation 4202 to power a shared load between a motor/generator and a vehicle driveline with the motor/generator by operating a coupling actuator to a first position; an operation 4204 to power the shared load and to charge an electrical power storage system coupled to the motor/generator from the driveline by operating the coupling actuator to a second position; and an operation 4206 to power the shared load with the driveline without charging the electrical power storage system from the driveline of the vehicle by operating the coupling actuator to a third position.

Certain further aspects of an example procedure are described following, any one or more of which may be present in certain embodiments. An example procedure further includes where operating the coupling actuator includes an operation to operate an actuator for a planetary gear assembly; and/or operating the coupling actuator includes an operation to operate a clutch between the shared load and a load drive shaft of the planetary gear assembly. An example procedure further includes an operation to determine at least one efficiency value selected from the efficiency values consisting of: a driveline efficiency value (e.g., considering total rolling or load effective efficiency, prime mover, transmission, downstream driveline components, rolling friction, and/or wind resistance; and where efficiency is determined in terms of cost, time, and/or mission capability), a motor/generator efficiency powering value, and a motor/generator efficiency charging value; and further operating the coupling actuator in response to the at least one efficiency value; and/or an operation to determine a state of charge of the electrical power storage system, and further operating the coupling actuator in response to the state of charge.

An example system includes a PTO device including a torque coupler between an accessory load drive shaft and a driveline of a vehicle; a one-way overrunning clutch interposed between the torque coupler and the accessory load drive shaft; and a motor/generator coupled to the accessory load drive shaft. An example one-way overrunning clutch allows torque transfer from the driveline to the load drive shaft when the driveline is turning faster (after applied gear ratios) than the load drive shaft, and allows slipping when the driveline is slower than the load drive shaft.

Certain further aspects of an example system are described following, any one or more of which may be present in certain embodiments. An example system includes where the torque coupler includes at least one coupler selected from the couplers consisting of: a chain, an idler gear engaging a countershaft gear on the driveline side and a driven gear on the accessory load drive shaft side, and a layshaft interposed between the driveline side and the accessory load drive shaft side.

Figure 39:
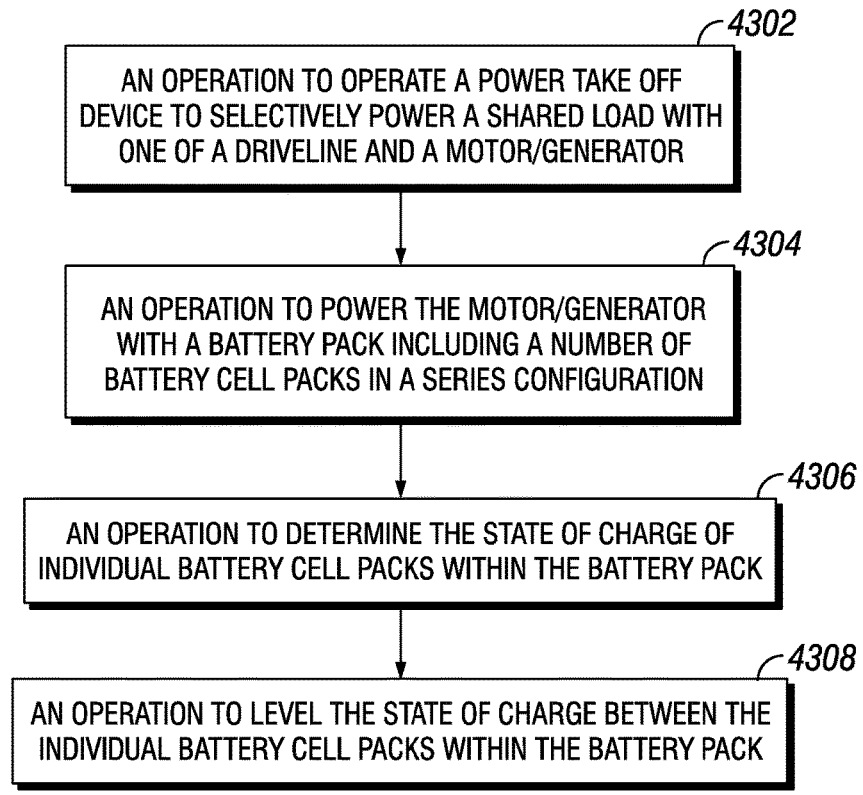
FIG. 39 is a schematic flow diagram of a procedure for operating a PTO device and management a battery pack.

Referencing FIG. 39, an example procedure includes an operation 4302 to operate a PTO device to selectively power a shared load with one of a driveline and a motor/generator; an operation 4304 to power the motor/generator with a battery pack including a number of battery cell packs in a series configuration; an operation 4306 to determine the state of charge of individual battery cell packs within the battery pack; and an operation 4308 to level the state of charge between the individual battery cell packs within the battery pack.

Certain further aspects of an example procedure are described following, any one or more of which may be present in certain embodiments. An example procedure further includes an operation to resistively discharge a higher charged battery cell pack of the battery pack. An example procedure further includes an operation to couple battery cell packs of the battery pack with a flyback converter with an isolation transformer. An example procedure further includes an operation to power a useful load with a higher charged battery cell pack of the battery pack; an operation to process the discharge power from the higher charged battery cell pack of the battery pack through power electronics to configure the discharge power to an electrical power format for the useful load. An example procedure further includes an operation to select a discharge operation in response to a state of charge difference between a higher charged battery cell pack of the battery pack and a lower charged battery cell pack of the battery pack. An example procedure further includes an operation to perform a service operation to replace at least a portion of the battery pack at 18 months of service; where the battery pack includes eight nominal 12V battery cell packs, including an operation to couple into two parallel packs of four series batteries, and where the service operation includes replacing one of the two parallel packs of batteries. An example procedure further includes an operation to perform a service operation to replace at least a portion of the battery pack at 24 months of service; where the battery pack includes eight nominal 12V battery cell packs, coupled into two parallel packs of four series batteries, and where the service operation includes replacing one of the two parallel packs of batteries.

Figure 40:
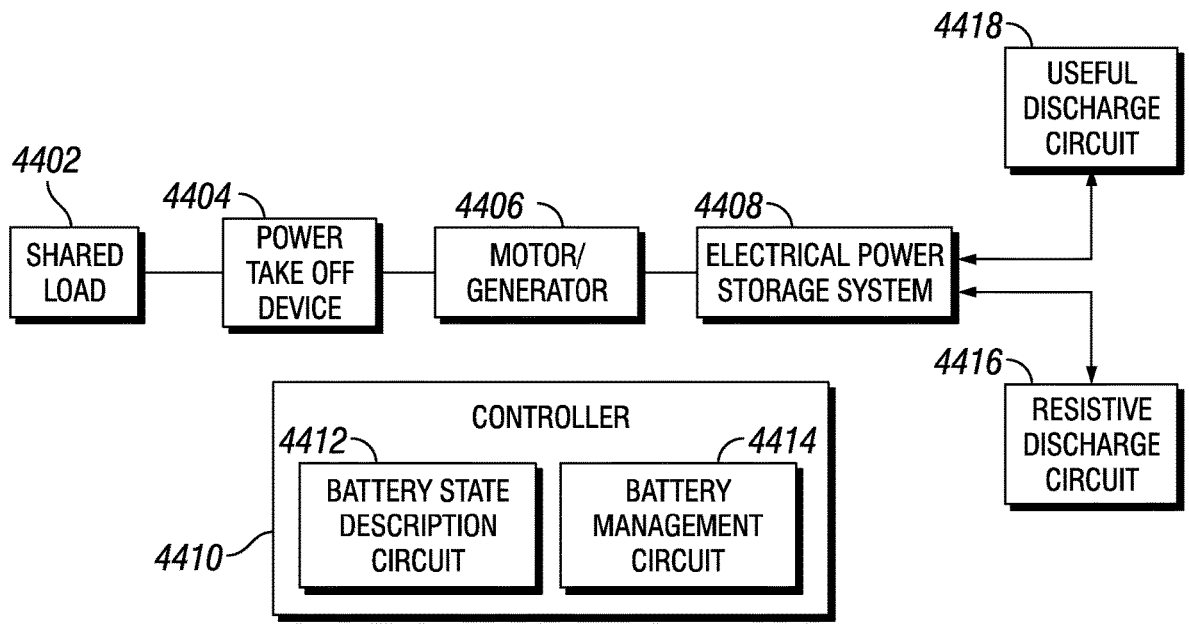
FIG. 40 is a schematic control diagram of an example PTO device.

Referencing FIG. 40, an example system includes a PTO device 4404 structured to selectively couple to a driveline of a vehicle; an electrical power storage system 4408 including a battery pack including a plurality of battery cell packs in a series configuration; a motor/generator 4406 electrically coupled to the electrical power storage system; a shared load 4402 selectively powered by one of the driveline or the motor/generator; and a controller 4410, including: a battery state description circuit 4412 structured to determine a state of charge of each of the plurality of battery cell packs; and a battery management circuit 4414 structured to provide a charge leveling command in response to the state of charge between each of the plurality of battery cell packs.

Certain further aspects of an example system are described following, any one or more of which may be present in certain embodiments. An example system includes a voltage sensor coupled to each of the plurality of battery cell packs, and where the battery state description circuit is further structured to determine the state of charge of each of the plurality of battery cell packs in response to a voltage value from each of the voltage sensors; and/or a temperature sensor coupled to each of the plurality of battery cell packs, and where the battery state description circuit 4412 is further structured to determine the state of charge of each of the plurality of battery cell packs in response to a temperature value from each of the temperature sensors. An example system includes where the battery management circuit 4414 is further structured to provide the charge leveling command as a resistive discharge command, the system further including a resistive discharge circuit 4416 for each of the plurality of battery cell packs, where the resistive discharge circuits are responsive to the resistive discharge command. An example system includes where the battery management circuit 4414 is further structured to provide the charge leveling command as a useful discharge command, the system further including a useful discharge circuit 4418 configured to power a useful load with a higher charged battery cell pack of the plurality of battery cell packs in response to the useful discharge command; where the useful discharge circuit 4418 further includes power electronics structured to configure discharge power from the higher charged battery cell pack of the plurality of battery cell packs to an electrical power format for the useful load; where each of the plurality of battery cell packs includes a nominal 12V lead-acid battery; where the battery pack includes four of the plurality of battery cell packs coupled in series; where the battery management circuit 4414 is further structured to provide the charge leveling command as a useful discharge command, the system further including a useful discharge circuit 4418 configured to power a useful load with a higher charged battery cell pack of the plurality of battery cell packs in response to the useful discharge command; where the useful load includes a nominal 12V load on the vehicle; where the useful discharge circuit 4418 further includes power electronics structured to configure discharge power from the higher charged battery cell pack of the plurality of battery cell packs to an electrical power format for the useful load; and/or where the useful load includes a nominal 48V load on the vehicle.

An example system includes a PTO device structured to selectively couple to a driveline of a vehicle; an electrical power storage system including a battery pack including a plurality of battery cell packs in a series configuration; a motor/generator electrically coupled to an electrical power storage system; a shared load including a nominal 48V load, where the shared load is selectively powered by one of the driveline or the motor/generator; and where the PTO device further includes a coupling actuator structured to couple the shared load to the motor/generator in a first position, and to the driveline in a second position.

Certain further aspects of an example system are described following, any one or more of which may be present in certain embodiments. An example system includes where the shared load includes a 5 kW average load device. An example system includes where the shared load includes a 10 kW peak load device; where the battery pack includes eight nominal 12V battery cell packs, coupled into two parallel packs of four series batteries; where each of the battery cell packs includes a lead-acid battery; where each of the lead-acid batteries includes an absorbent glass mat battery; where the shared load includes a 2.5 kW average load device; where the shared load includes a 5 kW peak load device; where the battery pack includes four nominal 12V battery cell packs coupled in series; where each of the battery cell packs includes a lead-acid battery; and/or where each of the lead-acid batteries includes an absorbent glass mat battery.

An example system includes a PTO device structured to selectively couple to a driveline of a vehicle; a motor/generator electrically coupled to an electrical power storage system, where the motor/generator includes a nominal 48V motor; a nominal 12V power supply electrically coupled to a field coil of the motor/generator; a shared load selectively powered by one of the driveline or the motor/generator; where the PTO device further includes a coupling actuator structured to couple the shared load to the motor/generator in a first position, and to the driveline in a second position.

Figure 41:
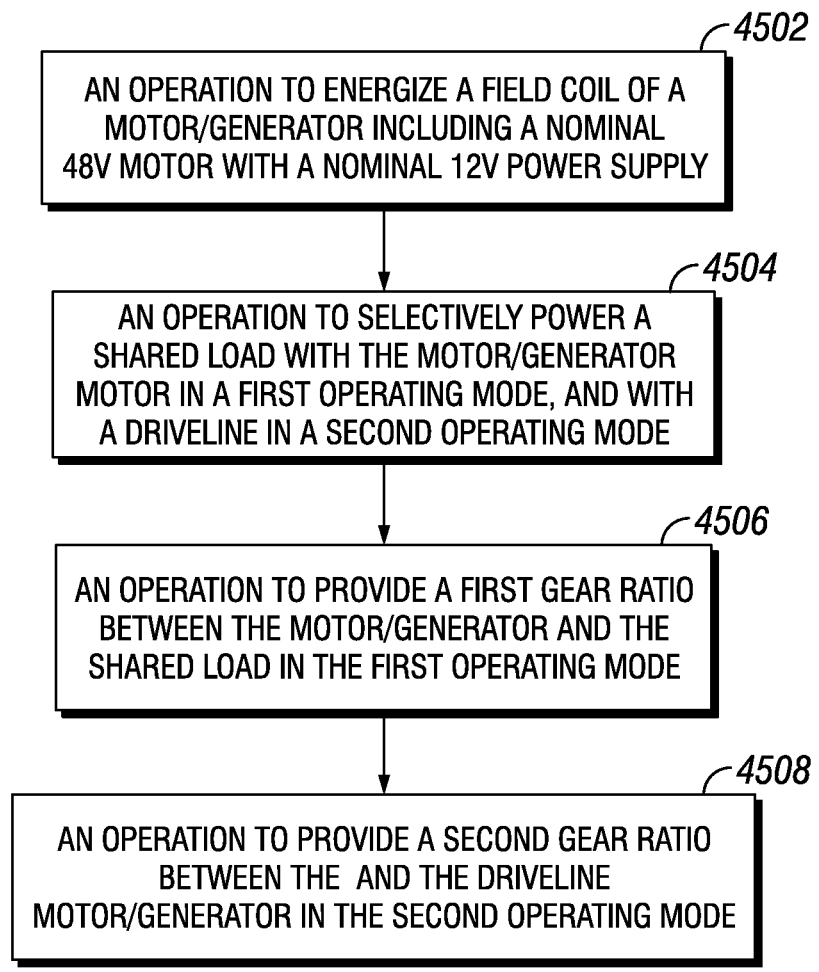
FIG. 41 is a schematic flow diagram of a procedure for operating a PTO device.

Referencing FIG. 41, an example procedure includes an operation 4502 to energize a field coil of a motor/generator including a nominal 48V motor with a nominal 12V power supply (e.g., using a low voltage power supply to energize a higher voltage motor coil); an operation 4504 to selectively power a shared load with the motor/generator motor in a first operating mode, and with a driveline in a second operating mode; an operation 4506 to provide a first gear ratio between the motor/generator and the shared load in the first operating mode; and an operation 4508 to provide a second gear ratio between the driveline and the motor/generator in the second operating mode.

Figure 42:
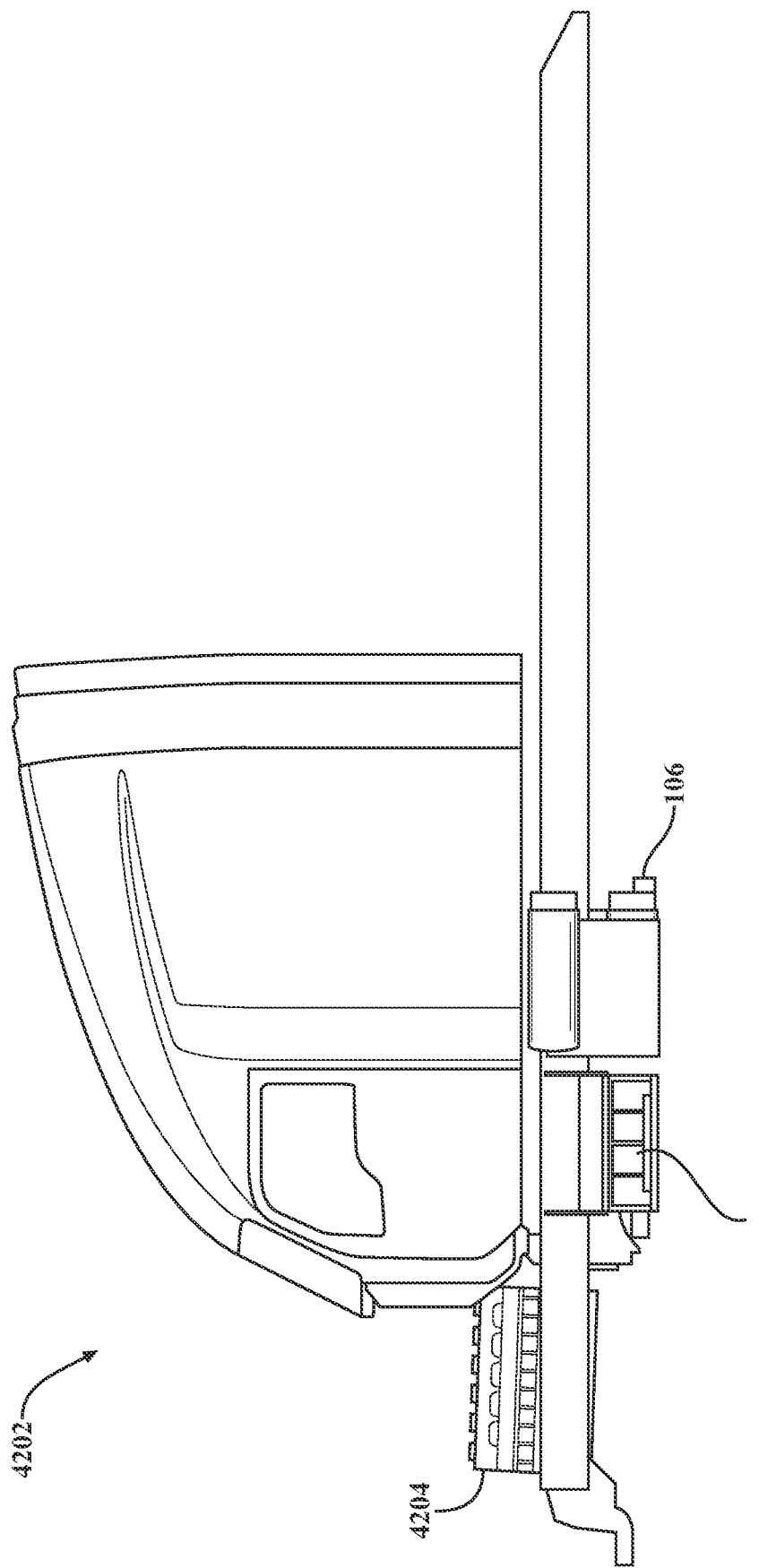
FIG. 42 is a schematic side view depiction of an example battery assembly.

FIG. 42 is a schematic side view depiction of an example battery assembly 116. The example of FIG. 42 shows a typical arrangement of a battery pack for a PTO device 106 consistent with certain embodiments herein. The example of FIG. 42 depicts a motive application 4202 having a prime mover 4204 and a driveline (not shown—e.g., mechanical coupling between the prime mover 4204 and a load such as a drive wheel). The example of FIG. 42 includes an electrical power storage system including a number of batteries, and a battery assembly 116. In certain embodiments, the battery assembly 116 includes housing compartments holding groups of one or more of the batteries (e.g., one, two, or four batteries for each housing compartment). The usage of housing compartments provide for one or more of: convenient mounting for aspects of connections and control of the electrical power storage to a PTO device 106; containment, protection, and/or access control to the batteries and/or to an electrical connection between the batteries and the motor/generator; and/or standardization of an installation (e.g., footprint, assembly procedures, repair procedures, etc.) of the battery assembly into a motive application. The PTO device 106 may be a PTO device consistent with any aspect of the present disclosure, and in certain embodiments includes a motor/generator selectively couplable to the driveline (e.g., interfacing a gear of the transmission of the driveline), and capable to selectively transfer power to the driveline from the batteries, or to the batteries from the driveline. In certain embodiments, the motor/generator may be selectively couplable to a separate load (e.g., an HVAC for the motive application 4202, or other load as described throughout the present disclosure), and/or the separate load may be selectively couplable to the driveline.

Figure 43:
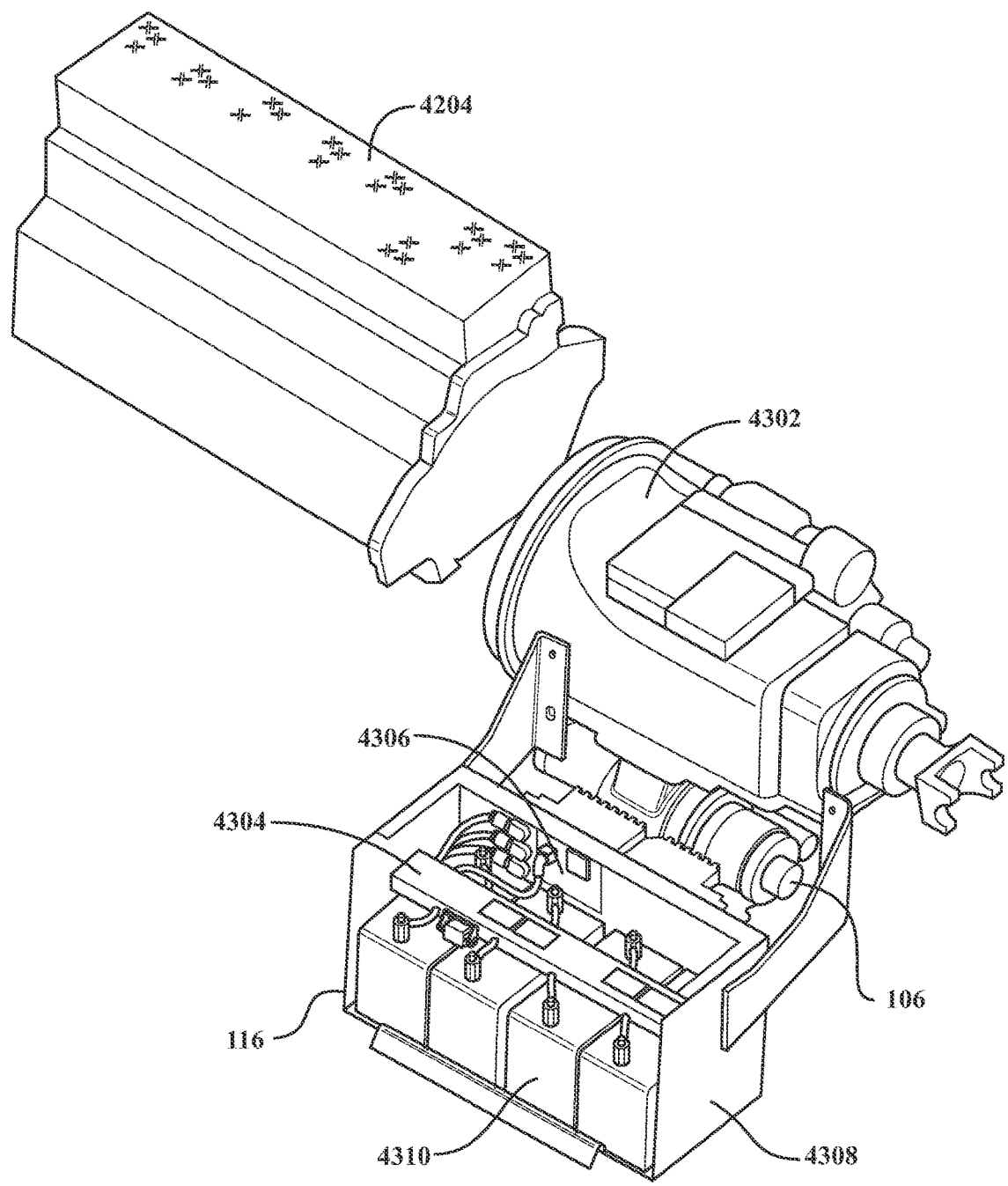
FIG. 43 is a schematic perspective view of a PTO device with an example battery assembly.

Referencing FIG. 43, a schematic perspective view of a PTO device with an example battery assembly, shown with the PTO device and certain powertrain components, such as an engine 4204 and a transmission 4302. The PTO device 106 transfers power between the driveline and the motor/generator (and ultimately the battery pack and/or a shared load). The PTO device 106 includes a motor/generator, and my further include The battery assembly 116 selectively stores and discharges power to improve overall vehicle efficiency, to reduce idling time, or to support other vehicle functions. The example battery assembly 116 depicted in FIG. 43 is consistent with a battery assembly 116 compatible for installation with a motive application 4202 such as that depicted in FIG. 42.

The example configuration of FIG. 43 includes a bus bar 4304 positioned above a number of batteries 4310, positioned within a housing compartment 4308. The example configuration of FIG. 43 further depicts a motor drive controller (MDC) 4306 mounted to a wall of the housing compartment 4308. The example MDC 4306 is mounted on an outside wall of the housing compartment 4308, and includes electrical connections extending into the housing compartment 4308. The MDC 4306 may include power electronics, for example to convert between DC power to or from the batteries 4310, and AC power respectively from or to the motor/generator 106. In certain embodiments, the MDC 4306 may further include additional electrical interfaces (e.g., to a vehicle electrical system, an auxiliary load, or the like) which may be DC or AC interfaces, and/or control functions (e.g., fault management, network communications, controlling connection or disconnection functions of electrical interfaces, etc.).

Figure 44:
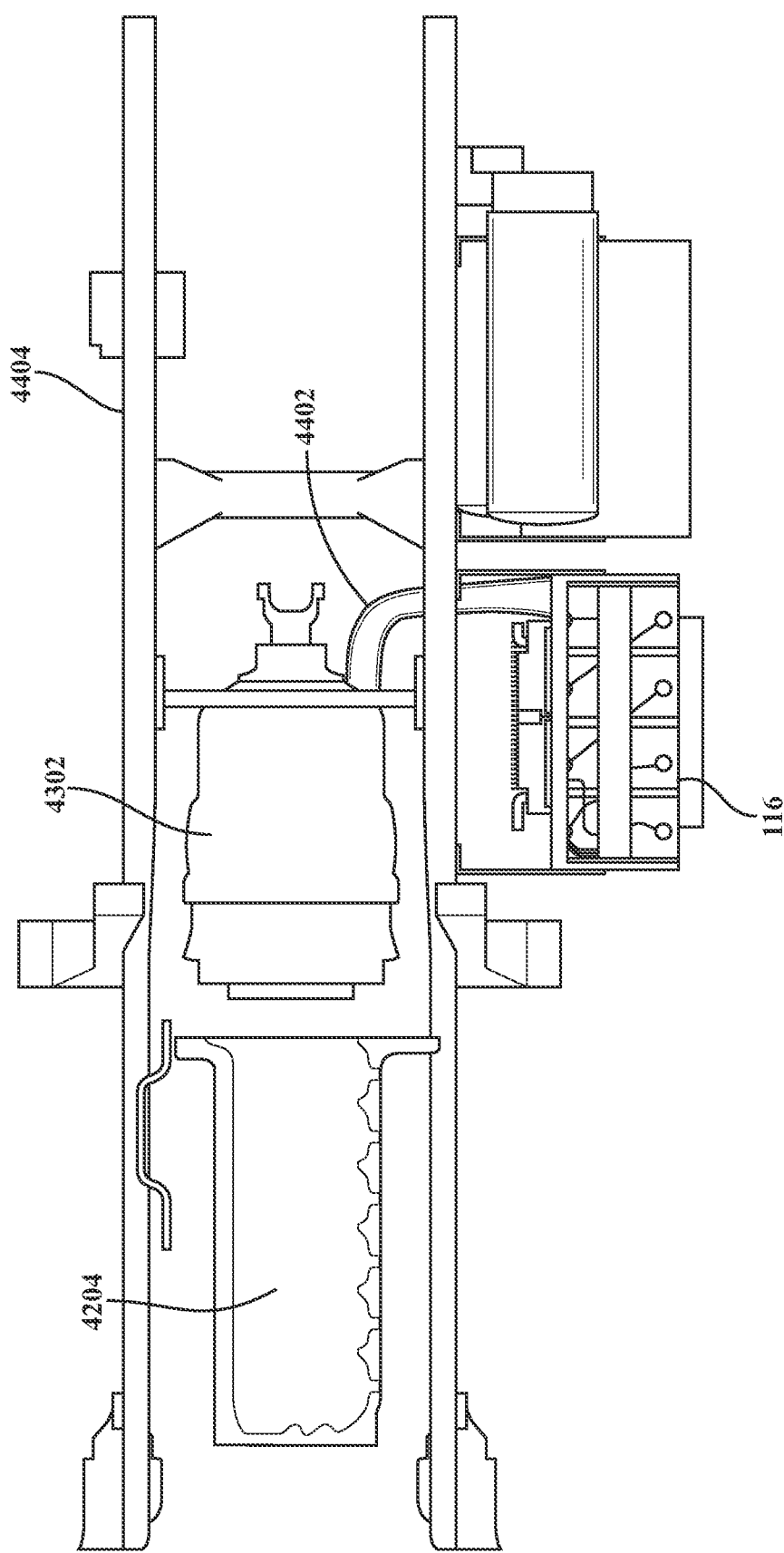
FIG. 44 is a schematic top view of an example battery assembly.

FIG. 44 is a schematic top view of the example battery assembly 116 with certain features removed (e.g., the PTO device, and portions of the vehicle) to more clearly depict the example arrangement of the battery assembly 116 within the vehicle space. The example of FIG. 44 depicts the battery assembly 116 mounted outside the frame rail 4404 of a motive application. The example of FIG. 44 additionally depicts an air conduit 4402 that fluidly couples the battery assembly 116 to the motor/generator 106. Additional example details relating to the air conduit 4402 are set forth in other portions of the present disclosure.

Figure 45:
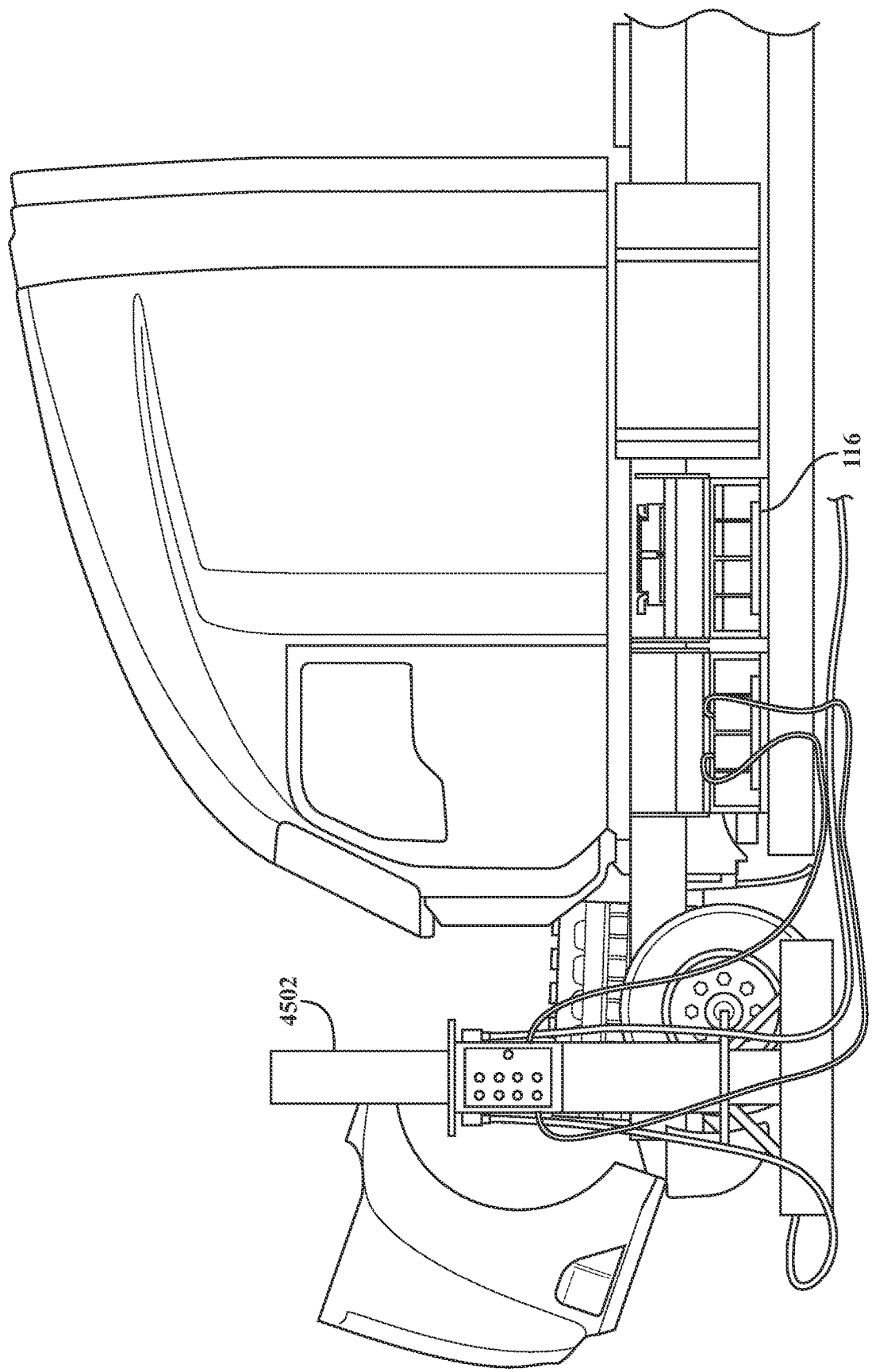
FIG. 45 depicts an example battery assembly installed on a vehicle.

FIG. 45 depicts an example battery assembly 116 installed on a vehicle. In the example of FIG. 45, an 8-battery assembly is depicted, with a first group of four batteries, and a second group of four batteries on the left. Additionally or alternatively, a test unit 4502 may be coupled to the battery assembly 116, which may be a service tool or other device structured to communicate with the battery assembly 116. In certain embodiments, the test unit 4502 may be coupled to a vehicle CAN network, a control port on the MDC, or other connection arrangement. In certain embodiments, the test unit 4502 may communicate with the battery assembly 116 wirelessly, through a cloud connection, or the like. In certain embodiments, the test unit 4502 can be utilized to determine fault code information, operational history, to change calibration values, and/or to command connection or disconnection of electrical interfaces, relays, or switches.

Figure 46:
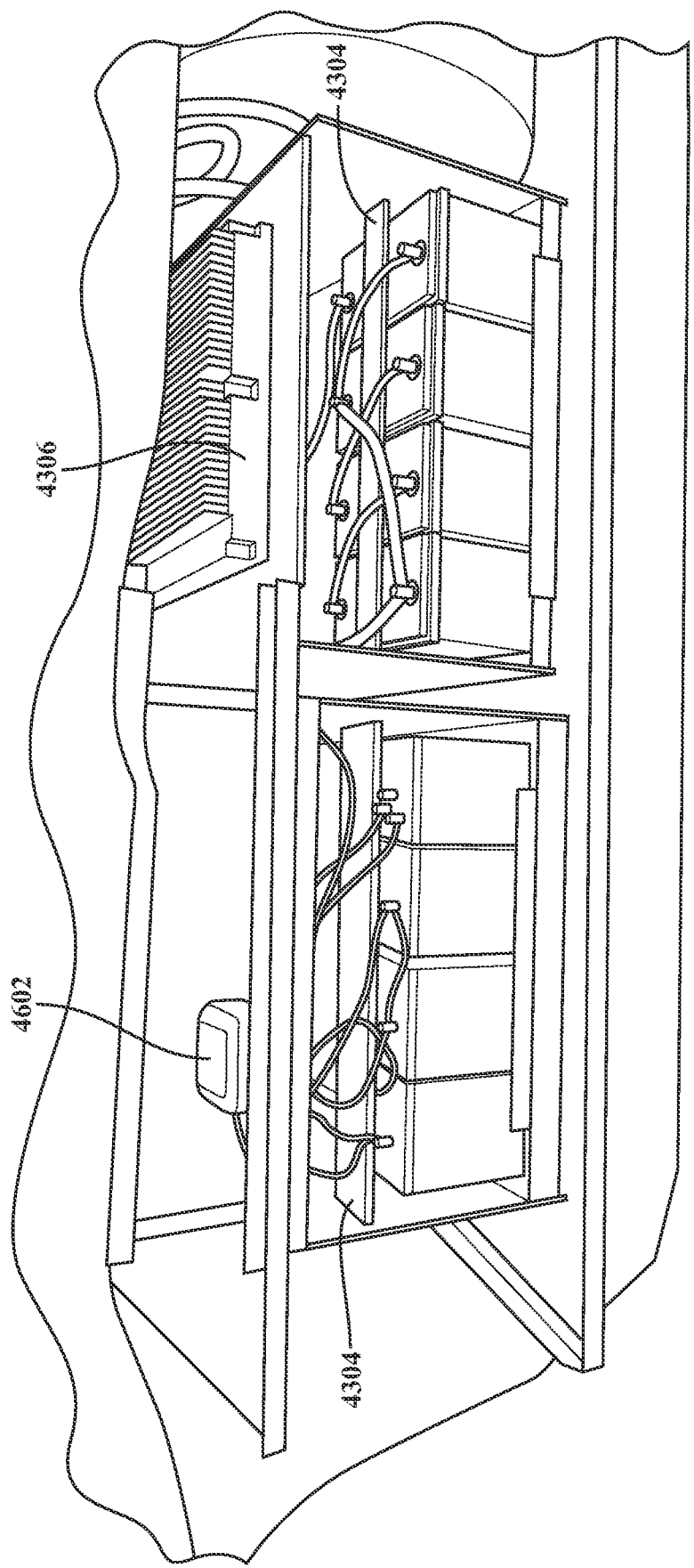
FIG. 46 depicts an example battery assembly installed on a vehicle.

FIG. 46 depicts an example battery assembly installed on a vehicle, and is a close-up view of an arrangement consistent with the depiction of FIG. 45. The example of FIG. 46 depicts a bus bar 4304, which is utilized to contain the batteries within the housing in the example of FIG. 46. The bus bar 4304 may additionally or alternatively be utilized to route the terminal connections between the battery terminals and the MDC 4306 as set forth in other embodiments described following. The example of FIG. 46 depicts a connection relay 4602 which may be utilized to control connection or disconnection of the batteries from the motor/generator, the vehicle electrical system, and/or auxiliary loads. In certain embodiments, the connection relay 4602 may be controlled by the MDC 4306. In certain embodiments, more than one connection relay 4602 may be present—for example to a low power DC load (e.g., to the vehicle electrical system), to a high power DC load (e.g., to an auxiliary load), and/or to the motor/generator.

Figure 47:
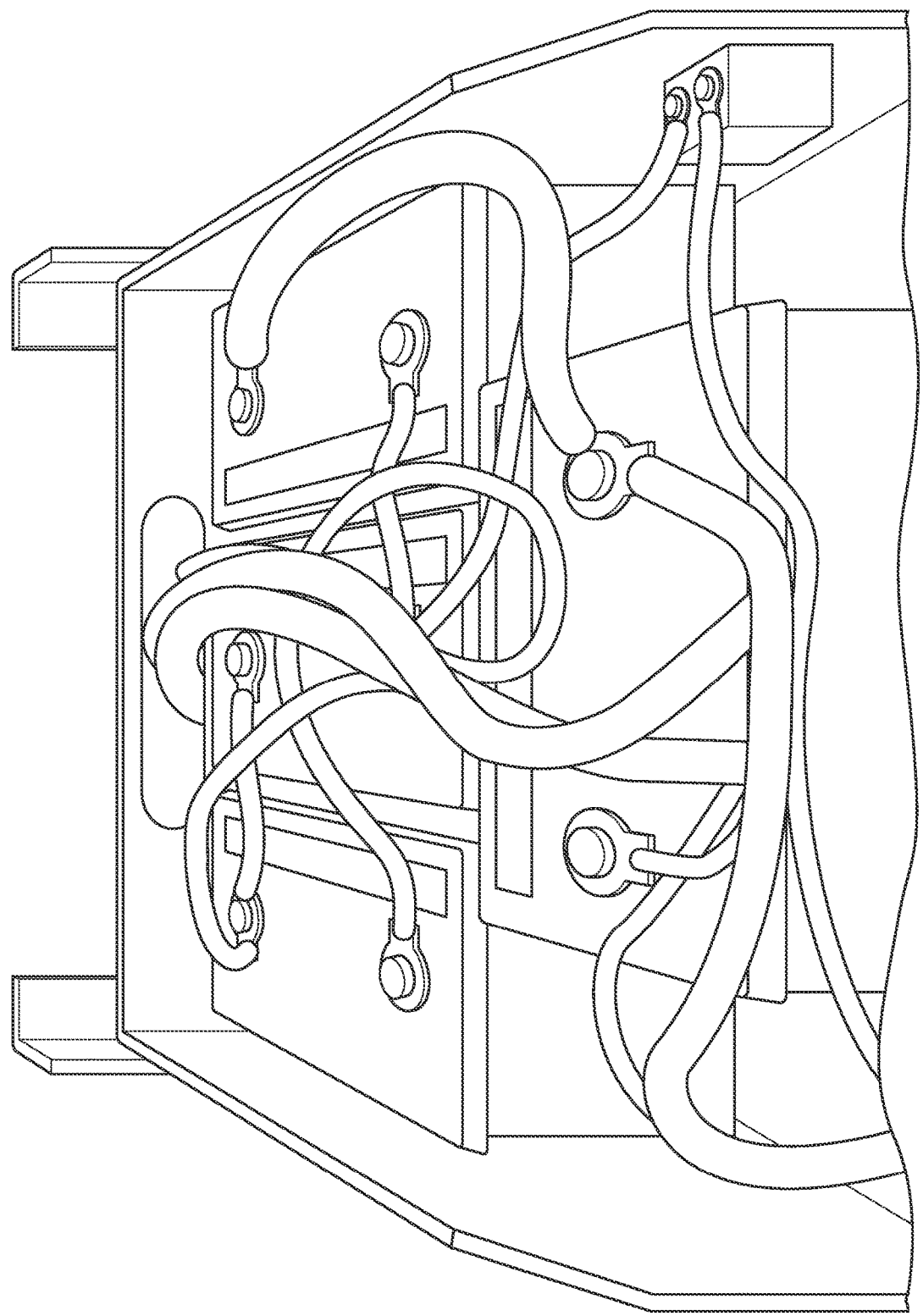
FIG. 47 depicts a previously known battery assembly.

FIG. 47 depicts a previously known battery assembly. The assembly of FIG. 47 arranges eight batteries into a 48V configuration within a housing using a number of wiring harnesses and connections. The example of FIG. 47 results in long runs for various connections, including high voltage connections at the end of a serial arrangement of the batteries. The example of FIG. 47 illustrates the installation complexity of previously known battery assemblies, allowing for incorrect connections, long installation times, extended service times, and an increased likelihood of an incorrect installation resulting in insufficient voltage, a reverse wiring, or other failures. In certain embodiments, the long runs can result in reduced capability (e.g., current limits of the connecting wires), increased risk of overheating, and/or increased cost (e.g., heavier gauge wiring requirements, higher rated mounting connections, etc.). Additionally, the example of FIG. 47 depicts the exposure of full voltage connections, including the highest voltage in the assembly (e.g., 48V in the example, with 12V nominal batteries), to service personnel or others accessing the assembly during service or installation.

Figure 48:
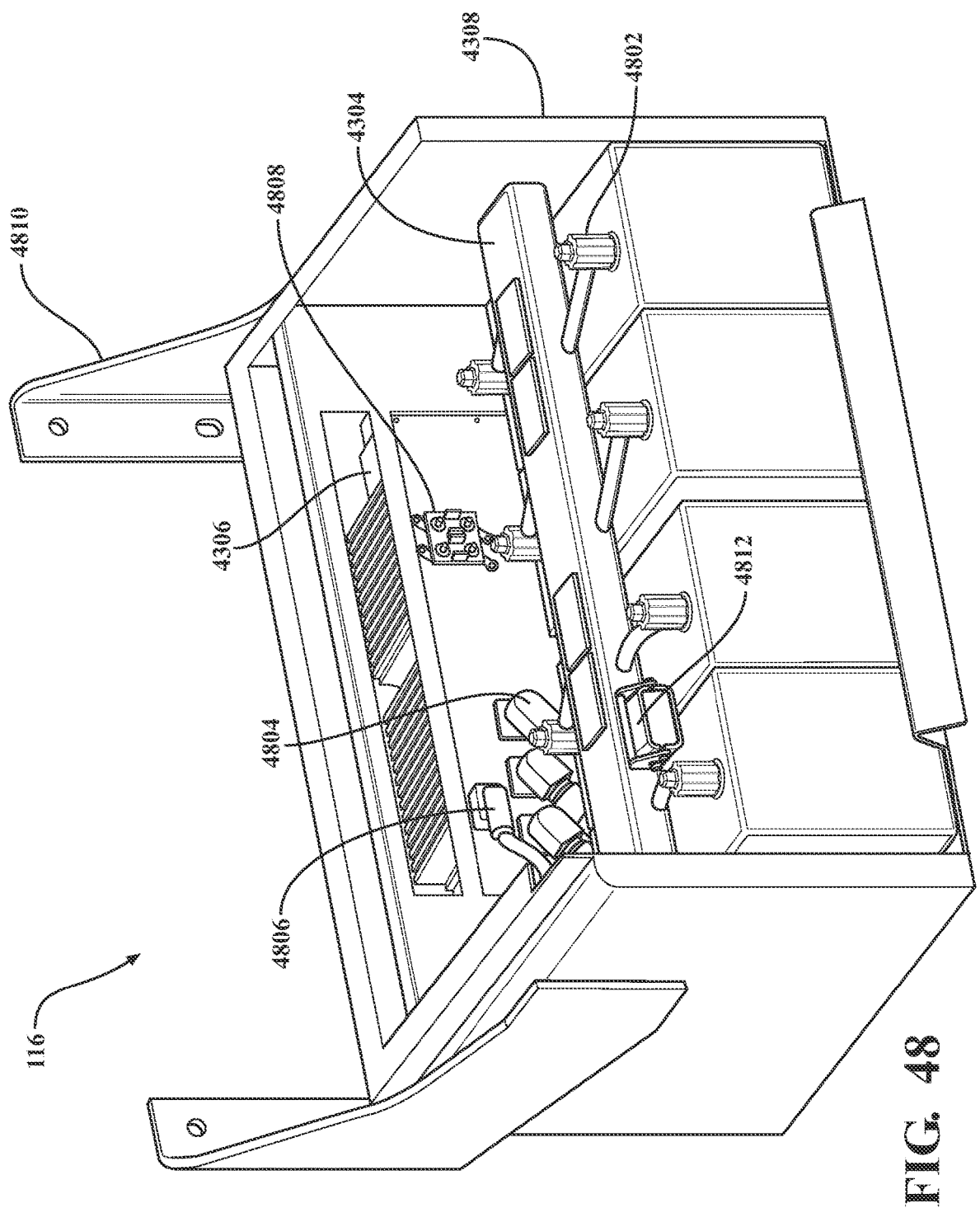
FIG. 48 is a schematic perspective view of a first battery assembly embodiment.

FIG. 48 is a schematic perspective view of a first battery assembly 116 embodiment. The arrangement of FIG. 48 utilizes a bus bar 4304 to connect the four batteries into a 48V arrangement. The example of FIG. 48 depicts three high voltage (e.g., 48V) connections 4804 to the MDC 4306 (e.g. one for each phase of a three-phase motor/generator), and can optionally include a 12V quarter-tap 4806 to provide for 12V power from the battery assembly. The example of FIG. 48 includes the MDC on the battery box (housing component 4308; e.g., to provide 3-phase power to the motor/generator, and/or convert power between the batteries and the motor/generator), and has a service disconnect 4812 on the bus bar 4304. In certain embodiments, the service disconnect 4812 couples the batteries to the MDC 4306 in a first position, and de-couples the batteries from the MDC 4306 in a second position. In certain embodiments, the MDC 4306 controls one or more separate switches or relay (not shown) to controllably couple and de-couple the batteries from the MDC 4306, where the service disconnect 4812 is used during service, installation, and/or other manual access operations. In certain embodiments, the service disconnect 4812 further includes a fuse, and/or a fuse for each power connection (e.g., a first fuse on the high voltage line, and a second fuse on the low voltage line). The inclusion of the fuse within the service disconnect 4812 provides for a convenient location for fusing, but fuses may additionally or alternatively be present in other locations (e.g., in the MDC 4306). The example of FIG. 48 includes battery terminal caps 4802, which may be of any type, and which may further include any one or more of the features set forth in the detailed description of an example battery terminal cap 4802 as set forth in the portion reference FIG. 59.

Figure 49:
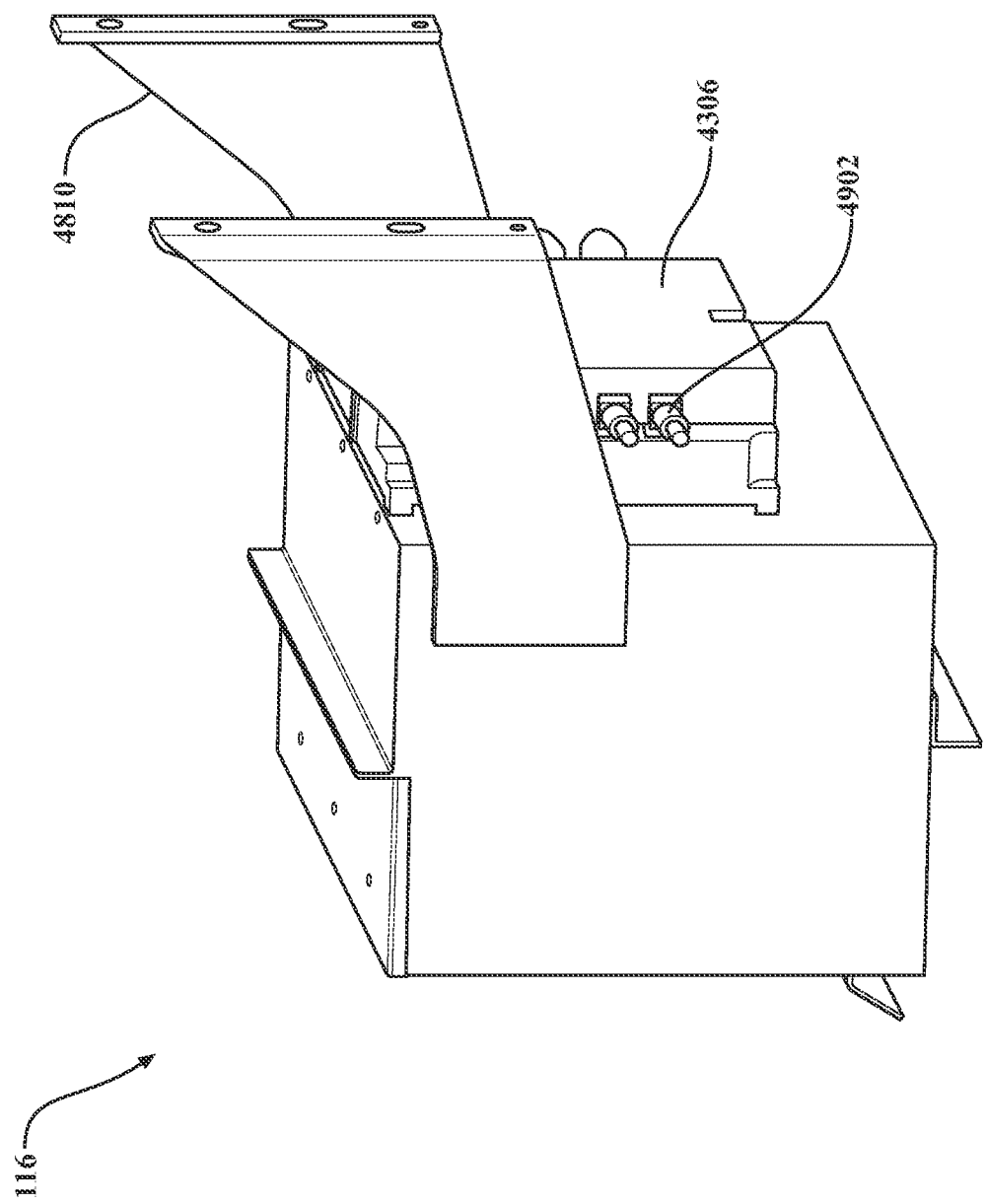
FIG. 49 is a schematic rear perspective view of the first battery assembly embodiment.

FIG. 49 is a schematic rear perspective view of the battery assembly 116 depicted in FIG. 48. The connections 4902 to power outside of the battery assembly 116 are depicted, in the example, on the rear of the battery box between the mounting brackets 4810. The positioning of the connections 4902 as depicted in FIG. 49 provides for convenient access and routing to the motor/generator, the vehicle electrical system, or other electrical devices on the motive application.

Figure 52:
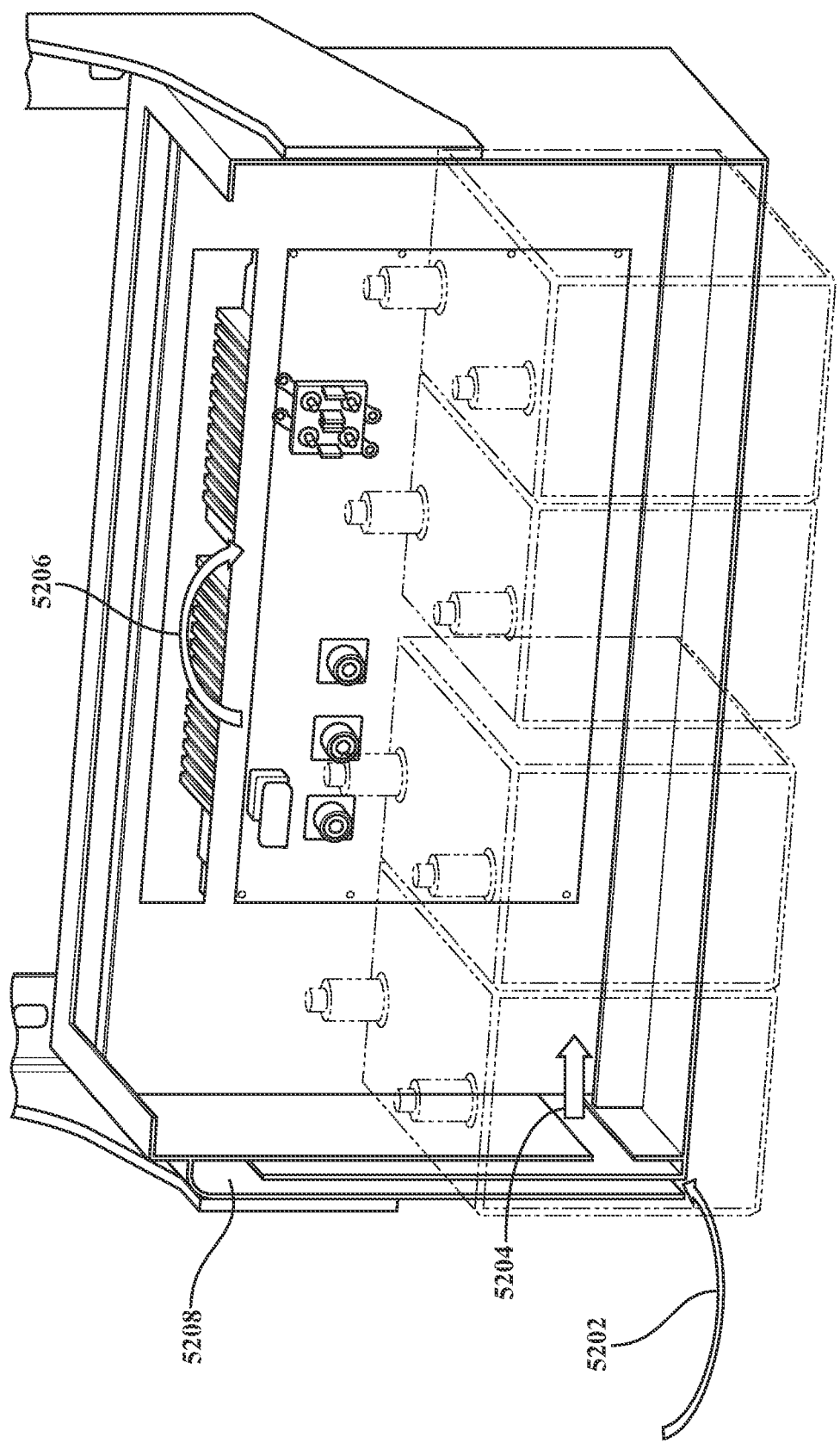
FIG. 52 is a schematic depiction of a cooling feature for an example battery assembly.

FIG. 52 is a schematic depiction of a cooling air routing for an example battery assembly 116. The example cooling air routing includes an air inlet 5202 on the housing that ensures that dry cool air (e.g., as opposed to radiator wash air) is pulled through the housing—for example with an air intake positioned away from the radiator wash air. The example cooling air routing includes a vertical turnabout path 5208 for the air for an intake leading to the battery assembly 116, reducing the intake of water or road wash into the battery box. The cooling air routing progresses 5204 through the battery box, allowing for cooling of the batteries. In the example of FIG. 52, the cooling air routing passes 5206 over the MDC on exit, providing cooling for the power electronics, connectors, and wires. The example air routing passes to an air conduit 4402 routed to the motor/generator (e.g., reference FIG. 54). In certain embodiments, the air is driven by a fan, which may be powered from the electric machine of the PTO device.

Figure 53:
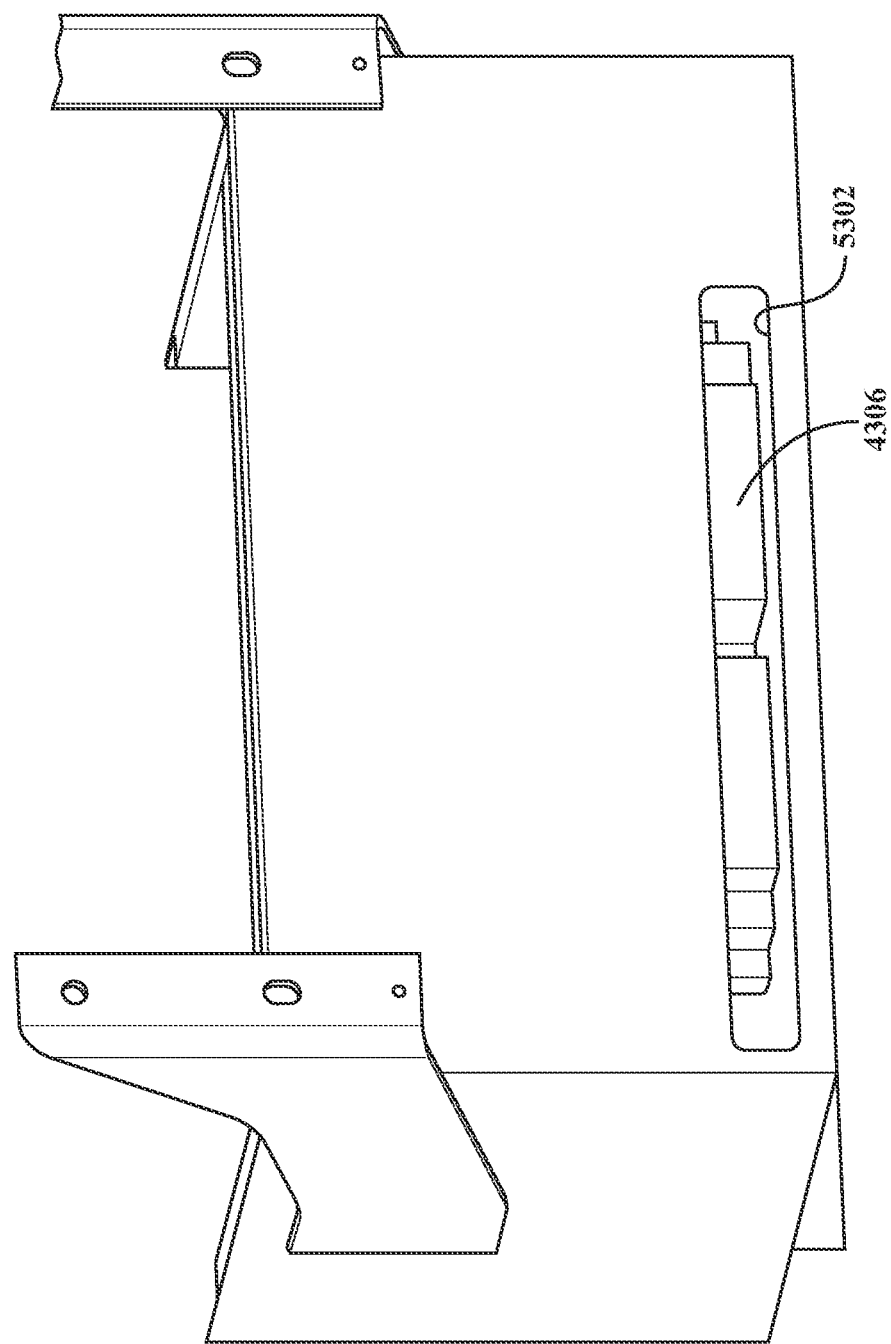
FIG. 53 is a schematic depiction of another cooling feature for an example battery assembly.

FIG. 53 is a schematic depiction of another cooling feature for the example battery assembly, with an air flow slot 5302 to ensure that positive air flow is available over the power electronics of the MDC 4306. In the example of FIG. 53, the MDC 4306 is positioned between an inner wall and an outer wall of the housing compartment, and the air flow slot 5302 cooperates with the upper slot providing air flow 5206 (reference FIG. 52) to ensure that cooling air flow is provided over the MDC 4306.

Figure 50:
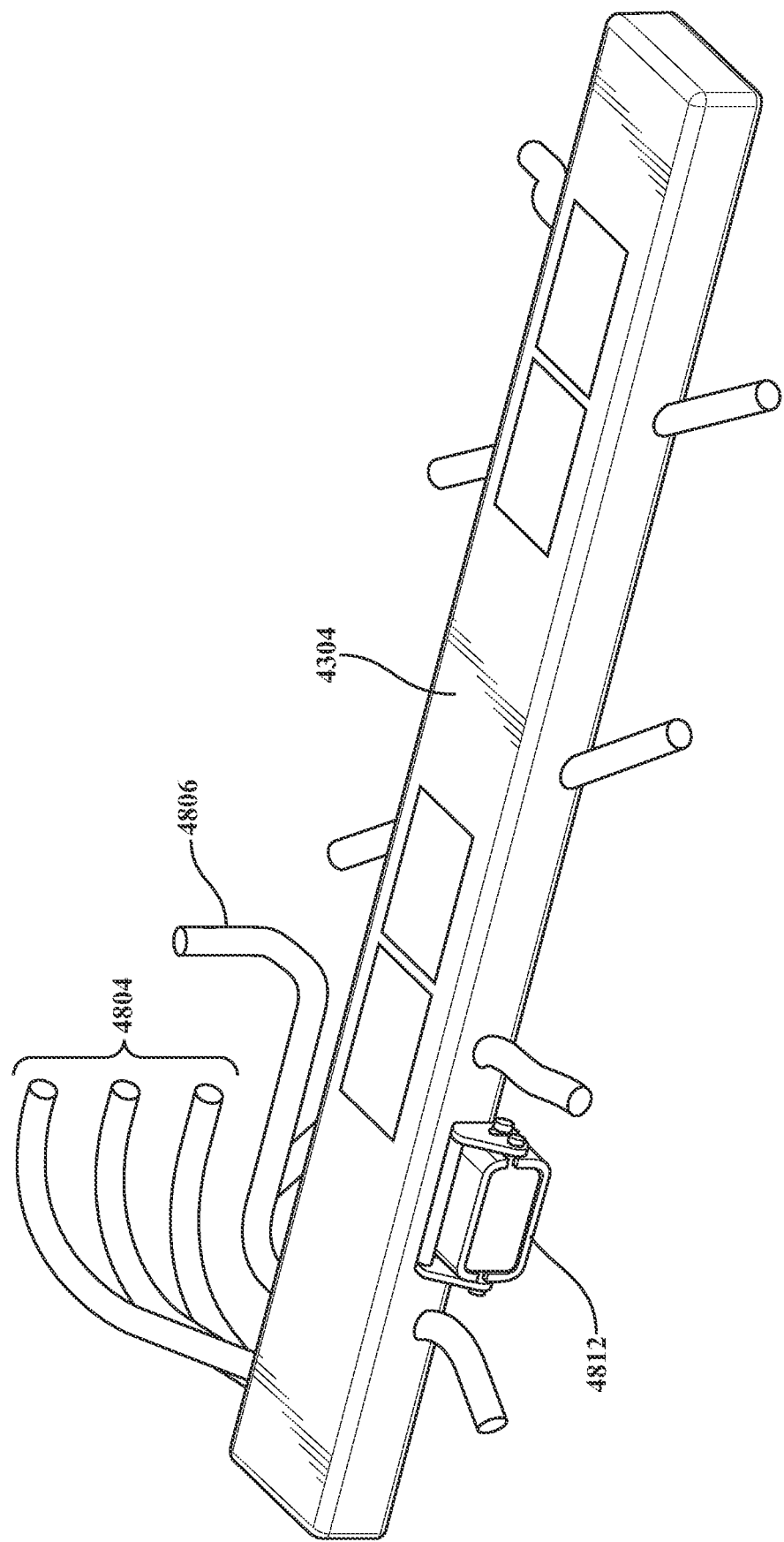
FIG. 50 is a schematic depiction of a battery connection portion of the first battery assembly embodiment.

FIG. 50 is a schematic depiction of the battery connection portion of the first battery assembly embodiment, shown as a bus bar 4304 that provides routing and battery terminal connections. The bus bar 4304 ensures short and organized runs for the battery terminal connections, and additionally provides for a short final run distance for the high voltage connection(s) 4804. Additionally, the bus bar 4304 simplifies correct installation, with the power interfaces 4804, 4806 positioned at an end of the bus bar 4304 which ensures a proper orientation and connection logic for the batteries. Additionally, the battery connection portion in the example of FIG. 50 depicts a service disconnect 4812. The service disconnect 4812 is positioned at a location to make disconnection of the power interfaces 4804, 4806 with a single operation (e.g., raising or lowering a lever of the service disconnect 4812). In certain embodiments, the service disconnect 4812 may additionally include fuses positioned therein (e.g., reference the example service disconnect detail depicted in FIG. 55), providing for convenient fuse replacement and a fusing location that ensures the appropriate circuit (e.g., a high voltage interface or low voltage interface) can be opened with the fuse action. In certain embodiments, removal of the service disconnect ensures that all batteries are de-coupled from the power circuits (e.g., MDC, motor/generator, vehicle electrical system, and/or auxiliary load(s)) of the battery assembly.

Figure 51:
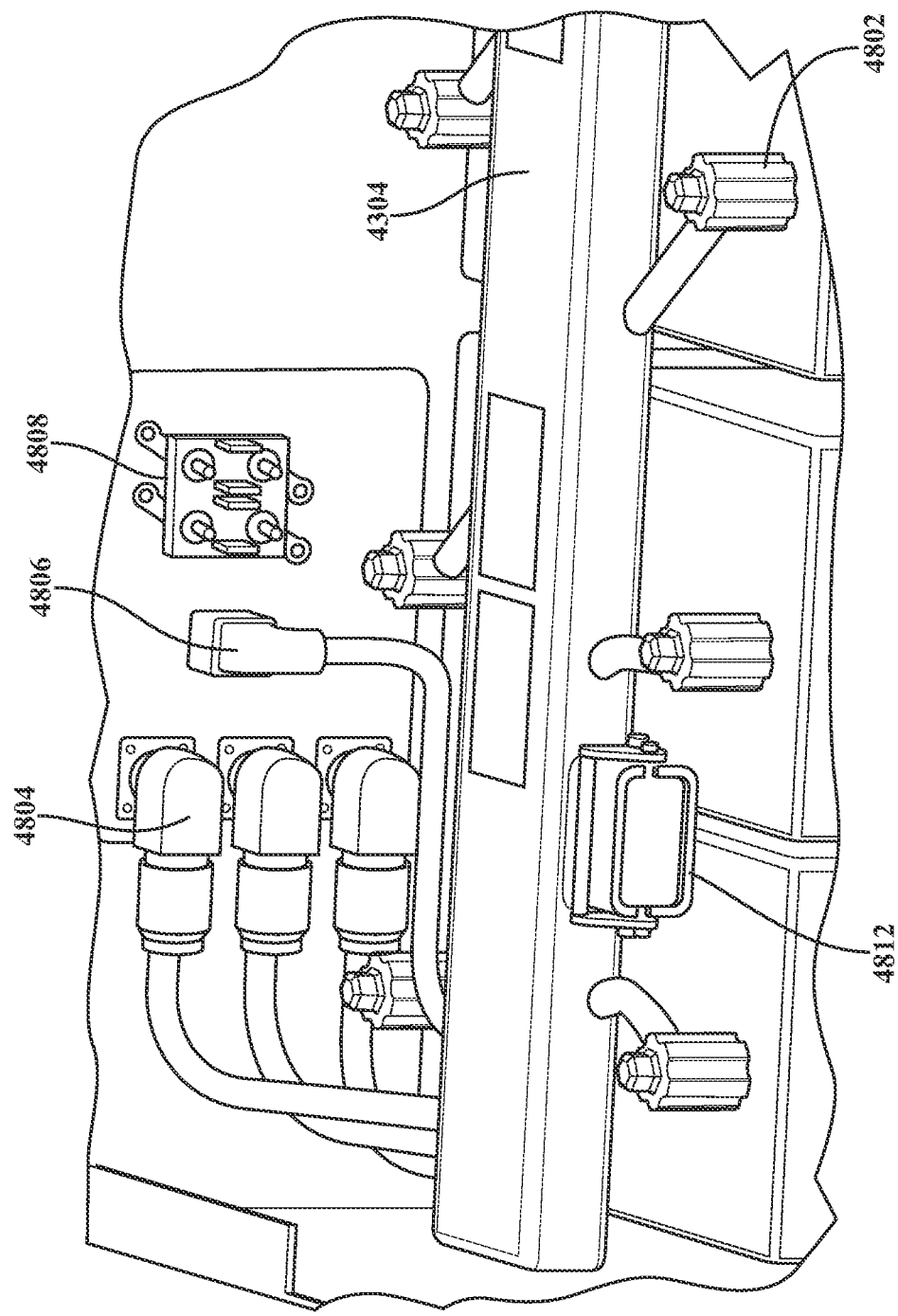
FIG. 51 is a schematic close-up depiction of the first battery assembly embodiment.

FIG. 51 is a schematic close-up depiction of a battery assembly embodiment, depicting a number of auxiliary load connections 4808, a number of high voltage connections 4804, and a vehicle electrical system connection 4806. One or more of the auxiliary load connections 4808 may include a low voltage connection (e.g., one or a subset of the batteries connected in a serial arrangement) or a high voltage connection (e.g., multiple batteries or all of the batteries connected in a serial arrangement). The example of FIG. 51 depicts three high voltage connections 4804, for example one for each phase of a three phase motor/generator, although example embodiments may include more or fewer of the high voltage connections 4804 (e.g., with the MDC providing the selected number of phases with appropriate power electronics provided therein). In certain embodiments, the separate (center), and the three phases for AC connections to the motor/generator (left three connections—which may be arranged vertically or horizontally).

Figure 54:
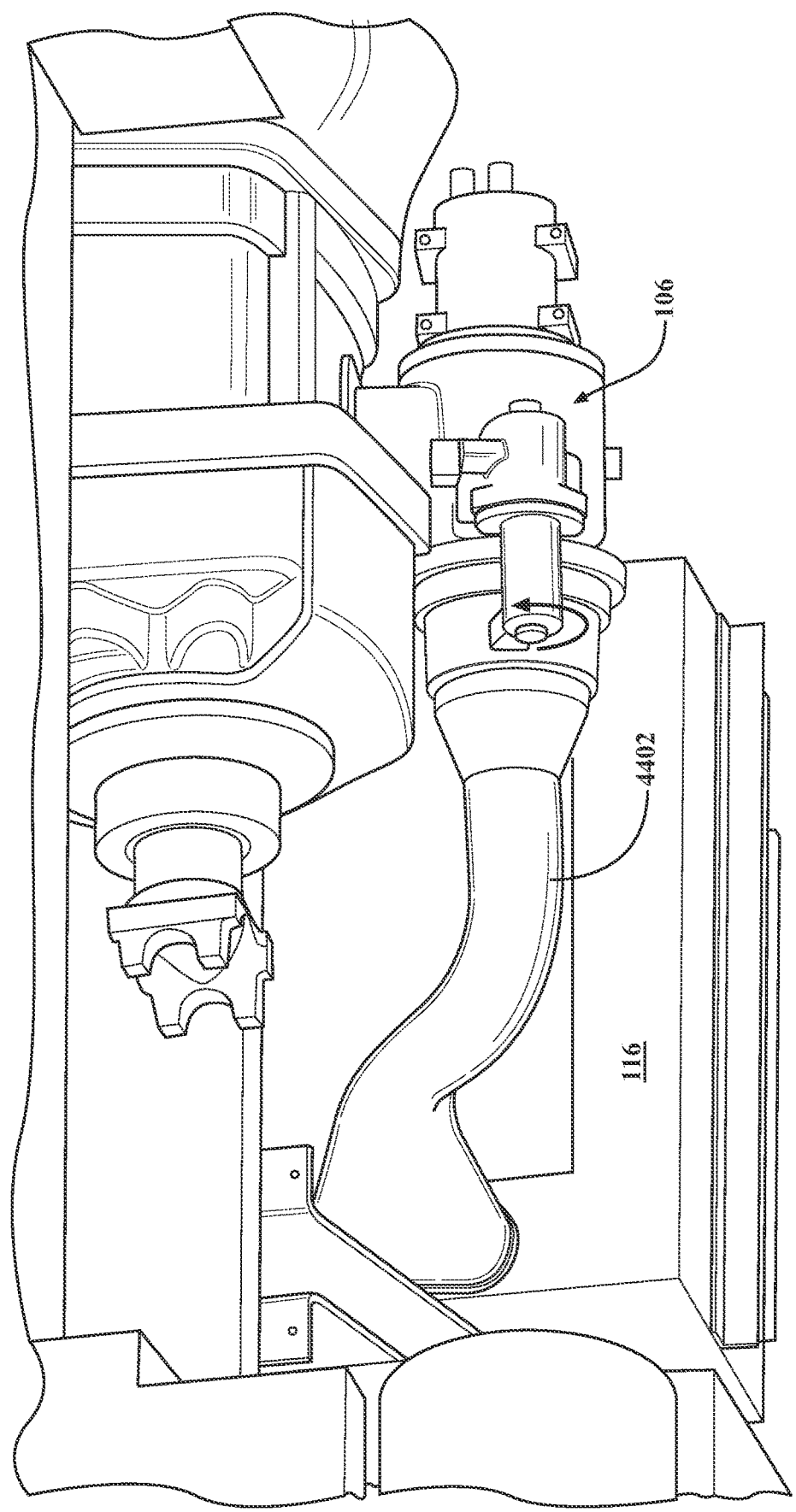
FIG. 54 is a schematic view of an example battery assembly.

FIG. 54 is a schematic view of an example battery assembly 116. The example of FIG. 54 includes a controlled air intake that limits intrusion of water and dirt into the battery assembly and motor/generator. The example of FIG. 54 further includes an air exhaust (air conduit 4402 in the example of FIG. 54) through the motor/generator housing, where the positive pressure of the air exhaust limits entry of water and dirt into the motor/generator. The example of FIG. 54 may further include (not shown) a shield under the motor that protects the motor from road spray and/or rocks.

Figure 67:
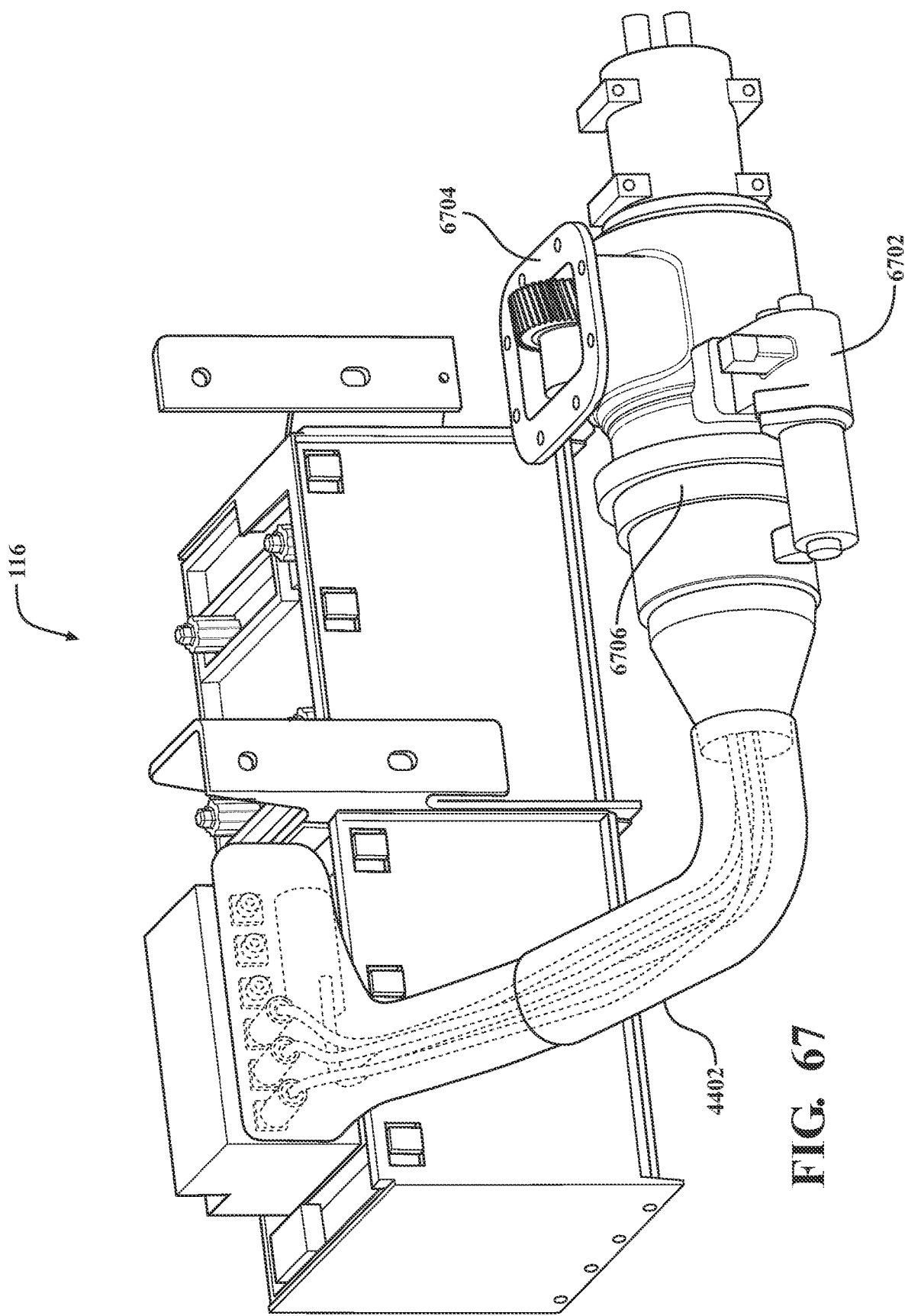
FIG. 67 is a schematic depiction of the second battery assembly embodiment depicting certain cooling features.

Referencing FIG. 67, a vent 6706 is positioned on, or coupled to, the air conduit 4402, providing for exhaust air to pass over the motor/generator 6702. In the example of FIG. 67, the PTO device includes the motor/generator 6702 selectively coupled to a gear device 6704, which interfaces with the driveline (not shown), for example at a PTO interface of a transmission of the driveline. The vent 6706 provides for directed air flow over the motor/generator, and provides for positive air pressure in the air conduit 4402 preventing the intrusion of water or debris into the battery assembly 116.

FIG. 68 is a schematic depiction of a battery assembly embodiment depicting certain environmental management features. Two examples of air conduits (or ducts) 4402 are depicted, for example as portions 6802, 6804 consistent with arrangements depicted in FIG. 66, and as an integrated component 4402 consistent with arrangement depicted in FIG. 54. The specific arrangement of the air conduit 4402, including whether the air conduit 4402 is an integrated device or divided into portions, may be selected according to the desired routing or other installation considerations, the requirement for flexibility (e.g., rotation of portions relative to each other), and the like.

Referencing FIG. 72, an example installation of a battery assembly with an air conduit 4402 in a first configuration is depicted. Referencing FIG. 73, an example installation of a battery assembly with an air conduit 4402 in a second configuration is depicted. Referencing FIG. 56, an example battery assembly is depicted with a top-mounted MDC 4306 having an integrated service disconnect 4812. In certain embodiments, the service disconnect 4812 includes a closed position allowing power flow between the batteries and one or more power interfaces (e.g., a low voltage power interface, a high voltage power interface, etc.), and an open position that prevents power flow between the batteries and one or more power interfaces. In certain embodiments, the service disconnect 4812 prevents the MDC 4306 from engaging the batteries (e.g., by interfacing with a plug 5702, reference FIG. 57) in the second position, and locks the MDC 4306 into engagement with the batteries in the first position. In certain embodiments, a movement of the service disconnect 4812 to the second position allows for removal of the MDC 4306 from the engaged position, and/or moves the MDC 4306 into a disengaged position. In certain embodiments, the service disconnect 4812 opens the interfaces between the batteries and the MDC 4306 during movement of the service disconnect 4812 to the second position, either by disengaging the MDC 4306 from the plug 5702, breaking a connection within the service disconnect 4812 that is serially arranged between the batteries and the MDC 4306, or both.

Figure 56:
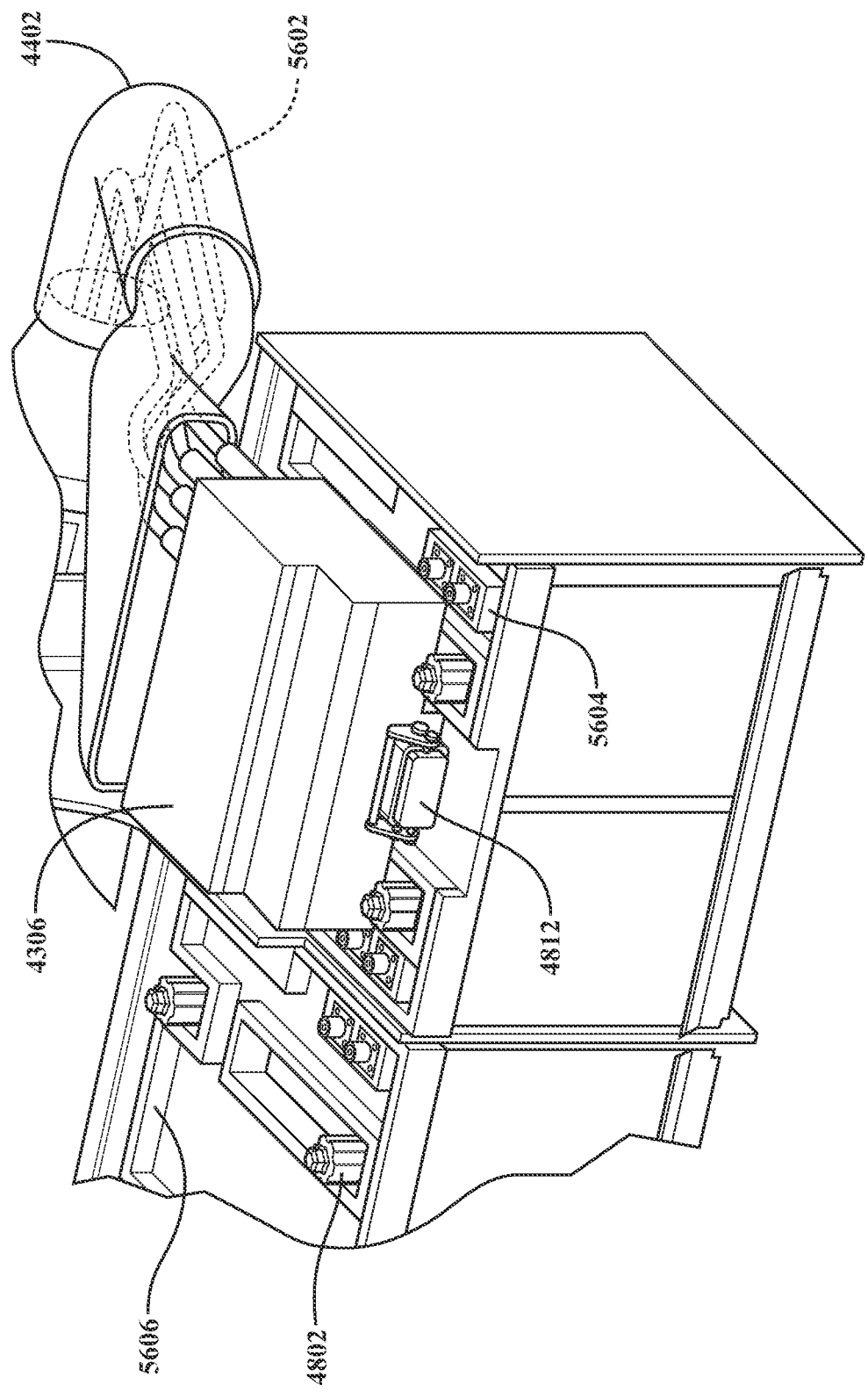
FIG. 56 is a schematic depiction of a second battery assembly embodiment.

In the example of FIG. 56, and consistent with several embodiments depicted throughout, power lines 5602 between the MDC 4306 and the motor/generator may be routed through the air conduit 4402. The arrangement of FIG. 56 provides for protection of the motor phase wires and/or motor control wire from impacts or abrasion. Additionally, the air duct ensures that the motor phase wires and/or related connectors stay dry. Additionally or alternatively, the arrangement of FIG. 56 allows for enforced coolant air passage over the motor phase wires, and/or protection from casual contact of the motor phase wires with operators, service personnel, or the environment.

Certain optional cooling arrangements include: where the batteries and transmission generally sit under body panels that trap "fan wash", or air being pulled through the radiator. The fan wash is typically 80 Deg C., which significantly reduces battery life. Certain arrangements pull cool and dry air for the system cooling, providing for reduced ambient temperature for the battery, and cooler air provided for cooling components such as the MDC 4306, phase wires 5602, or the like. Example air intake arrangements for the battery assembly include: a duct pulling air from the cab; a down-facing air scoop with low velocity (e.g., large cross-section) such that dirt and water droplets tend to fall out; a trap with a drain to separate dirt and incoming water; using the battery box as a settling tank to ensure that air passing over the MDC 4306 is clean; and/or pulling air from a side skirt of the truck and the outboard face of the battery, providing low velocity air that will settle dirt and water, with water drained from the battery box.

FIG. 55 is a schematic depiction of an example service disconnect 4812 for a battery assembly. The example service disconnect 4812 includes a cam lock 5504 for removing the fuses, providing a positive lock of the fuses 5506 into position, as well as a positive release ensuring that the disconnection is predictable to the operator. For example, the cam lock 5504 in the engaged position (left side of FIG. 55) may be the service disconnect 4812 in the first position, while the cam lock 5504 in the disengaged position (right side of FIG. 55) may be the service disconnect 4812 in the second position. The example disconnect includes fuses 5506, which may be marine quality fuses (e.g., to enhance survivability to ambient conditions), for both the high voltage and low voltage sides (where present) of the DC circuits of the battery assembly, which may be coupled and decoupled with the same actuation of the service disconnect 4812. In certain embodiments, the battery assembly may be isolated from the vehicle electrical system (e.g., 12V, 24V, or 48V system) in the event of power loss (e.g., using an appropriately configured contactor) such that when the disconnect is opened, all sources of 48V and/or 12V into the battery assembly are isolated.

Figure 71:
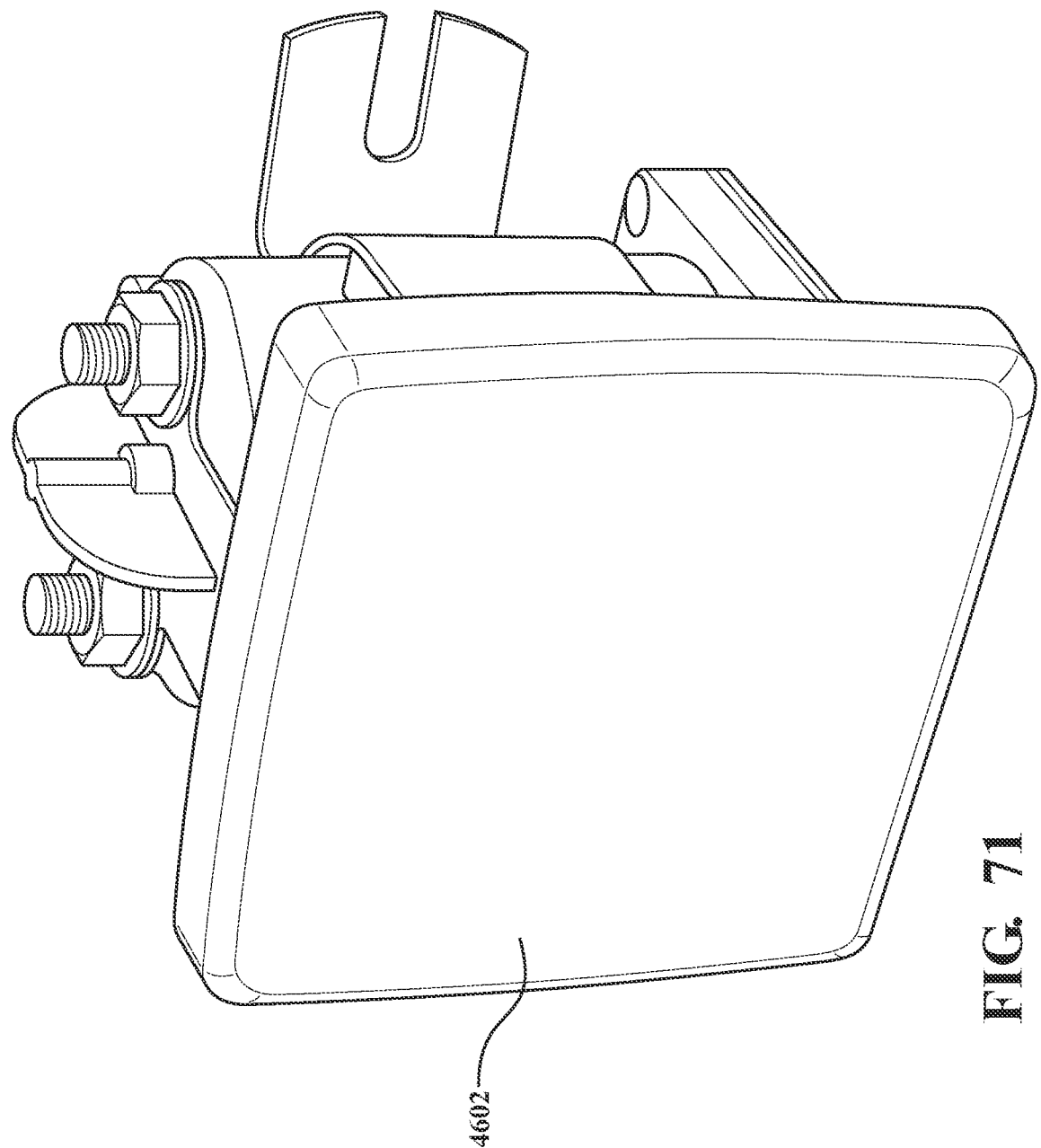
FIG. 71 is an example bi-stable relay suitable for use with certain embodiments of a battery assembly.

Referencing FIG. 71, an example bi-stable relay 4602 compatible to perform disconnection operations is depicted. The utilization of a bi-stable relay 4602 is optional, but provides for low power consumption whether being held in the open or closed condition. In certain embodiments, a number of bi-stable relays 4602 may be present, for example to support separate connection for a number of circuits. In certain embodiments, one or more relays may be provided as a normally-open relay (e.g., to disconnect power in the event of power loss), a solid state relay, and/or a bi-stable relay 4602 electrically coupled to a capacitor, such that the capacitor powers the bi-stable relay 4602 to an open position in the event of power loss. In certain embodiments, one or more relays are commanded by a controller positioned on the MDC 4306 (or elsewhere in the system), for example allowing controlled opening and closing of electrical power interfaces during operations of a motive application including the battery assembly 116. In certain embodiments, the controller prevents a closing of the relay in response to determining that a battery connection value (e.g., battery wiring indication, appropriate expected voltage values, etc.) is incorrect. In certain embodiments, the controller is responsive to a fault condition or a status condition to selectively decouple the batteries from the low voltage and/or high voltage interfaces. In certain embodiments, the controller is capable to communicate fault conditions, status conditions (e.g., open/closed state, battery voltage values, operational parameters, etc.) to a network, which may be a vehicle network, controller area network (CAN), service tool 4502, or the like.

Further with reference to FIG. 71, an example bi-stable relay 4602 suitable for use with certain embodiments of a battery assembly is described. A bi-stable relay 4602 can operate in both the open or closed position without power, and switches only under power. An example embodiment utilizes a bi-stable relay 4602 that is normally open (disconnecting 12V, 48V, and auxiliary battery pack) that disconnects when 12V power is lost, which will allow a low holding current state. Another example embodiment utilizes a bi-stable relay 4602 with a capacitor that ensures the bi-stable relay opens on a loss of power. An example embodiment utilizes a control circuit that ensures all batteries are correctly coupled before re-connecting power. In certain embodiments, two bi-stable relays (e.g., 12V and 48V) are utilized, and overmolded into the MDC 4606 primary. In certain embodiments, an additional bi-stable relay 4602 is on the auxiliary battery tray (where present, e.g., reference FIG. 63).

Figure 57:
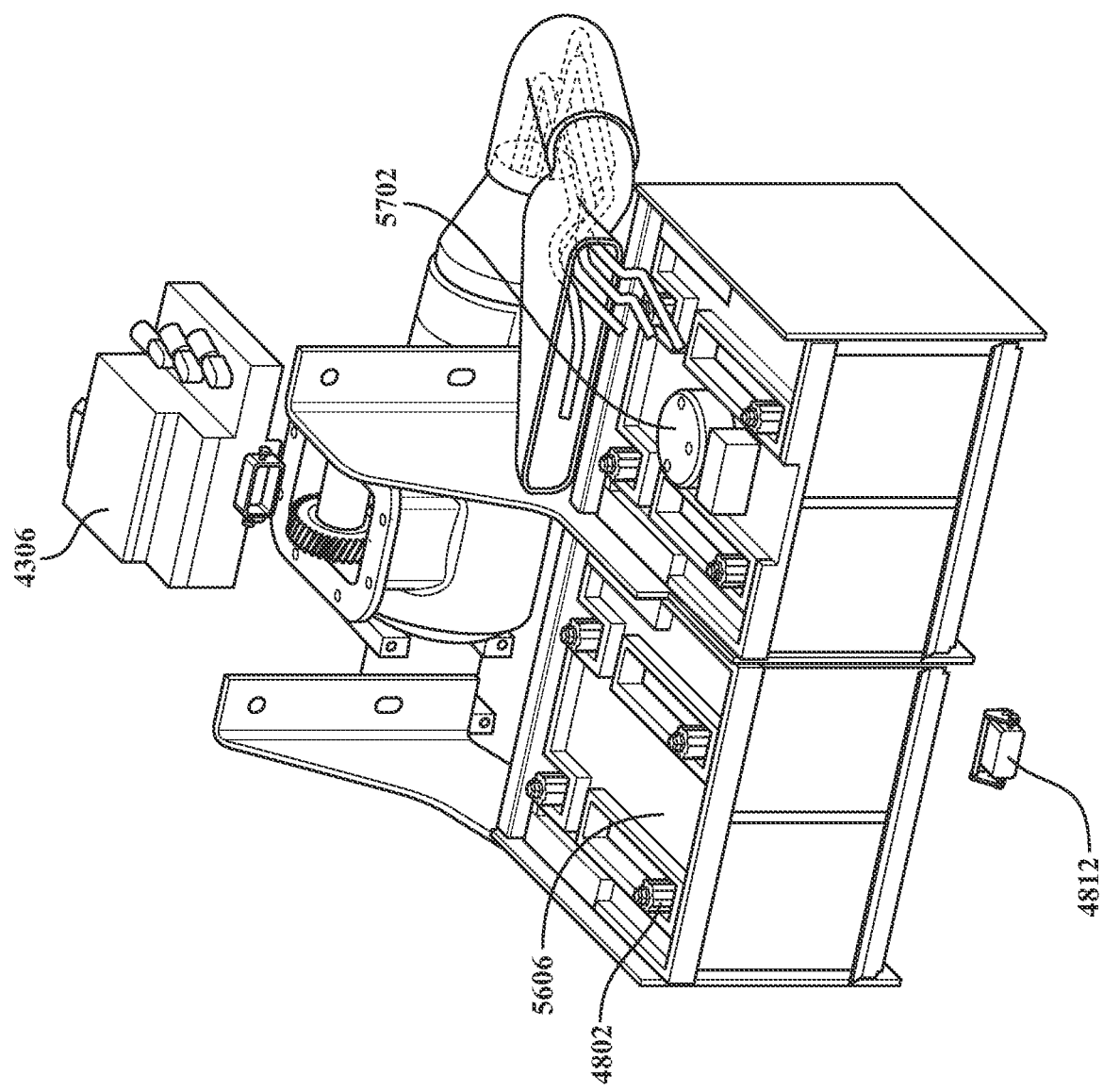
FIG. 57 is another schematic depiction of the second battery assembly embodiment.

FIG. 56 is a schematic depiction of a battery assembly. The example of FIG. 56 positions the MDC 4306 on top of the batteries, such that the effective interconnect length is near zero (e.g., with the MDC 4306 directly engaging a plug 5702 or other short-range or immediate range coupling). The example of FIG. 56 includes a number of confinement trays 5606, which have examples described in further detail in the portions of the disclosure reference FIGS. 58, 60, and 61). FIG. 57 is a schematic depiction of another view of the second battery assembly embodiment, with the MDC exploded to provide a clear view of certain aspects.

The example confinement trays 5606 include a top tray providing battery connections, which may be made of an insulating and flexible material such as plastic. Flexibility in the tray 5606 provides for imprecisely toleranced battery terminals (which are common) to be presented to the MDC 4306 in a tightly toleranced manner (at the high current and signal connections plug 5702 depicted). In certain embodiments, two trays 5606 are utilized, each positioned above and providing connections for two batteries, which reduces the complexity in installing, removing, or replacing each tray 5606. In the example of FIG. 56, the batteries are depicted side-by-side, but could be arranged front-to-back, or in combinations thereof. In certain embodiments, batteries could be positioned vertically, with each battery pair (or sub-group) having a tray 5606, and with a top tray having the MDC 4306 plug (and/or the MDC 4306 connection otherwise provided in the battery assembly). In the example of FIG. 56, female terminals are provided on the MDC plug 5702, avoiding exposure of service personnel to energized parts of the assembly, even when the MDC 4306 is in a disengaged position. Additionally, the utilization of exposed female terminals prevents damage to the terminals, for example where exposed pins are subjected to shock or impacts.

Figure 59:
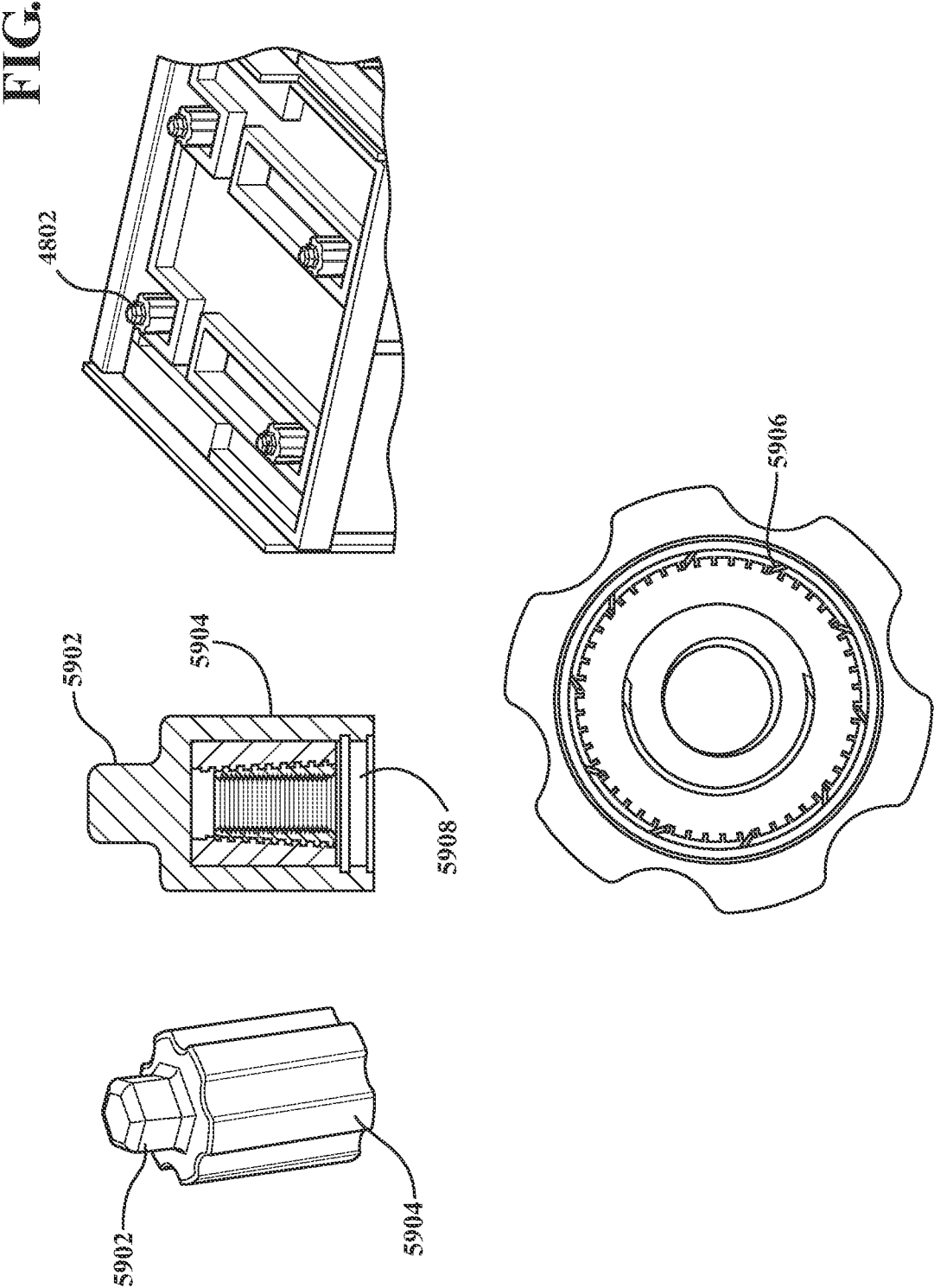
FIG. 59 is a schematic depiction of a plurality of battery terminal caps of the second battery assembly embodiment.

FIG. 59 is a schematic depiction of an example battery terminal cap 4802 having features that may be utilized in embodiments of the present disclosure. The example battery terminal cap 4802 includes a terminal engagement side (e.g., the inner and underneath portion of the cap 4802) that is threadingly couplable to a battery terminal, and a tool engagement side (e.g., the outer and upper portion of the cap 4802) that is structured to accept rotating torque applicable to engage or disengage the cap 4802 from the battery terminal. The terminal engagement side is separated electrically from the tool engagement side by an insulating portion, which may include any features within the cap 4802 that tend to electrically isolate the outer surface of the cap 4802 from the terminal engaging surface of the cap. In certain embodiments, a coating or layer within the cap 4802 may be provided between the engagement surfaces. In certain embodiments, a coating or layer may be provided on the outer surface of the cap 4802 (e.g., defining the actual surface to be engaged by a tool) to provide insulation. The insulating portion provides for tool exposure and/or operator exposure (e.g., a hand, sleeve, other elbow, etc.) from contacting powered electrical components during service or other operations within the battery assembly, and including preventing a tool from contacting both the battery cap and a ground point from causing a spark, arc, or other energy event.

In certain embodiments, the tool engagement side includes a narrowed specific tool engagement surface 5902, for example sized and shaped to fit a particular wrench size, wrench type, or group of wrench sizes or types. In certain embodiments, the narrowed tool engagement surface 5902 provides for the utilization of a standard wrench (e.g., a ⁹⁄₁₆" wrench), ordinarily utilized on battery terminals, to be utilized on the cap 4802. The narrowed tool engagement surface 5902 allows for the provision of battery cap 4802 removal and/or placement with a standard tool, eliminating the requirement for an operator or service person to obtain a non-standard tool and/or remember to bring a non-standard tool to the service location. In certain embodiments, the narrowed tool engagement surface 5902 allows for the provision of the battery cap 4802 removal and/or placement with a specialized tool, for example to ensure that an approved tool will be utilized, and/or to render tampering with the battery assembly 116 more difficult. In certain embodiments, the tool engagement side includes a widened engagement surface 5904, for example allowing for a hand engagement surface (e.g., providing sufficient rotational torque leverage such than an operator or service person is likely to be able to engage or disengage the cap 4802 by hand). In certain embodiments, the widened engagement surface 5904 may include ribs and/or ridges configured to improve the operability of the widened engagement surface. While the widened engagement surface 5904 is described in terms of providing for hand operation of the cap 4802, the widened engagement surface 5904 may additionally or alternatively be configured for a different tool than the narrowed engagement surface 5902, for example a different wrench size or type, or the like. It can be seen that a number of engagement surfaces may be formed on the cap 4802, for example to allow a number of different tools to be utilized to operate engagement and disengagement of the cap 4802.

The example cap 4802 further includes a sealing gasket 5908 that engages a top surface of the battery when the cap 4802 is in an engaged position. The sealing gasket 5908 seals the battery terminal from exposure to moisture or other elements, increases the service life of the battery and installation, reduces corrosion of the terminal, and reduces electrical performance degradation of the installed battery assembly.

The example cap 4802 further includes a torque limiter 5906, which may be a snapping torque limiter or one-way torque limiter, that allows slipping of the battery terminal cap 4802 in response to an applied torque that exceeds a designed torque limit. In the example of FIG. 59, the one-way torque limiter allows for unlimited disengagement torque, and a slipping action for engagement torque that exceeds a design limit, providing for rapid installation of the cap 4802 without damage to the cap 4802 or terminal of the battery.

In certain embodiments, the installed battery assembly supports a high power throughput installation, for example with significant power exchange between the batteries and the motor/generator, over an extended period of time relative to ordinary battery installations for motive applications. Additionally, the installed battery assembly includes more batteries (e.g., four, eight, twelve, or more) than are ordinarily present in a motive application, increasing the expense of battery replacement, installation time, and designing the motive application to include and interface with the battery assembly. Accordingly, benefits apparent throughout the present disclosure, including at least corrosion reduction, maintenance of electrical performance, reductions to installation and service time, and increased flexibility for installation operations, are leveraged for battery assemblies as set forth in the present disclosure, and provide significant benefits specific to various embodiments described herein relative to ordinary battery installations for motive application.

Figure 58:
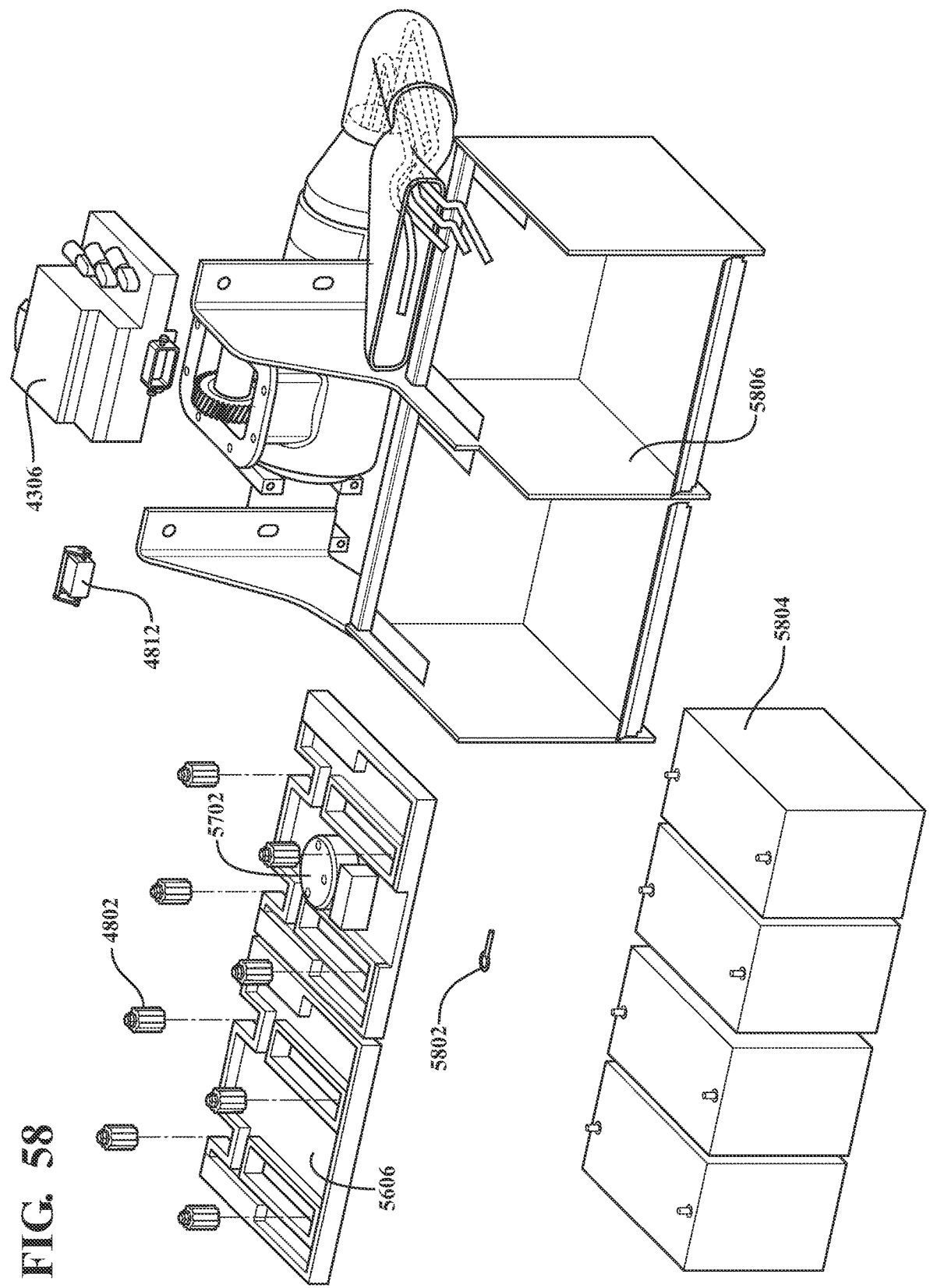
FIG. 58 is a schematic exploded view of the second battery assembly embodiment.
Figure 63:
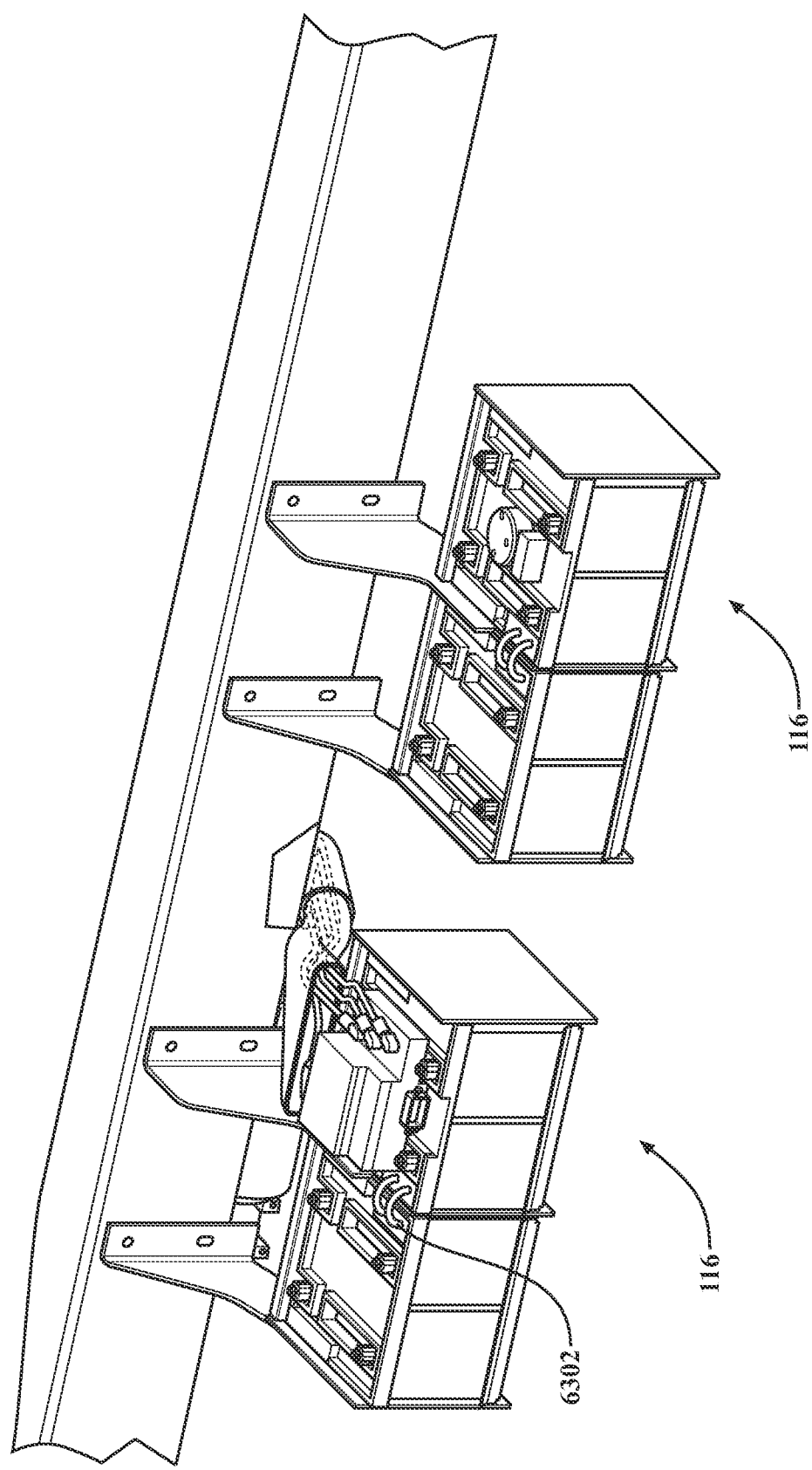
FIG. 63 is a schematic depiction of an 8-battery example of the second battery assembly embodiment.

FIG. 58 is a schematic exploded view of a battery assembly embodiment. The example of FIG. 58 depicts two-bolt brackets for mounting on the vehicle (e.g. on the frame rail 4404) or other application, although a single bolt mount, a multi-bolt mount, or other type of mounting arrangement is contemplated herein. The example of FIG. 58 utilizes a center wall 5806 between battery pairs for structural integrity. The utilization of a center wall 5806 reduces the span for deflection or deformation, and can reduce to overall weight of the battery assembly 116. The example of FIG. 58 utilizes a pin 5802 to secure the trays 5606 into place, as depicted in other views of the present disclosure (e.g., at FIG. 62). The example tray 5606 includes terminal mounting and battery connections on the underside, such that when the tray is positioned over the batteries, the appropriate connections are already made. The trays can be configured for 48V arrangements, including potentially a 12V quarter tap arrangement, and/or for any other configuration and voltage desired. In certain embodiments, tray groups are interconnected to connect groups of batteries at the desired voltage and arrangement (e.g., series v. parallel), such as depicted in FIG. 63.

Figure 60:
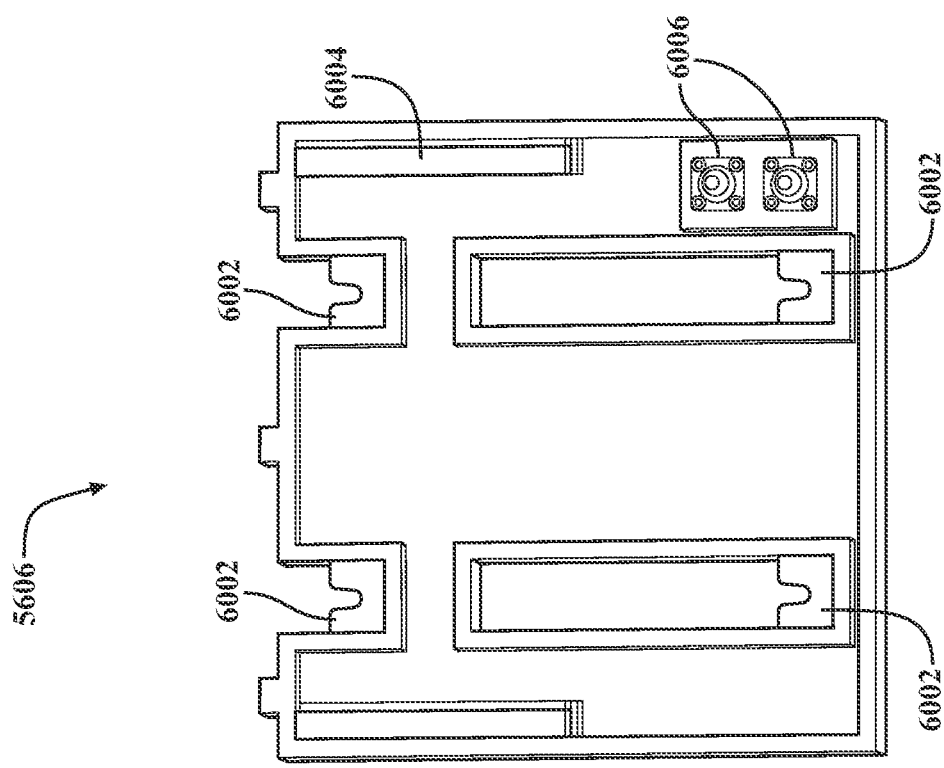
FIG. 60 is a schematic depiction of an example battery cover of the second battery assembly embodiment.
Figure 64:
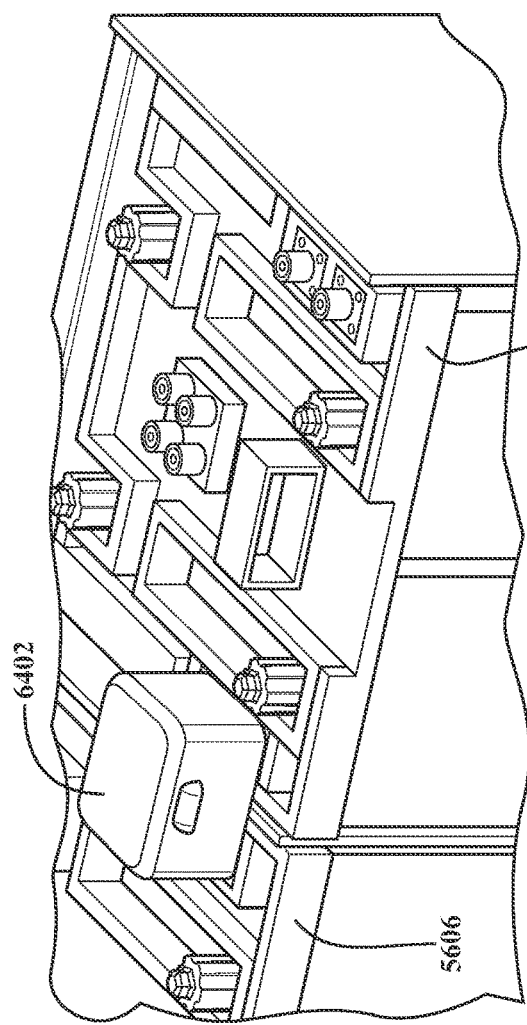
FIG. 64 is a schematic depiction of a multi-tray locking device of the second battery assembly embodiment.

FIG. 60 is a schematic depiction of an example battery cover (e.g., a confining tray 5606) of the battery assembly 116 embodiment. The example of FIG. 60 includes a rigid U-shaped arrangement for the terminal connection 6002, which allows for ease of installation, but does not provide a seal above the battery for the electrical connection. The example of FIG. 60 further includes a spring 6004 or other biasing member configured to apply compression to the battery when the confining tray is installed in the corresponding housing compartment. The example of FIG. 60 includes an inter-tray connection 6006, having terminals that correspond to the serially connected terminals within the corresponding housing compartment. Accordingly, tray inter-connections 6006 are connected (e.g., as depicted in FIG. 63 or 64) to provide the desired electrical connectivity of the battery assembly 116.

Figure 61:
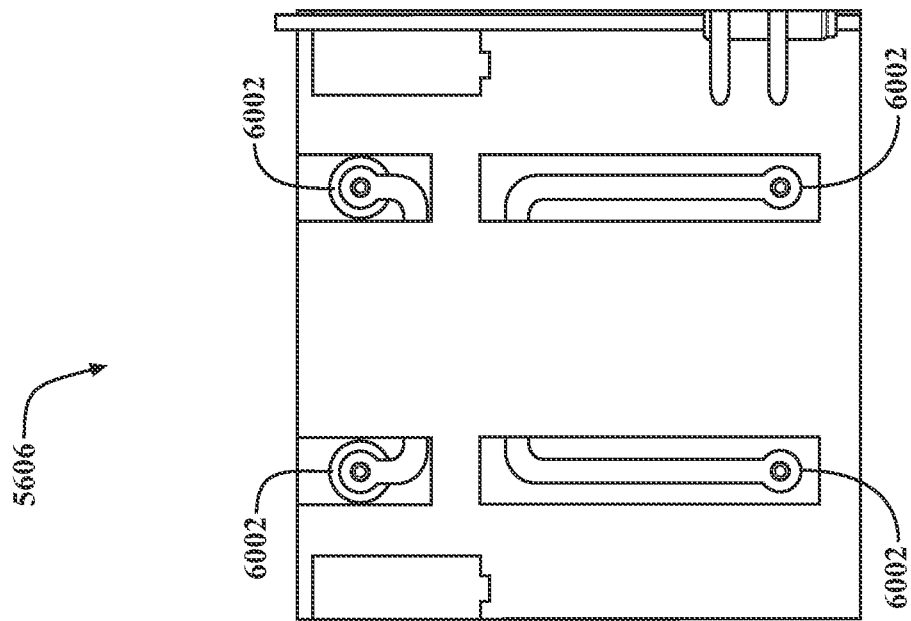
FIG. 61 is a schematic depiction of another example battery cover of the second battery assembly embodiment.

The example of FIG. 61 includes a flexible braid arrangement for the terminal connections 6002. In the example of FIG. 61, installation requires raising the braid and fitting onto each terminal, but provides for an easy seal above the battery. In certain embodiments, one tray (or a portion of a tray) may have the rigid U-shaped arrangement for one or more terminal connections, and another tray (or another portion of the tray) may have a flexible braid for one or more terminal connections. For example, and without limitation, a tray that is more likely to be serviced (e.g., the tray housing the MDC) may have a rigid U-shaped arrangement, while another tray less likely to be serviced may have a flexible braid arrangement. The example trays 5606 of FIGS. 60, 61 provide for rapid electrical coupling of the batteries, without the installer or service person having to properly connect individual components, reducing the installation time, and improving the installation reliability.

FIG. 62 is a schematic depiction of a battery assembly having a securement feature. The example battery assembly includes the trays 5606 having a spring or biasing member (e.g., a steel spring) that keeps the batteries in compression toward the bottom of the battery assembly. An example battery assembly 5606 includes the trays 5606 having a hole, slot, channel, or the like that aligns with a hole or securing feature of the center wall 5806 when the tray 5606 is engaged in the battery assembly. The example of FIG. 62 further includes a pin 5802 that is positioned through the aligned securing features of the trays 5606 and the center wall 5806, preventing movement of the trays 5606 (generally, preventing the sliding of trays outward, or the uplift of the trays) during operations of the system (e.g., a motive application) that includes the battery assembly.

FIG. 63 is a schematic depiction of an 8-battery example of a battery assembly, including two housing compartments with four batteries positioned in each housing compartment. The example of FIG. 63 includes an electrical coupling 6302 between neighboring trays. The battery assembly may additionally include electrical coupling between tray groups (not shown), which may utilize an MDC associated with each tray group, parallel wiring, or the like. In certain embodiments, tray groups may be connected in parallel, for example where the number of batteries in a tray group aligns with the target voltage of the installation.

In the example arrangement of FIG. 63, the primary battery pack (e.g., the left-side pack) houses the MDC and provides for electrical connections (48V and 12V connections, in the example), while the auxiliary battery pack (e.g., the right-side pack) provides for additional battery storage capacity and does not have external power coupling access. Any arrangement of battery packs is contemplated herein. In the example of FIG. 63, an electrical arrangement includes a contactor that opens the auxiliary battery pack if the service disconnect is opened (or if 12V vehicle power is lost), such that all battery packs are de-energized from electrical connections.

Figure 65:
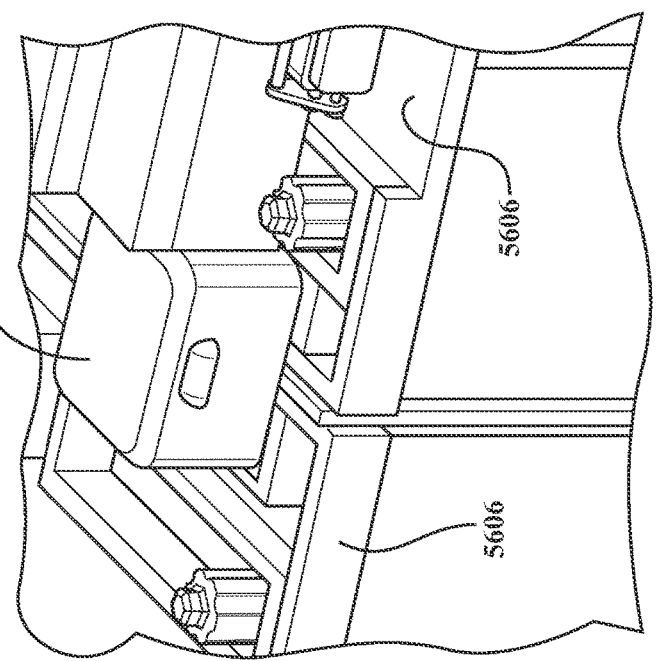
FIG. 65 is a schematic close-up depiction of the example shown in FIG. 64.

FIG. 64 is a schematic depiction of a multi-tray locking device 6402 of a battery assembly embodiment. The example of FIG. 64 includes an electrical coupling between tray groups that provides electrical connection and additionally serves as a tray lock. The use of an electrical coupling 6402 may lock the pin 5802 into place when engaged, and/or the electrical coupling 6402 may substitute for the use of the pin (e.g., securing to the center wall 5806 and/or having a feature that passes through aligned security features of each tray and/or the center wall). FIG. 65 is a schematic close-up depiction of the multi-tray locking device 6402, and is consistent with the example of FIG. 64.

Figure 66:
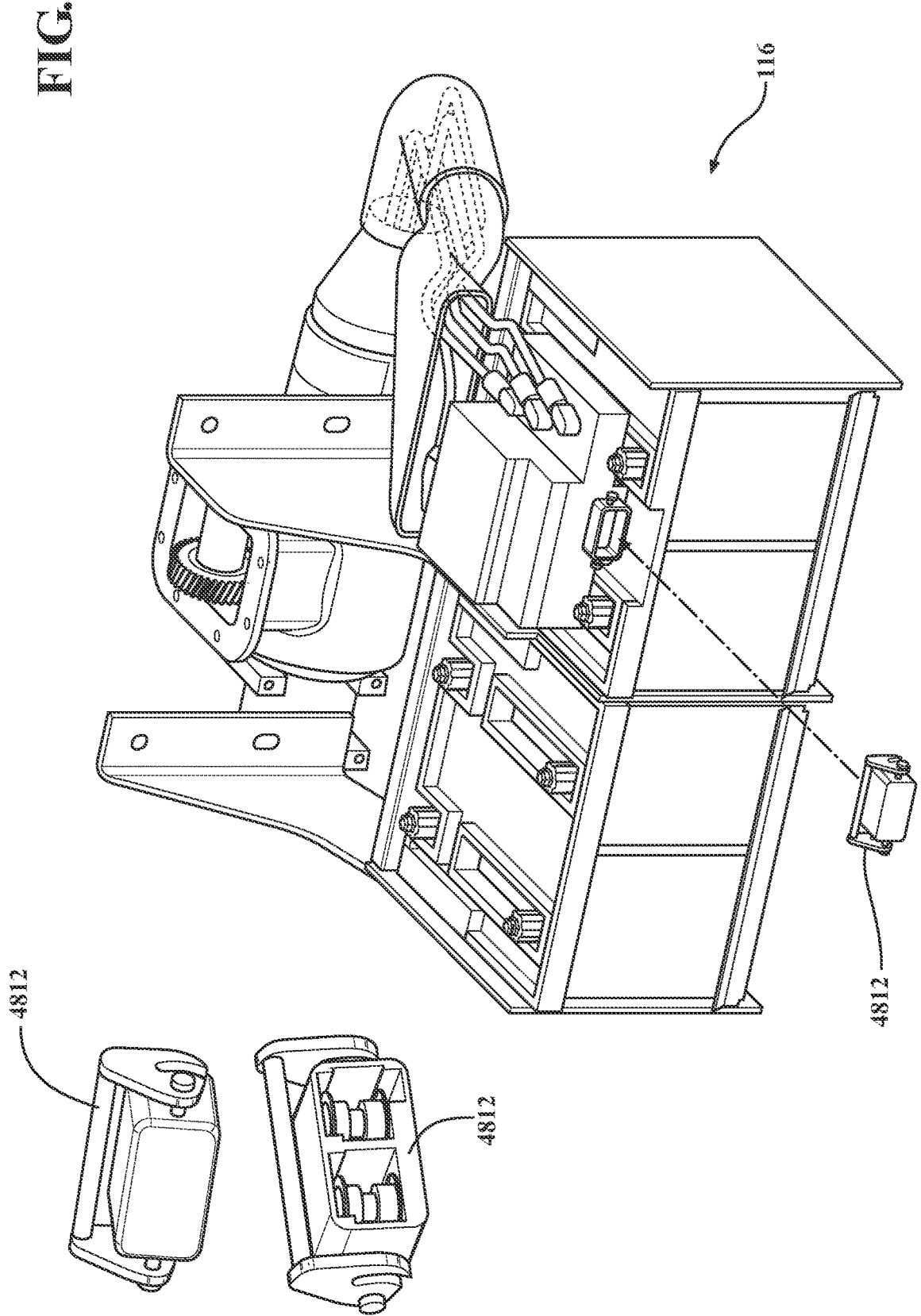
FIG. 66 is a schematic depiction of the second battery assembly embodiment with an exploded disconnect.

The example of FIG. 66 depicts the service disconnect 4812 mounted on the MDC 4606, such that the MDC 4606 cannot be accessed or serviced without disconnecting the service disconnect 4812, thereby disconnecting the low voltage interface and/or the high voltage interface. The service disconnect 4812 may additionally be modified to ensure the MDC 4606 power terminal is de-energized when the service disconnect is removed. The example service disconnect 4812 includes fuses positioned within the service disconnect 4812 housing.

Figure 69:
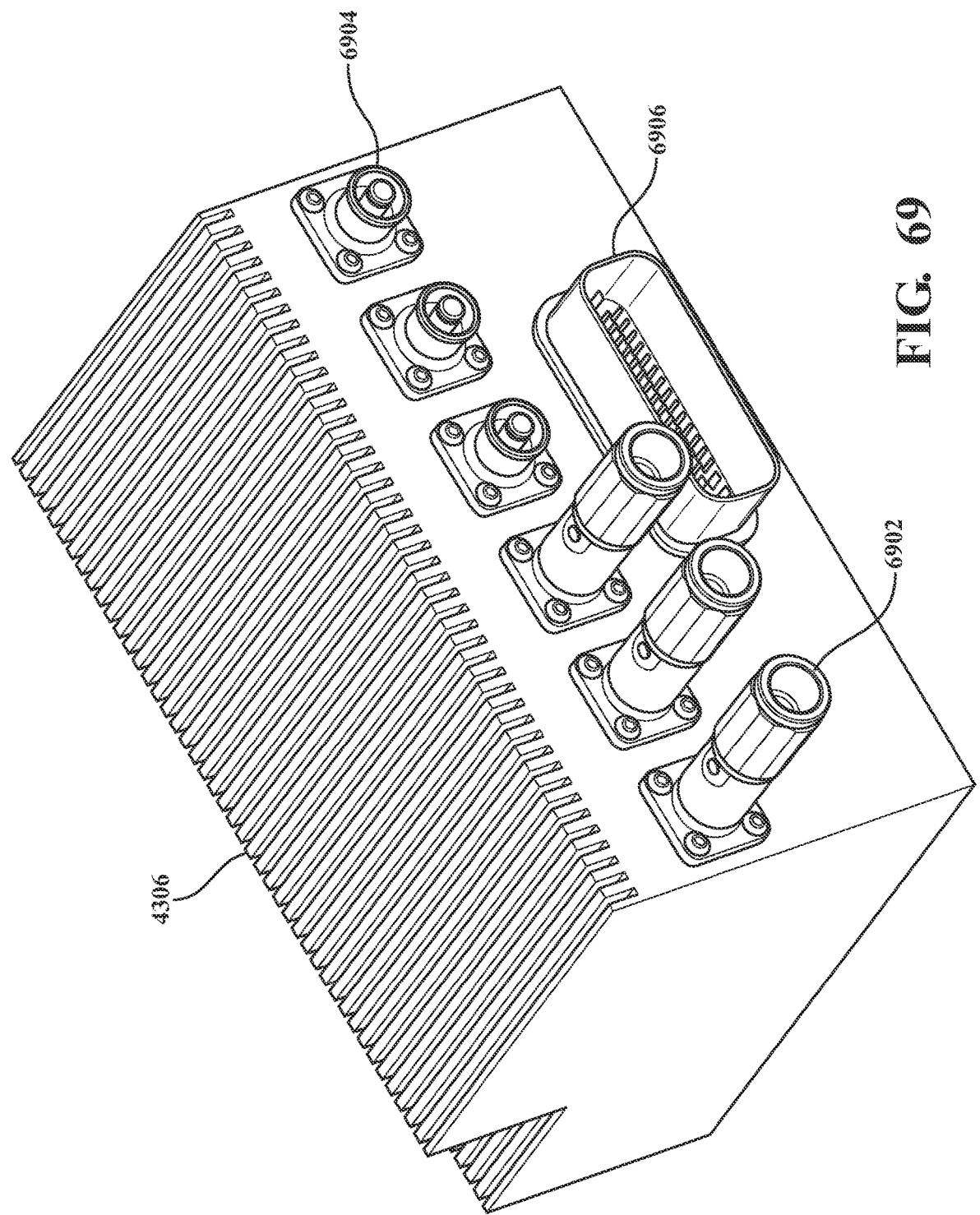
FIG. 69 is a schematic depiction of a power distribution unit for an example battery assembly.

FIG. 69 is a schematic depiction of an MDC 4606 housing for an example battery assembly. The MDC 4606 includes DC connections 6904 (or low voltage connections) to the vehicle or vehicle accessories, and a ground connection. The MDC further includes AC connections 6902 to the motor/generator, for example including a connection for each phase of the motor/generator. The MDC 4606 provides the ability to black out the vehicle to prevent battery discharge, to disconnect the high-current AC path from the battery and MDC 4606 to the motor/generator, and can optionally use a single disconnect (or a number of separate disconnects) to provide these functions. In certain embodiments, a solid state MOSFET may be provided in the MDC 4606 as a contactor. In certain embodiments, a mechanical contactor may be molded into one of the trays. The contactor may be replaceable separately from the tray or MDC 4606, or may be integrated with the tray or MDC 4606. In certain embodiments, one or more connections on the MDC 4606 may be provided from a tray.

Figure 70:
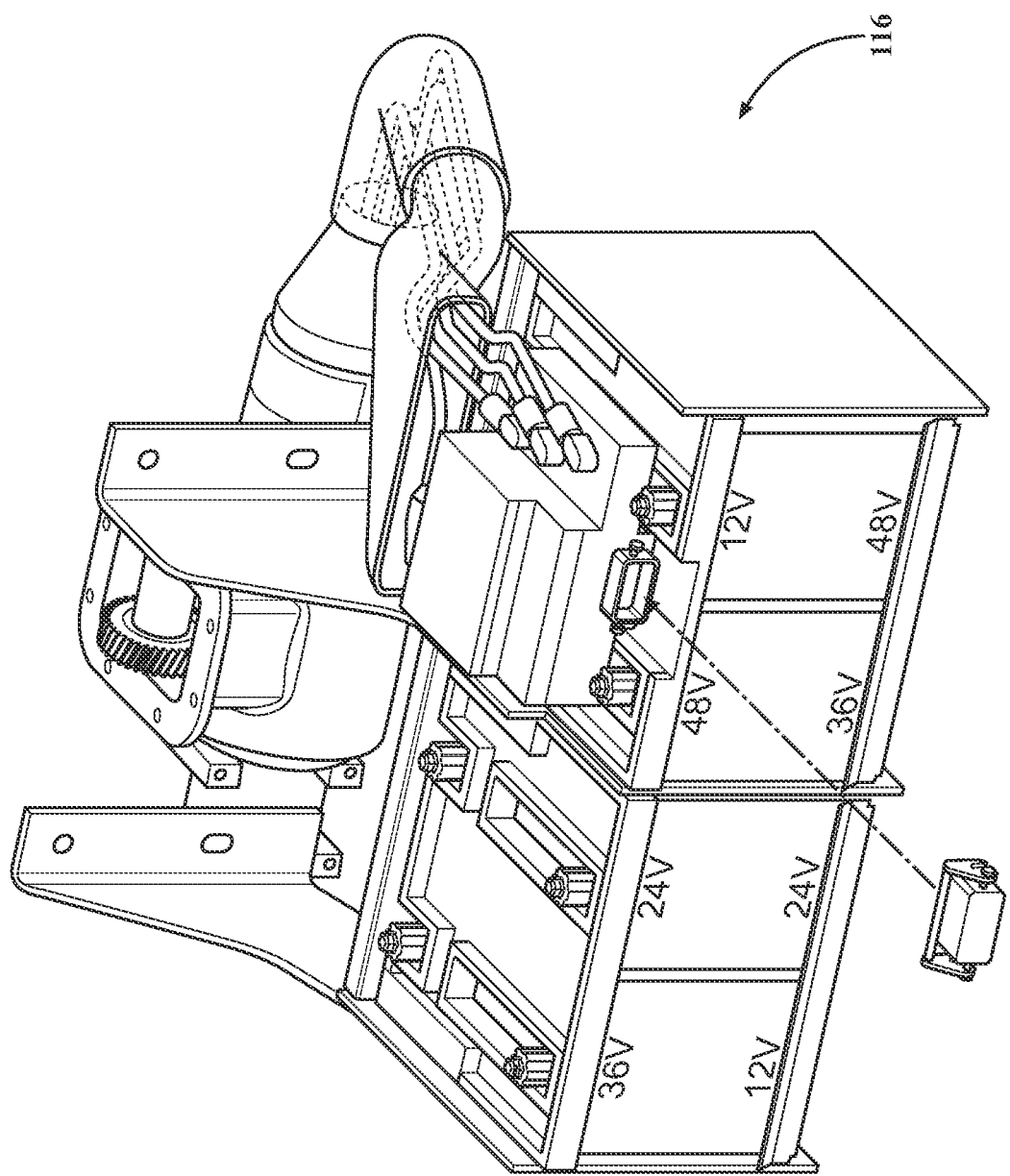
FIG. 70 is a schematic depiction of an example battery connection order for an example battery assembly.

FIG. 70 is a schematic depiction of an example battery connection order for an example battery assembly 116. The example battery connection includes the 48V and 12V couplings arranged side-by-side, which may provide an advantage to tray routing and/or electrical connections in certain embodiments. In the example of FIG. 70, the battery negative terminals are toward the opening, although any planned arrangement can be accommodated with appropriate design of the electrical connections in the trays. In the example of FIG. 70, battery voltage and temperature sensing is positioned within the tray, which may be overmolded into the tray, and/or which may be individually routed to the MDC. In the example of FIG. 70, the MDC 4606 has a controller programmed such that, if the polarity of the batteries is not correct, the vehicle disconnect will not open, thereby enforcing the proper installation before power can be communicated with the vehicle or motive application.

It can be seen that the battery assembly arrangements described herein provide for a minimal number of electrical components, a reduced length of high-current electrical paths, protected wiring from debris, road spray, and environmental intrusion, provide enhanced air cooling to batteries, wires, power electronics, and the motor, and provides an integrated solution for ease of installation and a reduced number of integration interfaces.

An example system includes a PTO device structured to selectively couple to a countershaft of a transmission, where the PTO device couples to the countershaft with a PTO in axial alignment with the countershaft; a motor/generator electrically coupled to an electrical power storage system; a shared load selectively powered by one of the countershaft or the motor/generator; and where the motor/generator is coupled to a first shaft and where the shared load is selectively coupled to a second shaft concentric with the first shaft.

Certain further aspects of an example system are described following, any one or more of which may be present in certain embodiments. An example system includes where the motor/generator is positioned between the transmission housing and the shared load, and where the second shaft is the inner shaft of the concentric shafts; and/or a planetary gear assembly configured to provide a first driven ratio to the shared load when powered by the countershaft, and to provide a second driven ratio to the shared load when powered by the motor/generator. An example system includes where the motor/generator is selectively coupled to the first shaft. An example system includes a planetary gear assembly configured to provide a first ratio between the motor/generator and the countershaft when power is transferred from the countershaft to the motor/generator, and to provide a second ratio between the motor/generator and the countershaft when power is transferred from the motor/generator to the countershaft.

Referencing FIG. 30, an example system includes a PTO device 3302 structured to selectively couple to a driveline of a vehicle; a motor/generator electrically coupled to an electrical power storage system; a compressor selectively powered by one of the driveline or the motor/generator; and where the PTO device further includes a coupling actuator structured to couple the compressor to the motor/generator in a first position, and to the driveline in a second position.

Certain further aspects of an example system are described following, any one or more of which may be present in certain embodiments. An example system includes a controller 3304, the controller 3304 including a driving mode circuit 3306 structured to determine a current vehicle operating mode as one of a sleep mode or a motive mode; and a shared load operating mode circuit 3308 structured to command the coupling actuator to the first position in response to the sleep mode, and to command the coupling actuator to the second position in response to the motive mode.

In an aspect, a system may include a motive application having a prime mover, a load, and driveline mechanically interposed between the prime mover and the load; a motor/generator structured to selectively couple to the driveline; an electrical power storage system, the electrical power storage system including a plurality of batteries; and a battery assembly that electrically couples the plurality of batteries to the motor/generator, the battery assembly including: a power interface positioned at a first end of the battery assembly, the power interface including a first low voltage coupling and a second high voltage coupling; and a service disconnect electrically interposed between the plurality of batteries and the power interface, where the service disconnect in a first position couples at least one of the plurality of batteries to the first low voltage coupling and couples the plurality of batteries to the second high voltage coupling, and where the service disconnect in a second position de-couples the plurality of batteries from the first low voltage coupling and from the second high voltage coupling. In embodiments, the system may include where the plurality of batteries include at least two groups of batteries, where each of the at least two groups of batteries are positioned within a corresponding housing compartment, and where the service disconnect is positioned within the corresponding housing compartment. The power interface may be positioned within a terminal one of the corresponding housing compartment. The power interface may have an axial extent defined by an axial extent of a terminal one of the corresponding housing compartment. The plurality of batteries may include at least one group of four batteries, where a low voltage associated with the first low voltage coupling corresponds to a voltage output of a single one of the plurality of batteries, and where a high voltage associated with the second high voltage coupling includes a voltage output of a serially connected group of the plurality of batteries. The power interface may couple at least one of the plurality of batteries to an electrical system of the motive application through the first low voltage coupling, and where the service disconnect in the second position prevents electrical connection between the plurality of batteries and the electrical system of the motive application. The power interface may further include at least one auxiliary low voltage load connection, and where the service disconnect in the second position prevents electrical connection between the plurality of batteries and the at least one auxiliary low voltage load connection. The power interface may couple the plurality of batteries to the motor/generator through the second high voltage coupling. The system may further include a motor drive converter (MDC) electrically interposed between the motor/generator and the plurality of batteries, and where the MDC provides or receives DC power on the battery side, and provides or receives AC power on the motor/generator side. The second high voltage coupling may include three power connections between the plurality of batteries and the MDC. The motor/ generator may be a three-phase AC device. MDC may be mounted on a sidewall of a housing compartment, where at least two of the plurality of batteries are positioned within the housing compartment. The MDC may be mounted above at least one of the plurality of batteries. The second high voltage coupling may include a plug extending vertically upward above at least one of the plurality of batteries, where the second high voltage coupling is electrically coupled to the MDC in a mated position of the MDC, and where the plug includes shielded energized components in an unmated position of the MDC. The service disconnect in the second position may enforce the MDC to the unmated position. The MDC in the mated position may require the service disconnect to be in the first position.

In an aspect, an apparatus may include an electrical power storage system, the electrical power storage system including a plurality of batteries; a battery assembly that electrically couples the plurality of batteries to a power interface, the battery assembly including; the power interface positioned at a first end of the battery assembly, the power interface including: a first low voltage coupling configured at a voltage corresponding to a motive application; and a second high voltage coupling configured at a voltage corresponding to a motor/generator selectively coupled to a driveline of the motive application; and a service disconnect electrically interposed between the plurality of batteries and the power interface, where the service disconnect in a first position couples at least one of the plurality of batteries to the first low voltage coupling and couples the plurality of batteries to the second high voltage coupling, and where the service disconnect in a second position de-couples the plurality of batteries from the first low voltage coupling and from the second high voltage coupling. In embodiments, the plurality of batteries may include at least two groups of batteries, where each of the at least two groups of batteries are positioned within a corresponding housing compartment, and where the service disconnect is positioned within the corresponding housing compartment. The power interface may be positioned within a terminal one of the corresponding housing compartment. The power interface may have an axial extent defined by an axial extent of a terminal one of the corresponding housing compartment. The power interface may couple the plurality of batteries to the motor/generator through the second high voltage coupling. The apparatus may further include a motor drive converter (MDC) electrically interposed between the motor/generator and the plurality of batteries, and where the MDC provides or receives DC power on the battery side, and provides or receives AC power on the motor/generator side. The second high voltage coupling may include three power connections between the plurality of batteries and the MDC. The motor/generator may be a three-phase AC device. The MDC may be mounted on a sidewall of a housing compartment, where at least two of the plurality of batteries are positioned within the housing compartment. The MDC may be mounted above at least one of the plurality of batteries. The second high voltage coupling may include a plug extending vertically upward above at least one of the plurality of batteries, where the second high voltage coupling is electrically coupled to the MDC in a mated position of the MDC, and where the plug includes shielded energized components in an unmated position of the MDC. The service disconnect in the second position may enforce the MDC to the unmated position. The MDC in the mated position may require the service disconnect to be in the first position. The voltage corresponding to the motive application may include a nominal voltage of one of 12V or 24V. The voltage corresponding to the motor/generator may include a nominal voltage, such as 36V, 48V, 60V, 72V, 84V, 96V, and the like. The service disconnect in the second position may prevent electrical connection between the plurality of batteries and an electrical system of the motive application. The power interface may further include at least one auxiliary low voltage load connection, and where the service disconnect in the second position prevents electrical connection between the plurality of batteries and the at least one auxiliary low voltage load connection. A voltage corresponding to the at least one auxiliary low voltage load connection may include a nominal voltage of 12V or 24V.

In an aspect, a system may include an electrical power storage system, the electrical power storage system including a plurality of batteries, where the plurality of batteries are grouped in a plurality of housing compartments, each housing compartment housing at least two of the plurality of batteries; a battery assembly that selectively electrically couples the plurality of batteries to a motor drive converter (MDC), the battery assembly including: a power interface including a high voltage coupling positioned within a terminal one of the plurality of housing compartments; the MDC, where the MDC provides or receives DC power on the high voltage coupling side, and provides or receives AC power on a motor/generator side; and where the MDC is mounted on a sidewall of the terminal one of the plurality of housing compartments. In embodiments, the battery assembly may further selectively electrically couple at least one of the plurality of batteries to a low voltage load, where the power interface further includes a low voltage coupling positioned within the terminal one of the plurality of housing compartments, and where the MDC is further electrically interposed between the low voltage coupling and the low voltage load. The low voltage load may include an electrical system load of a motive application, an auxiliary load of the motive application, and the like. The low voltage coupling may include a voltage corresponding to a voltage provided by a subset of the plurality of batteries electrically coupled in a series arrangement. The high voltage coupling may include a voltage corresponding to a voltage provided by the plurality of batteries electrically coupled in a series arrangement. The high voltage coupling may include a voltage corresponding to a voltage provided by a subset of the plurality of batteries electrically coupled in a series arrangement. The plurality of batteries may include one of eight (8) batteries or twelve (12) batteries, and where the subset includes four (4) batteries. The low voltage coupling may include a voltage corresponding to a voltage provided by a single one of the plurality of batteries. The high voltage coupling may include a voltage corresponding to a voltage provided by four (4) of the plurality of batteries coupled in a series arrangement. The high voltage coupling may include three power connections between the MDC and the plurality of batteries. The MDC may provide three-phase AC power to the motor/generator side. The MDC may be mounted on an outer side of the sidewall. The MDC may further include a plurality of cooling fins facing away from the sidewall. The MDC may further include a control connection. The MDC may further include an internal disconnect switch that couples the high voltage coupling to the motor/generator side in a first position, and de-couples the high voltage coupling to the motor/generator side in a second position.

In an aspect, a system may include a motive application having a prime mover, a load, and driveline mechanically interposed between the prime mover and the load; a motor/generator structured to selectively couple to the driveline; an electrical power storage system, the electrical power storage system including a plurality of batteries, where the plurality of batteries are grouped in a plurality of housing compartments, each housing compartment housing at least two of the plurality of batteries; a battery assembly that selectively electrically couples the plurality of batteries to the motor/generator, the battery assembly including: a power interface including a high voltage coupling positioned within a terminal one of the plurality of housing compartments; a motor drive converter (MDC) electrically interposed between the motor/generator and the high voltage coupling, where the MDC provides or receives DC power on the high voltage coupling side, and provides or receives AC power on a motor/generator side; and where the MDC is mounted on a sidewall of the terminal one of the plurality of housing compartments. In embodiments, the battery assembly may further selectively electrically couple at least one of the plurality of batteries to a low voltage load of the motive application, where the power interface further includes a low voltage coupling positioned within the terminal one of the plurality of housing compartments, and where the MDC is further electrically interposed between the low voltage coupling and a low voltage load of the motive application. The low voltage coupling may include a voltage corresponding to a voltage provided by a subset of the plurality of batteries electrically coupled in a series arrangement. The high voltage coupling may include a voltage corresponding to a voltage provided by the plurality of batteries electrically coupled in a series arrangement. The subset of the plurality of batteries may include a first subset, where the high voltage coupling includes a voltage corresponding to a voltage provided by a second subset of the plurality of batteries electrically coupled in a series arrangement, where the second subset includes a greater number of batteries than the first subset. The plurality of batteries may include one of eight (8) batteries or twelve (12) batteries, where the first subset includes one (1) or two (2) batteries, and where the second subset includes four (4) batteries. The low voltage coupling may include a voltage corresponding to a voltage provided by a single one of the plurality of batteries. The high voltage coupling may include a voltage corresponding to a voltage provided by four (4) of the plurality of batteries coupled in a series arrangement. The low voltage load may include an electrical system load of the motive application, an auxiliary load of the motive application, and the like. The high voltage coupling may include three power connections between the MDC and the plurality of batteries. The MDC may provide three-phase AC power to the motor/generator.

In an aspect, a system may include a motive application having a prime mover, a load, and driveline mechanically interposed between the prime mover and the load; a motor/generator structured to selectively couple to the driveline; an electrical power storage system, the electrical power storage system including a plurality of batteries; a bus bar positioned above at least two of the plurality of batteries, where the bus bar includes a plurality of battery interface connections to each of the at least two of the plurality of batteries, and a power interface positioned at an end of the bus bar, the power interface including a first low voltage coupling and a second high voltage coupling; and a service disconnect coupled to the bus bar, where the service disconnect in a first position couples at least one of the plurality of batteries the first low voltage coupling and couples the plurality of batteries to the second high voltage coupling, and where the service disconnect in a second position de-couples the plurality of batteries from the first low voltage coupling and from the second high voltage coupling. In embodiments, the bus bar may be positioned between the terminals of each of the at least two of the plurality of batteries. The system may further include a second bus bar positioned above at least two more of the plurality of batteries, and where the two more of the plurality of batteries are coupled through the power interface and the service disconnect. The at least two of the plurality of batteries may include four (4) of the plurality of batteries. The second high voltage coupling may include a voltage corresponding to a voltage provided by four (4) of the plurality of batteries coupled in a series arrangement. The system may further include a second bus bar positioned above a second four (4) of the plurality of batteries, and where the second four (4) of the plurality of batteries are coupled through the power interface and the service disconnect. The four (4) of the plurality of batteries may be positioned within a first housing, and where the second four (4) of the plurality of batteries are positioned within a second housing.

In an aspect, a system may include a motive application having a prime mover, a load, and driveline mechanically interposed between the prime mover and the load; a motor/generator structured to selectively couple to the driveline; an electrical power storage system, the electrical power storage system including a plurality of batteries, where the plurality of batteries are grouped in a plurality of housing compartments, each housing compartment housing at least two of the plurality of batteries; a battery assembly that selectively electrically couples the plurality of batteries to the motor/generator, the battery assembly including: a power interface including a high voltage coupling positioned within a terminal one of the plurality of housing compartments; a motor drive converter (MDC) electrically interposed between the motor/generator and the high voltage coupling, where the MDC provides or receives DC power on the high voltage coupling side, and provides or receives AC power on a motor/generator side; where the MDC is mounted on a sidewall of the terminal one of the plurality of housing compartments; and an air conduit fluidly interposed between the battery assembly and the motor/generator, where the air conduit exhausts cooling air at the motor/generator. In embodiments, the system may further include an air intake including a low velocity intake portion, and a positive pressure exhaust portion. The battery assembly may further include a water drain fluidly coupled to at least one of the plurality of housing compartments. The system may further include a high voltage electrical coupling between the MDC and the motor/generator, and where the high voltage electrical coupling is disposed within the air conduit.

In an aspect, a system may include a motive application having a prime mover, a load, and driveline mechanically interposed between the prime mover and the load; a motor/generator structured to selectively couple to the driveline; an electrical power storage system, the electrical power storage system including a plurality of batteries; and a battery assembly that electrically couples the plurality of batteries to the motor/generator, the battery assembly including: a power interface positioned at a first end of the battery assembly, the power interface including a first low voltage coupling and a second high voltage coupling; a service disconnect electrically interposed between the plurality of batteries and the power interface, where the service disconnect in a first position couples at least one of the plurality of batteries to the first low voltage coupling and couples the plurality of batteries to the second high voltage coupling, and where the service disconnect in a second position de-couples the plurality of batteries from the first low voltage coupling and from the second high voltage coupling; and where the service disconnect further includes at least one fuse, where each of the at least one fuse is serially coupled to one of the first low voltage coupling or the second high voltage coupling. In embodiments, the service disconnect may further include a second fuse, where the at least one fuse is serially coupled to the first low voltage coupling or the second high voltage coupling, and where the second fuse is serially coupled to the other one of the first low voltage coupling or the second high voltage coupling. The second high voltage coupling may be covered by a housing of a motor drive converter (MDC) in a mated position between the MDC and the second high voltage coupling. The service disconnect in the second position may enforce the MDC to an unmated position. The second high voltage coupling may include a plug extending vertically upward above at least one of the plurality of batteries, where the second high voltage coupling is electrically coupled to the MDC in the mated position of the MDC, and where the plug includes shielded energized components in an unmated position of the MDC. The mated position may require the service disconnect to be in the first position.

In an aspect, a system may include a motive application having a prime mover, a load, and driveline mechanically interposed between the prime mover and the load; a motor/generator structured to selectively couple to the driveline; an electrical power storage system, the electrical power storage system including a plurality of batteries; a power interface positioned at a first end of a battery assembly, the power interface at least selectively electrically coupling the plurality of batteries to the motor/generator; a housing compartment, where at least two of the plurality of batteries are positioned within the housing compartment; and a confining tray couplable to the housing compartment, the confining tray including battery inter-connections thereon, where the battery inter-connections electrically couple corresponding terminals of the at least two of the plurality of batteries within the housing compartment. In embodiments, the confining tray may further include an inter-housing connection, the inter-housing connection including a first electrical contact corresponding to one set of the corresponding terminals, and a second electrical contact corresponding to a second set of the corresponding terminals. The confining tray may define a securement feature, where the housing compartment defines a second securement feature, and where the securement feature and the second securement feature align when the confining tray is coupled to the housing compartment. The securement feature may include one of a hole or a slot, and where the second securement feature includes one of a hole or a slot. The system may further include a securing pin configured to be positioned through the securement feature and the second securement feature. The confining tray may further include a spring member configured to apply a compressive force on the at least two of the batteries when the confining tray is coupled to the housing compartment. The battery inter-connections may include rigid connections. The battery inter-connections may include flexible connections. The confining tray may be couplable to a terminal housing compartment, and where the confining tray further includes a plug extending vertically upward and configured to engage a motor drive converter (MDC). The plug may include shielded energized components in an unmated position of the MDC. The confining tray may further include a service disconnect interface, and where a service disconnect in a second disengaged position enforces the MDC into the unmated position.

In an aspect, a system may include a motive application having a prime mover, a load, and driveline mechanically interposed between the prime mover and the load; a motor/generator structured to selectively couple to the driveline; an electrical power storage system, the electrical power storage system including a plurality of batteries; a power interface positioned at a first end of a battery assembly, the power interface at least selectively electrically coupling the plurality of batteries to the motor/generator; a battery terminal cap coupled a corresponding terminal of each one of the plurality of batteries, each battery terminal cap including: a terminal engagement side structured to threadingly couple to the corresponding terminal, and a tool engagement side structured to accept rotating torque to engage or disengage the battery terminal cap; and an insulating portion that electrically isolates the terminal engagement side from the tool engagement side. In embodiments, each battery terminal cap may further include a snapping torque limiter that allows slipping of the battery terminal cap in response to applied torque beyond a designated engagement torque. Each battery terminal cap may further include a sealing gasket positioned to seal the corresponding terminal from a top of the corresponding one of the plurality of batteries in an engaged position of the battery terminal cap. The tool engagement side may further include a widened hand engagement surface. The widened hand engagement surface may include a ribbed surface. The tool engagement side may further include a narrowed specific tool engagement surface. The narrowed specific tool engagement surface may include a terminating upper portion. The narrowed specific tool engagement surface may include a surface configured to engage a $9/16''$ wrench.

In an aspect, a system may include a motive application having a prime mover, a load, and driveline mechanically interposed between the prime mover and the load; a motor/generator structured to selectively couple to the driveline; an electrical power storage system, the electrical power storage system including a plurality of batteries; a power interface positioned at a first end of a battery assembly, the power interface at least selectively electrically coupling the plurality of batteries to the motor/generator; a plurality of housing compartments, where at least two of the plurality of batteries are positioned within each of the plurality of housing compartments; and a plurality of confining trays each couplable to a corresponding one of the plurality of housing compartments, each including: battery inter-connections thereon, where the battery inter-connections electrically couple corresponding terminals of the at least two of the plurality of batteries within a corresponding housing compartment; and an inter-housing connection, the inter-housing connection including a first electrical contact corresponding to one set of the corresponding terminals, and a second electrical contact corresponding to a second set of the corresponding terminals. In embodiments, the system may further include a plurality of jumper connections, each jumper connection coupled to one of a first electrical contact of each of a pair of the plurality of confining trays, or a second electrical contact of each of the pair of the plurality of confining trays. The system may further include an inter-connection cap, where the inter-connection cap in an engaged position couples the first electrical contact and the second electrical contact of a first one of the plurality of confining trays with a corresponding first electrical contact and second electrical contact of a second one of the plurality of confining trays.

In an aspect, an apparatus may include an electrical power storage system, the electrical power storage system including a plurality of batteries; a power interface positioned at a first end of a battery assembly, the power interface at least selectively electrically coupling the plurality of batteries to a motor/generator selectively coupled to a driveline of a motive application; a plurality of housing compartments, where at least two of the plurality of batteries are positioned within each of the plurality of housing compartments; and a plurality of confining trays each couplable to a corresponding one of the plurality of housing compartments, each including: a battery inter-connections thereon, where the battery inter-connections electrically couple corresponding terminals of the at least two of the plurality of batteries within a corresponding housing compartment; and an inter-housing connection, the inter-housing connection including a first electrical contact corresponding to one set of the corresponding terminals, and a second electrical contact corresponding to a second set of the corresponding terminals. In embodiments, the apparatus may further include a plurality of jumper connections, each jumper connection coupled to one of a first electrical contact of each of a pair of the plurality of confining trays, or a second electrical contact of each of the pair of the plurality of confining trays. The apparatus may further include an inter-connection cap, where the inter-connection cap in an engaged position couples the first electrical contact and the second electrical contact of a first one of the plurality of confining trays with a corresponding first electrical contact and second electrical contact of a second one of the plurality of confining trays. The inter-connection cap in the engaged position may lock a securement feature in position, where the securement feature prevents relative motion between the first one of the plurality of confining trays and the second one of the plurality of confining trays with the corresponding housing compartment.

In an aspect, an apparatus may include an electrical power storage system, the electrical power storage system including a plurality of batteries, where the plurality of batteries are grouped in a plurality of housing compartments, each housing compartment housing at least two of the plurality of batteries; a battery assembly that selectively electrically couples the plurality of batteries to a motor drive converter (MDC), the battery assembly including: a power interface including a high voltage coupling positioned within a terminal one of the plurality of housing compartments; the MDC, where the MDC provides or receives DC power on a high voltage coupling side, and provides or receives AC power on a motor/generator side; and where the MDC includes a control connection. In embodiments, the MDC may further include a controller configured to selectively decouple the plurality of batteries from the motor/generator. The controller may further be configured to selectively decouple the plurality of batteries from the motor/generator by providing a coupling command to a bistable relay. The controller may be further configured to selectively decouple the plurality of batteries from a low voltage load of a motive application. The controller may be further configured to selectively decouple the plurality of batteries from the low voltage load by providing a coupling command to a bistable relay. The apparatus may further include a capacitor electrically coupled to the bistable relay, where the capacitor powers the bistable relay to an open position in response to a loss of power. The apparatus may further include a capacitor electrically coupled to the bistable relay, where the capacitor powers the bistable relay to an open position in response to a loss of power. The controller may be further configured to selectively decouple the plurality of batteries from the motor/generator by providing a coupling command to a normally-open relay. The controller may be further configured to selectively decouple the plurality of batteries from the motor/generator by providing a coupling command to a solid state relay. The controller may be further configured to prevent coupling the plurality of batteries to the motor/generator in response to determining a battery connection value is incorrect. The controller may be further configured to communicate one of a fault condition or a status condition to a network. The network may include a vehicle network, a controller area network (CAN), a service tool connection, and the like.

The programmed methods and/or instructions described herein may be deployed in part or in whole through a machine that executes computer instructions on a computer-readable media, program codes, and/or instructions on a processor or processors. "Processor" used herein is synonymous with the plural "processors" and the two terms may be used interchangeably unless context clearly indicates otherwise. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, Internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code, and/or instructions. A central repository may provide program instructions to be executed on different devices. In this implementation, the remote repository may act as a storage medium for program code, instructions, and programs.

The computer readable instructions may be associated with a client that may include a file client, print client, domain client, Internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of a program across the network. The networking of some or all of these devices may facilitate parallel processing of a program or method at one or more location without deviating from the scope. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, LTE, EVDO, mesh, or other networks types.

The methods, programs, codes, and instructions described herein and elsewhere may be implemented on or through mobile devices. The mobile devices may include navigation devices, vehicle remote network access devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM, and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer instructions, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in procedure descriptions, methods, flow charts, and block diagrams imply logical boundaries between the elements. However, any operations described herein may be divided in whole or part, combined in whole or part, re-ordered in whole or part, and/or have certain operations omitted in certain embodiments. As such, the depiction and/or description of an order for various steps should not be understood to require a particular order of execution for those steps, unless required by a particular application, or explicitly stated or otherwise clear from the context. Operations described herein may be implemented by a computing device having access to computer executable instructions stored on a computer readable media, wherein the computing device executing the instructions thereby performs one or more aspects of the described operations herein. Additionally or alternatively, operations described herein may be performed by hardware arrangements, logic circuits, and/or electrical devices configured to perform one or more aspects of operations described herein. Examples of certain computing devices may include, but may not be limited to, one or more controllers positioned on or associated with a vehicle, engine, transmission, and/or PTO device system, personal digital assistants, laptops, personal computers, mobile phones, other handheld computing devices, wired or wireless communication devices, transducers, chips, calculators, satellites, tablet PCs, electronic books, gadgets, electronic devices, devices having artificial intelligence, networking equipment, servers, routers, and the like. Thus, while the foregoing drawings and descriptions set forth functional aspects of the disclosed systems, the descriptions herein are not limited to a particular arrangement of computer instructions, hardware devices, logic circuits, or the like for implementing operations, procedures, or methods described herein, unless explicitly stated or otherwise clear from the context.

The methods and/or processes described above, and steps thereof, may be realized in hardware, instructions stored on a computer readable medium, or any combination thereof for a particular application. The hardware may include a general-purpose computer, a dedicated computing device or specific computing device, a logic circuit, a hardware arrangement configured to perform described operations, a sensor of any type, and/or an actuator of any type. Aspects of a process executed on a computing device may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine-readable medium.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

While the methods and systems described herein have been disclosed in connection with certain example embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

All documents referenced herein are hereby incorporated by reference.

What is claimed is:

1. A system, comprising:
a motive application having a prime mover, a load, and driveline mechanically interposed between the prime mover and the load;
a motor/generator structured to selectively couple to the driveline;
an electrical power storage system, the electrical power storage system comprising a plurality of batteries, wherein the plurality of batteries are grouped in a plurality of housing compartments, each housing compartment housing at least two of the plurality of batteries;
a battery assembly that selectively electrically couples the plurality of batteries to the motor/generator, the battery assembly comprising:
a power interface comprising a high voltage coupling positioned within a terminal one of the plurality of housing compartments;
a motor drive converter (MDC) electrically interposed between the motor/generator and the high voltage coupling, wherein the MDC provides or receives DC power on the high voltage coupling side, and provides or receives AC power on a motor/generator side; and
wherein the MDC is mounted on a sidewall of the terminal one of the plurality of housing compartments.

2. The system of claim 1, wherein the battery assembly further selectively electrically couples at least one of the plurality of batteries to a low voltage load of the motive application, wherein the power interface further comprises a low voltage coupling positioned within the terminal one of the plurality of housing compartments, and wherein the MDC is further electrically interposed between the low voltage coupling and a low voltage load of the motive application.

3. The system of claim 2, wherein the low voltage coupling comprises a voltage corresponding to a voltage provided by a subset of the plurality of batteries electrically coupled in a series arrangement.

4. The system of claim 3, wherein the high voltage coupling comprises a voltage corresponding to a voltage provided by the plurality of batteries electrically coupled in a series arrangement.

5. The system of claim 3, wherein the subset of the plurality of batteries comprises a first subset, wherein the high voltage coupling comprises a voltage corresponding to a voltage provided by a second subset of the plurality of batteries electrically coupled in a series arrangement, wherein the second subset comprises a greater number of batteries than the first sub set.

6. A system, comprising:
a motive application having a prime mover, a load, and driveline mechanically interposed between the prime mover and the load;
a motor/generator structured to selectively couple to the driveline;

an electrical power storage system, the electrical power storage system comprising a plurality of batteries;

a power interface positioned at a first end of the battery assembly, the power interface at least selectively electrically coupling the plurality of batteries to the motor/generator;

a battery terminal cap coupled to a corresponding terminal of each one of the plurality of batteries, each battery terminal cap comprising:

a terminal engagement side structured to threadingly couple to the corresponding terminal, and a tool engagement side structured to accept rotating torque to engage or disengage the battery terminal cap; and an insulating portion that electrically isolates the terminal engagement side from the tool engagement side.

7. The system of claim 6, wherein each battery terminal cap further comprises a snapping torque limiter that allows slipping of the battery terminal cap in response to applied torque beyond a designated engagement torque.

* * * * *